US008986880B2

(12) United States Patent
Odani et al.

(10) Patent No.: US 8,986,880 B2
(45) Date of Patent: Mar. 24, 2015

(54) NONAQUEOUS ELECTROLYTE BATTERY, BATTERY PACK, ELECTRONIC DEVICE, ELECTRIC VEHICLE, POWER STORAGE DEVICE, AND POWER SYSTEM

(75) Inventors: Toru Odani, Fukushima (JP); Tadahiko Kubota, Kanagawa (JP)

(73) Assignee: Sony Corporation (JP)

( * ) Notice: Subject to any disclaimer, the term of this patent is extended or adjusted under 35 U.S.C. 154(b) by 130 days.

(21) Appl. No.: 13/485,531

(22) Filed: May 31, 2012

(65) Prior Publication Data

US 2012/0316716 A1 Dec. 13, 2012

(30) Foreign Application Priority Data

Jun. 7, 2011 (JP) ................................ 2011-127047
Jan. 30, 2012 (JP) ................................ 2012-016355

(51) Int. Cl.
| H01M 10/056 | (2010.01) |
| H01M 4/00 | (2006.01) |
| H01M 2/02 | (2006.01) |
| B60L 15/00 | (2006.01) |
| H01M 2/16 | (2006.01) |
| H01M 10/0567 | (2010.01) |
| H01M 10/0568 | (2010.01) |
| H01M 4/134 | (2010.01) |
| H01M 10/052 | (2010.01) |

(52) U.S. Cl.
CPC ........ *H01M 2/1646* (2013.01); *H01M 10/0567* (2013.01); *H01M 10/0568* (2013.01); *Y02E 60/122* (2013.01); *Y02T 10/7011* (2013.01); *H01M 2/1653* (2013.01); *H01M 2/1686* (2013.01); *H01M 4/134* (2013.01); *H01M 10/052* (2013.01)

USPC ........... 429/199; 429/248; 429/200; 429/325; 429/163; 429/94; 180/65.245; 701/22

(58) Field of Classification Search
USPC ........... 429/94, 163, 200, 199, 188, 303, 207, 429/245, 62, 324, 325, 7; 180/65, 65.245; 701/22; 903/907
See application file for complete search history.

(56) References Cited

U.S. PATENT DOCUMENTS

| 2006/0019168 A1* | 1/2006 | Li et al. .......................... 429/245 |
| 2006/0068296 A1* | 3/2006 | Nakagawa et al. ........... 429/324 |
| 2008/0076011 A1* | 3/2008 | Emori et al. .................... 429/62 |
| 2010/0209771 A1* | 8/2010 | Shizuka et al. ............... 429/207 |
| 2011/0274982 A1* | 11/2011 | Kaneko et al. ................ 429/303 |

FOREIGN PATENT DOCUMENTS

| JP | 8-511274 | 11/1996 |
| JP | 2001-519589 | 10/2001 |
| JP | 2004-165151 | 6/2004 |

(Continued)

*Primary Examiner* — Kenneth Douyette
(74) *Attorney, Agent, or Firm* — Sheridan Ross P.C.

(57) ABSTRACT

A nonaqueous electrolyte battery includes: an electrode group including a positive electrode and a negative electrode; and a nonaqueous electrolyte including an electrolytic solution, the electrode group including an insulating layer, the insulating layer containing a ceramic, the electrolytic solution including an electrolyte salt and an additive, the electrolyte salt including the compound of formula (1), and the additive being at least one of the compounds of formulae (2) to (14), and the compound of formula (1) being contained in 0.001 mol/L to 2.5 mol/L with respect to the electrolytic solution.

23 Claims, 13 Drawing Sheets

(56) References Cited

FOREIGN PATENT DOCUMENTS

| JP | 2009-070636 | 4/2009 |
| JP | 2009-129797 | 6/2009 |
| JP | 2009-187698 | 8/2009 |
| JP | 2010-129449 | 6/2010 |
| JP | 2010-135129 | 6/2010 |
| JP | 2010170878 A * | 8/2010 | ............ H01M 4/587 |

* cited by examiner

NONAQUEOUS ELECTROLYTE BATTERY, BATTERY PACK, ELECTRONIC DEVICE, ELECTRIC VEHICLE, POWER STORAGE DEVICE, AND POWER SYSTEM

FIELD

The present technology relates to nonaqueous electrolyte batteries, battery packs, electronic devices, electric vehicles, power storage devices, and power systems. Specifically, the present technology relates to nonaqueous electrolyte batteries that use a nonaqueous electrolyte containing a nonaqueous solvent with an electrolyte salt dissolved therein, and to battery packs, electronic devices, electric vehicles, power storage devices, and power systems using such nonaqueous electrolyte batteries.

BACKGROUND

With the recent trend for higher performance and more multifunctional electronic devices, batteries with improved volume energy density have been used. However, such high energy-density batteries may undergo thermal runaway in the event of internal shorting due to deformation under external pressure.

In this connection, silica or alumina is often disposed between the battery positive and negative electrodes in a laminar fashion to improve battery safety. In the related art, the following literatures are available.

JP-A-2010-129449 describes a secondary battery that uses lithium bis(fluorosulfonyl)imide (LiFSI) as the electrolyte salt, and a halogenated carbonate ester-containing solvent for dissolving the electrolyte salt.

JP-T-08-511274 describes a secondary battery that uses lithium bis(fluorosulfonyl)imide as the electrolyte salt. JP-A-2004-165151 describes improving stability under high temperature or during the storage with the use of an electrolytic solution that contains lactone as the solvent, and lithium bis(fluorosulfonyl)imide as the electrolyte salt. This publication also describes further improving stability with the use of an electrolytic solution that further contains vinylene carbonate, vinylethylene carbonate, phenylethylene carbonate, or propanesultone as an additive. JP-A-2009-70636 describes a battery that contains a quaternary ammonium cation together with a FSI (fluorosulfonylimide) anion and an inorganic anion. JP-T-2001-519589 describes using a phosphoric acid ester and a boric acid ester together.

SUMMARY

However, from the standpoint of ion conductivity, disposing a resistance component such as silica and alumina between the electrodes causes serious deterioration under low temperature environment, and there is a need for further improvement in characteristics. Further, for applications in cars and accumulators, desirable characteristics are needed even under low temperatures outside. It is thus desired to realize safety and low-temperature cycle characteristics at the same time.

Accordingly, there is a need for a nonaqueous electrolyte battery that can improve safety and low-temperature cycle characteristics at the same time, and a battery pack, an electronic device, an electric vehicle, a power storage device, and a power system using such a nonaqueous electrolyte battery.

An embodiment of the present technology is directed to a nonaqueous electrolyte battery that includes: an electrode group including a positive electrode and a negative electrode; and a nonaqueous electrolyte containing an electrolytic solution. The electrode group includes an insulating layer. The insulating layer includes a ceramic. The electrolytic solution contains: an electrolyte salt containing the compound of formula (1); and an additive representing at least one of the compounds of formulae (2) to (14). The content of the compound of formula (1) is from 0.001 mol/L to 2.5 mol/L with respect to the electrolytic solution.

(In the formula, M is a monovalent cation, Y is $SO_2$ or CO, the substituents Z are each independently a fluorine atom, or an organic group that may contain at least one polymerizable functional group, and that may be perfluorinated, where at least one of the substituents Z is a fluorine atom.)

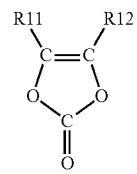

(In the formula, R11 and R12 are each independently a hydrogen group, a halogen group, an alkyl group, or a halogenated alkyl group.)

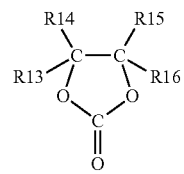

(In the formula, R13 to R16 are each independently a hydrogen group, a halogen group, an alkyl group, a halogenated alkyl group, a vinyl group, or an allyl group, where at least one of R13 to R16 is a vinyl group or an allyl group.)

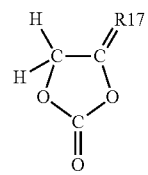

(In the formula, R17 is an alkylene group.)

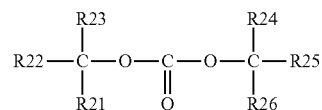

(In the formula, R21 to R26 are each independently a hydrogen group, a halogen group, an alkyl group, or a halogenated alkyl group, where at least one of R21 to R26 is a halogen group or a halogenated alkyl group.)

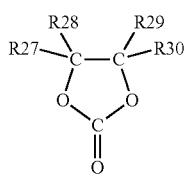
(6)

(In the formula, R27 to R30 are each independently a hydrogen group, a halogen group, an alkyl group, or a halogenated alkyl group, where at least one of R27 to R30 is a halogen group or a halogenated alkyl group.)

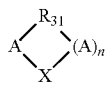
(7)

(In the formula, R31 represents an optionally substituted alkylene group of 1 to 6 carbon atoms, an optionally substituted alkenylene group of 2 to 6 carbon atoms, or an optionally substituted bridge ring, A represents C=O, SO, or $SO_2$, n is 0 or 1, and X represents oxygen (O) or sulfur (S).)

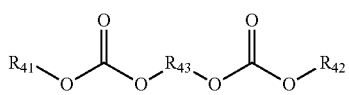
(8)

(In the formula, R41 and R42 each independently represent an optionally substituted alkyl group of 1 to 6 carbon atoms, an optionally substituted alkenyl group of 2 to 6 carbon atoms, or an optionally substituted alkynyl group of 2 to 6 carbon atoms, R43 represents an optionally substituted alkylene group of 1 to 6 carbon atoms, an optionally substituted alkenylene group of 2 to 6 carbon atoms, an optionally substituted alkynylene group of 2 to 6 carbon atoms, or an optionally substituted bridge ring, where the substituent represents a halogen atom or an alkyl group.)

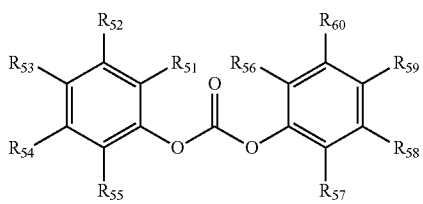
(9)

(In the formula, R51 to R60 represents an optionally substituted alkyl group of 1 to 18 carbon atoms, an alkenyl group, an alkynyl group, an alkoxy group, or an alkylamino group, which may be connected to each other to form a ring. The substituent represents a halogen atom or an alkyl group.)

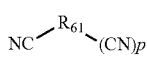
(10)

(In the formula, R61 represents an optionally substituted alkylene group of 1 to 36 carbon atoms, an optionally substituted alkenylene group of 2 to 36 carbon atoms, an optionally substituted alkynylene group of 2 to 36 carbon atoms, or an optionally substituted bridge ring, and p is an integer of 0 or more with an upper limit determined by R61.)

$Li_2PO_3F$ (lithium monofluorophosphate) (11)

$LiPO_2F_2$ (lithium difluorophosphate) (12)

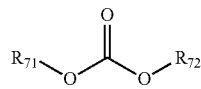
(13)

(In the formula, R71 and R72 are each independently an alkyl group or a halogenated alkyl group.)

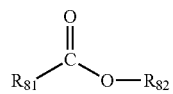
(14)

(In the formula, R81 and R82 each independently represent a chain alkyl group.)

Another embodiment of the present technology is directed to a battery pack, an electronic device, an electric vehicle, a power storage device, and a power system each including the nonaqueous electrolyte battery.

In an embodiment of the present technology, the electrode group has an insulating layer containing a ceramic, and the electrolytic solution includes an electrolyte salt containing the compound of formula (1), and an additive representing at least one of the compounds of formulae (2) to (14). The content of the compound of formula (1) is from 0.001 mol/L to 2.5 mol/L with respect to the electrolytic solution. In this way, safety and low-temperature cycle characteristics can be improved at the same time.

The present technology enables safety and low-temperature cycle characteristics to be improved at the same time.

DETAILED DESCRIPTION OF THE PREFERRED EMBODIMENTS

Figure 1:
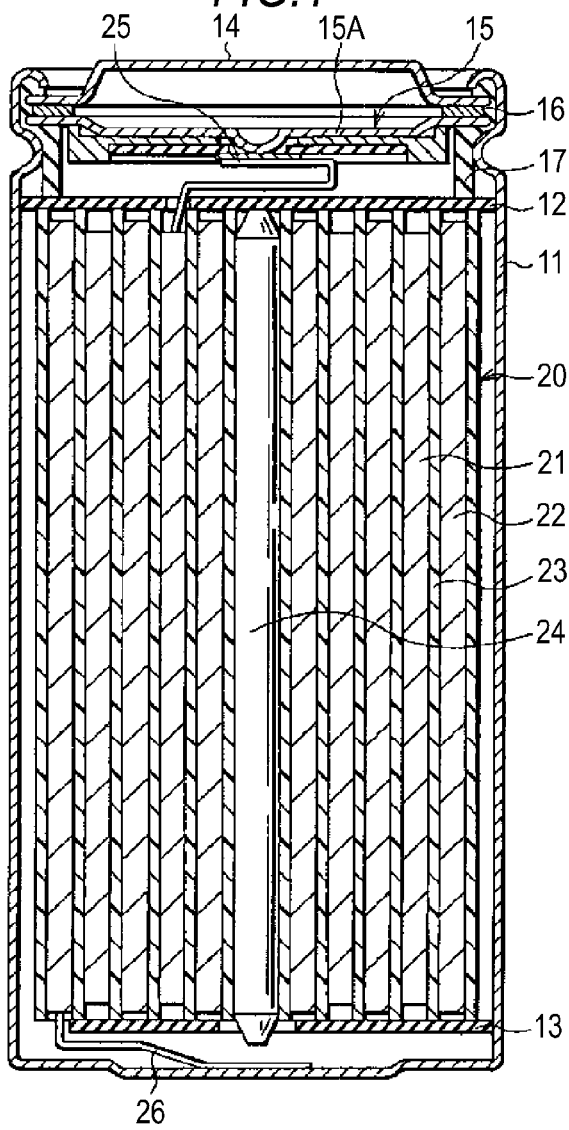
FIG. 1 is a cross sectional view illustrating a configuration of a first nonaqueous electrolyte battery according to an embodiment of the present technology.

The following will describe the present technology with reference to the accompanying drawings. Descriptions will be given in the following order.

1. First Embodiment
(1-1) Nonaqueous electrolytic solution
(1-2) First nonaqueous electrolyte battery
(1-3) Second nonaqueous electrolyte battery
(1-4) Third nonaqueous electrolyte battery
(1-5) Fourth nonaqueous electrolyte battery
2. Second Embodiment
(Example of battery pack using nonaqueous electrolyte battery)
3. Third Embodiment
(Examples of power storage system and other applications using nonaqueous electrolyte battery)
4. Other embodiments (variations)

1. First Embodiment (1-1) Nonaqueous Electrolytic Solution

The nonaqueous electrolytic solution is a liquid electrolyte, and contains a nonaqueous solvent and an electrolyte salt. The nonaqueous electrolytic solution contains the compound of formula (1) as an electrolyte salt in 0.001 mol/L to 2.5 mol/L with respect to the nonaqueous electrolytic solution, and at least one of the compounds of formulae (2) to (14) as an additive.

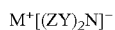  (1)

(In the formula, M is a monovalent cation, Y is $SO_2$ or CO, and the substituents Z are each independently a fluorine atom, or an organic group that may contain at least one polymerizable functional group, and that may be perfluorinated, where at least one of the substituents Z is a fluorine atom.)

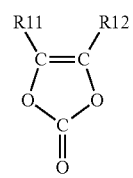  (2)

(In the formula, R11 and R12 are each independently a hydrogen group, a halogen group, an alkyl group, or a halogenated alkyl group.)

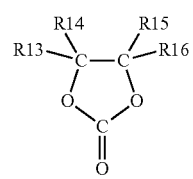  (3)

(In the formula, R13 to R16 are each independently a hydrogen group, a halogen group, an alkyl group, a halogenated alkyl group, a vinyl group, or an allyl group, where at least one of R13 to R16 is a vinyl group or an allyl group.)

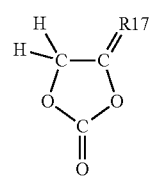  (4)

(In the formula, R17 is an alkylene group.)

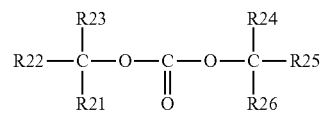  (5)

(In the formula, R21 to R26 are each independently a hydrogen group, a halogen group, an alkyl group, or a halogenated alkyl group, where at least one of R21 to R26 is a halogen group or a halogenated alkyl group.)

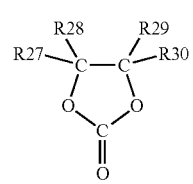  (6)

(In the formula, R27 to R30 are each independently a hydrogen group, a halogen group, an alkyl group, or a halogenated alkyl group, where at least one of R27 to R30 is a halogen group or a halogenated alkyl group.)

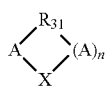
(7)

(In the formula, R31 represents an optionally substituted alkylene group of 1 to 6 carbon atoms, an optionally substituted alkenylene group of 2 to 6 carbon atoms, or an optionally substituted bridge ring. A represents C=O, SO, or $SO_2$, n is 0 or 1, and X represents oxygen (O) or sulfur (S).)

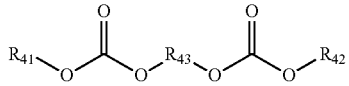
(8)

(In the formula, R41 and R42 each independently represent an optionally substituted alkyl group of 1 to 6 carbon atoms, an optionally substituted alkenyl group of 2 to 6 carbon atoms, or an optionally substituted alkynyl group of 2 to 6 carbon atoms. R43 represents an optionally substituted alkylene group of 1 to 6 carbon atoms, an optionally substituted alkenylene group of 2 to 6 carbon atoms, an optionally substituted alkynylene group of 2 to 6 carbon atoms, or an optionally substituted bridge ring. The substituent represents a halogen atom or an alkyl group.)

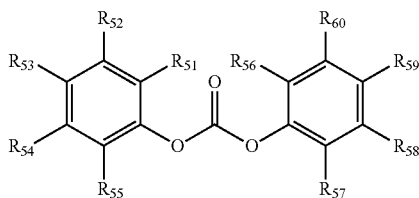
(9)

(In the formula, R51 to R60 represent an optionally substituted alkyl group of 1 to 18 carbon atoms, an alkenyl group, an alkynyl group, an alkoxy group, or an alkylamino group, which may be connected to each other to form a ring. The substituent represents a halogen atom or an alkyl group.)

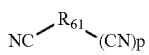
(10)

(In the formula, R61 represents an optionally substituted alkylene group of 1 to 36 carbon atoms, an optionally substituted alkenylene group of 2 to 36 carbon atoms, an optionally substituted alkynylene group of 2 to 36 carbon atoms, or an optionally substituted bridge ring. p is an integer of 0 or more with an upper limit determined by R61.)

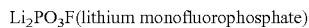
(11)

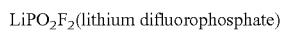
(12)

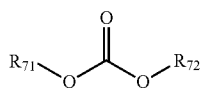
(13)

(In the formula, R71 and R72 are each independently an alkyl group or a halogenated alkyl group.)

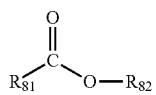
(14)

(In the formula, R81 and R82 each independently represent a chain alkyl group.)

Compound of Formula (1)

The compound of formula (1) is contained as an electrolyte salt in the electrolytic solution. Examples of the compound of formula (1) include lithium bis(fluorosulfonyl)imide (LiFSI), lithium(fluorosulfonyl)(trifluoromethylsulfonyl)imide, lithium(fluorosulfonyl)(pentafluoroethylsulfonyl)imide, lithium (fluorosulfonyl)(nonafluorobutylsulfonyl)imide, lithium (fluorosulfonyl)(phenylsulfonyl)imide, lithium (fluorosulfonyl)(pentafluorophenylsulfonyl)imide, and lithium(fluorosulfonyl)(vinylsulfonyl)imide. These imide salt compounds may be used either alone or as a mixture of two or more. The content of the compound of formula (1) is from 0.001 mol/L to 2.5 mol/L with respect to the electrolytic solution. With a content of the compound of formula (1) less than 0.001 mol/L, the intended effect of improving low-temperature cycles cannot be obtained. The battery characteristics degrade with a content of the compound of formula (1) above 2.5 mol/L. The compound of formula (1) as an electrolyte salt may be used alone in the electrolytic solution, or the electrolytic solution may contain other electrolyte salts, in addition to the compound of formula (1). When the electrolytic solution contains the compound of formula (1) as an electrolyte salt alone, the compound of formula (1) is preferably contained in 1.0 mol/L to 2.2 mol/L with respect to the electrolytic solution, because it provides improved effects. When the electrolytic solution contains other electrolyte salts in addition to the compound of formula (1) contained as an electrolyte salt, the compound of formula (1) is preferably contained in 0.001 mol/L to 0.5 mol/L with respect to the electrolytic solution, because it provides improved effects. Further, when the electrolytic solution contains other electrolyte salts in addition to the compound of formula (1) contained as an electrolyte salt, it is preferable that the total content of the compound of formula (1) and the other electrolyte salts be 3.0 mol/L or less with respect to the electrolytic solution, because it provides improved effects.

Compounds of Formulae (2) to (14)

The electrolytic solution contains at least one of the compounds of formulae (2) to (14). In this way, a coating originating in at least one of the compounds of formulae (2) to (14) is formed on the electrodes by the charge and discharge, and the battery characteristics can be improved.

Compounds of Formulae (2) to (4)

The compounds of formulae (2) to (4) are cyclic carbonate esters having an unsaturated bond. The electrolytic solution preferably contains at least one of the cyclic carbonate esters of formulae (2) to (4) having an unsaturated bond, because it further improves the chemical stability of the electrolytic solution. Preferably, the content of at least one of the compounds of formulae (2) to (4) is from 0.01 mass % to 5 mass % with respect to the electrolytic solution, because it provides improved effects.

The cyclic carbonate ester of formula (2) having an unsaturated bond is a vinylene carbonate compound. Examples of the vinylene carbonate compound include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one. These may be used either alone or as a mixture of two or more. Of these, vinylene carbonate is preferred, because it is readily available, and can provide high effects.

The cyclic carbonate ester of formula (3) having an unsaturated bond is a vinyl ethylene carbonate compound. Examples of the vinyl ethylene carbonate compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, or 4,5-divinyl-1,3-dioxolan-2-one. These may be used either alone or as a mixture of two or more. Of these, vinyl ethylene carbonate is preferred, because it is readily available, and can provide high effects. R13 to R16 may be all vinyl groups, or all allyl groups, or a combination of vinyl groups and allyl groups.

The cyclic carbonate ester of formula (4) having an unsaturated bond is a methylene ethylene carbonate compound. Examples of the methylene ethylene carbonate compound include 4-methylene-1,3-dioxolan-2-one, 4,4-dimethyl-5-methylene-1,3-dioxolan-2-one, and 4,4-diethyl-5-methylene-1,3-dioxolan-2-one. These may be used either alone or as a mixture of two or more. The methylene ethylene carbonate compound may be that that has a single methylene group (compound of formula (4)), or two methylene groups.

Aside from the compounds of formulae (2) to (4), the cyclic carbonate ester having an unsaturated bond may be, for example, catechol carbonate having a benzene ring.

Compounds of Formulae (5) and (6)

The compound of formula (5) is a chain carbonate ester that contains halogen as a constituting element. The compound of formula (6) is a cyclic carbonate ester that contains halogen as a constituting element. Containing at least one of the compounds of formulae (5) and (6) in the electrolytic solution is preferable, because it forms a protective film on the electrode surface, and suppresses the degradation reaction of the electrolytic solution. The content of at least one of the compounds of formulae (5) and (6) is preferably from 0.1 mass % to 50 mass %, more preferably from 0.1 mass % to 20 mass % with respect to the electrolytic solution.

In the compounds of formulae (5) and (6), the number of halogens may be one, preferably two, and may be three or more. In this way, when used in an electrochemical device such as a nonaqueous electrolyte battery, the ability to form a protective film on the electrode surface improves, and a stronger, more stable protective film can be formed to more effectively suppress the degradation reaction of the electrolytic solution.

Examples of the halogen-containing chain carbonate ester of formula (5) include fluoromethyl methyl carbonate, bis(fluoromethyl) carbonate, and difluoromethyl methyl carbonate. These may be used either alone or as a mixture of two or more.

Examples of the halogen-containing cyclic carbonate ester of formula (6) include 4-fluoro-1,3-dioxolan-2-one, 4-chloro-1,3-dioxolan-2-one, 4,5-difluoro-1,3-dioxolan-2-one, tetrafluoro-1,3-dioxolan-2-one, 4-chloro-5-fluoro-1,3-dioxolan-2-one, 4,5-dichloro-1,3-oxolane-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1-difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one, and 4-fluoro-4-methyl-1,3-dioxolan-2-one. These may be used either alone or as a mixture of two or more.

Of these, 4-fluoro-1,3-dioxolan-2-one, and 4,5-difluoro-1,3-dioxolan-2-one are preferred, and 4,5-difluoro-1,3-dioxolan-2-one is more preferred. The 4,5-difluoro-1,3-dioxolan-2-one is preferably a trans isomer, rather than a cis isomer, because it is more readily available, and provides high effects.

Compound of Formula (7)

The compound of formula (7) is lactone (cyclic carboxylic acid ester), sultone (cyclic sulfonic acid ester), or an acid anhydride. It is preferable that the electrolytic solution contain the compound of formula (7), including lactone, sultone (cyclic sulfonic acid ester), and an acid anhydride. In this way, the chemical stability of the electrolytic solution improves further. The content of the compound of formula (7) is preferably from 0.1 mass % to 3 mass % with respect to the electrolytic solution, because it provides even more improved effects.

Examples of the sultone include propanesultone and propenesultone. These may be used either alone or as a mixture of two or more. Propenesultone is more preferred. The sultone content in the solvent is preferably from 0.1 mass % to 3 mass % with respect to the electrolytic solution. In either case, high effects can be obtained.

Examples of the acid anhydrides include carboxylic acid anhydrides such as succinic acid anhydride, glutaric acid anhydride, and maleic acid anhydride; disulfonic acid anhydrides such as ethanedisulfonic acid anhydride, and propanedisulfonic acid anhydride; and anhydrides of carboxylic acid and sulfonic acid, such as sulfobenzoic acid anhydride, sulfopropionic acid anhydride, and sulfobutyric acid anhydride. Of these, succinic acid anhydride, and sulfobenzoic acid anhydride are preferred. These may be used either alone or as a mixture of two or more. The acid anhydride content in the solvent is preferably from 0.1 mass % to 3 mass %. In either case, high effects can be obtained.

Compound of Formula (8)

The compound of formula (8) is a compound with two carbonate esters. Examples include ethane-1,2-diyl dimethyl dicarbonate, ethane-1,2-diyl ethyl methyl dicarbonate, ethane-1,2-diyldiethyl dicarbonate, dimethyl(oxybis(ethane-2,1-diyl)) dicarbonate, ethylmethyl(oxybis(ethane-2,1-diyl)) dicarbonate, and diethyl(oxybis(ethane-2,1-diyl)) dicarbonate. These may be used either alone or as a mixture of two or more. The content of the compound of formula (8) in the solvent is preferably from 0.1 mass % to 3 mass % with respect to the electrolytic solution. In either case, high effects can be obtained.

Compound of Formula (9)

The compound of formula (9) is an aromatic carbonate ester. Examples include diphenyl carbonate, bis(4-methylphenyl) carbonate, and bis(pentafluorophenyl) carbonate. These may be used either alone or as a mixture of two or more.

The content of the compound of formula (9) in the solvent is preferably from 0.1 mass to 3 mass with respect to the electrolytic solution. In either case, high effects can be obtained.

Compound of Formula (10)

The compound of formula (10) is a compound with a nitrile group. It is preferable that the electrolytic solution contain the compound of formula (10), because it improves cycle characteristics. Examples of the compound of formula (10) include nitrile compounds, including mononitrile compounds such as acetonitrile, propionitrile, butanenitrile, valeronitrile, dodecanenitrile, acrylonitrile, and benzonitrile, and dinitrile compounds such as malononitrile, succinonitrile, glutaronitrile, adiponitrile, pimelonitrile, suberonitrile, azelanitrile, sebaconitrile, undecanedinitrile, dodecanedinitrile, and phthalonitrile. The content of the compound of formula (10) is preferably 0.1 mass to 10 mass %, more preferably 0.5 mass to 5 mass with respect to the electrolytic solution, because it provided improved effects.

Compounds of Formulae (11) and (12)

The compounds of formulae (11) and (12) are contained as electrolyte salts in the electrolytic solution. It is preferable that the electrolytic solution contain the compounds of formulae (11) and (12), because these compounds are capable of forming an interface protective coating. The contents of the compounds of formulae (11) and (12) are preferably 0.1 mass % to 10 mass % with respect to the electrolytic solution, because it provides improved effects.

Compound of Formula (13)

The compound of formula (13) is, for example, diethyl carbonate, or methyl propyl carbonate. The compound of formula (13) is contained as a nonaqueous solvent in the electrolytic solution. The content of the compound of formula (13) is preferably from 0.1 mass % to 10 mass %, more preferably 0.5 mass % to 5 mass % with respect to the electrolytic solution, because it provides improved effects.

Compound of Formula (14)

The compound of formula (14) is a chain carboxylic acid ester, and is contained, for example, as a nonaqueous solvent in the electrolytic solution. Examples of the chain carboxylic acid ester include methyl acetate, ethyl acetate, methyl propionate, ethyl propionate, methyl butyrate, methyl isobutyrate, methyl trimethylacetate, and ethyl trimethylacetate. The content of the compound of formula (14) is preferably from 0.1 mass % to 10 mass %, more preferably 0.5 mass % to 5 mass % with respect to the electrolytic solution, because it provides improved effects.

Other Nonaqueous Solvents and Other Electrolyte Salts

In addition to the compounds of formulae (1) to (14), the electrolytic solution may contain the nonaqueous solvents below, and/or electrolyte salts other than the compound of formula (1).

Nonaqueous Solvent

Examples of usable nonaqueous solvents include ethylene carbonate, propylene carbonate, butylene carbonate, dimethyl carbonate, ethyl methyl carbonate, γ-butyrolactone, γ-valerolactone, 1,2-dimethoxyethane, tetrahydrofuran, 2-methyltetrahydrofuran, tetrahydropyran, 1,3-dioxolan, 4-methyl-1,3-dioxolan, 1,3-dioxane, 1,4-dioxane, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. These nonaqueous solvents make it possible to provide excellent capacity, excellent cycle characteristics, and excellent storage characteristics in electrochemical devices, such as batteries, that use an electrolytic solution. These compounds may be used either alone or as a mixture of two or more.

Preferably, at least one selected from the group consisting of ethylene carbonate, propylene carbonate, dimethyl carbonate, diethyl carbonate (compound of formula (13)), and ethyl methyl carbonate is contained as a nonaqueous solvent, because it provides sufficient effects. In this case, it is preferable to use the high-viscosity (high-dielectric) solvent (for example, relative permittivity $\in \geq 30$) ethylene carbonate or propylene carbonate as a mixture with the low-viscosity solvent (for example, viscosity≤1 mPa·s) dimethyl carbonate, diethyl carbonate, or ethyl methyl carbonate. In this way, the dissociation and ion mobility of the electrolyte salt improve, and higher effects can be obtained.

It is also preferable to contain an aromatic compound as a nonaqueous solvent. Examples of the aromatic compound include halogenated benzene compounds such as chlorobenzene, chlorotoluene, and fluorobenzene; alkylated aromatic compounds such as tert-butylbenzene, tert-pentylbenzene, cyclohexylbenzene, hydrogenbiphenyl, and hydrogenated terphenyl. The alkyl group may be halogenated, and is preferably fluorinated. Examples of such aromatic compounds include trifluoromethoxybenzene. Other examples of aromatic compounds include optionally substituted anisoles. More specific examples of aromatic compounds include 2,4-difluoroanisole, and 2,2-difluorobenzodioxole.

Other Electrolyte Salts

In addition to the compound of formula (1) contained as an electrolyte salt, the nonaqueous electrolytic solution may contain electrolyte salts other than the compound of formula (1). For example, one or more light metal salts such as lithium salts are contained as other electrolyte salts. Examples of the lithium salts include lithium hexafluorophosphate, lithium tetrafluoroborate, lithium perchlorate, lithium hexafluoroarsenate, lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluoro silicate ($Li_2SiF_6$), lithium chloride (LiCl), and lithium bromide (LiBr). Of these, at least one selected from the group consisting of lithium hexafluorophosphate, lithium tetrafluoroborate, lithium perchlorate, and lithium hexafluoroarsenate is preferred, and lithium hexafluorophosphate is more preferred, because these compounds lower the resistance of the electrolytic solution. It is particularly preferable to use lithium tetrafluoroborate with lithium hexafluorophosphate, because it provides high effects.

It is preferable that the other electrolyte salts contain at least one of the compounds of formulae (15) to (17). In this way, higher effects can be obtained when used with compounds such as lithium hexafluorophosphate described above. R33 in formula (15) may be the same or different, as with R41 to R43 in formula (16), and R51 and R52 in formula (17).

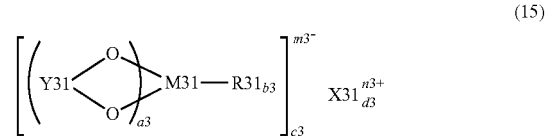

(15)

(In the formula, X31 is a group 1 or group 2 element of the long form periodic table, or aluminum. M31 is a transition metal element, or a group 13, group 14, or group 15 element of the long form periodic table. R31 is a halogen group. Y31 is —OC—R32-CO—, —OC—C(R33)$_2$-, or —OC—CO—. R32 is an alkylene group, a halogenated alkylene group, an arylene group, or a halogenated arylene group. R33 is an alkyl group, a halogenated alkyl group, an aryl group, or a halogenated aryl group. a3 is an integer of 1 to 4, b3 is 0, 2, or 4, and c3, d3, m3, and n3 are integers of 1 to 3.)

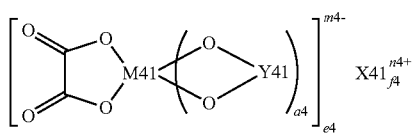
(16)

(In the formula, X41 is a group 1 or group 2 element of the long form periodic table. M41 is a transition metal element, or a group 13, group 14, or group 15 element of the long form periodic table. Y41 is —OC—(C(R41)$_2$)$_{b4}$-CO—, —(R43)$_2$C-(C(R42)$_2$)c4-CO—, —(R43)$_2$C—(C(R42)$_2$)$_c$-4-C(R43)$_2$—, —(R43)$_2$C—(C(R42)$_2$)$_c$-4-SO$_2$—, —O$_2$S—(C(R42)$_2$)$_d$-4-SO$_2$—, or OC—(C(R42)$_2$)$_d$-4-SO$_2$—, wherein R41 and R43 are hydrogen groups, alkyl groups, halogen groups, or halogenated alkyl groups, where at least one of R41 and R43 is a halogen group or a halogenated alkyl group. R42 is a hydrogen group, an alkyl group, a halogen group, or a halogenated alkyl group. a4, e4, and n4 are 1 or 2, b4 and d4 are integers of 1 to 4, c4 is an integer of 0 to 4, and f4 and m4 are integers of 1 to 3.)

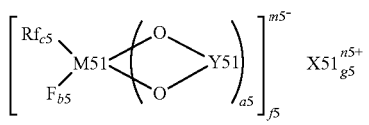
(17)

(In the formula, X51 is a group 1 or group 2 element of the long form periodic table. M51 is a transition metal element, or a group 13, group 14, or group 15 element of the long form periodic table. Rf is a fluorinated alkyl group of 1 to 10 carbon atoms, or a fluorinated aryl group of 1 to 10 carbon atoms. Y51 is —OC—(C(R51)$_2$)d5-CO—, —(R52)$_2$C—(C(R51)$_2$)d5-CO—, —(R52)$_2$C—(C(R51)$_2$)d5-C(R52)$_2$-, —(R52)$_2$C—(C(R51)$_2$)d5-SO$_2$—, —O$_2$S—(C(R51)$_2$)e5-SO$_2$—, or OC—(C(R51)$_2$)e5-SO$_2$—, wherein R51 is a hydrogen group, an alkyl group, a halogen group, or a halogenated alkyl group, and R52 is a hydrogen group, an alkyl group, a halogen group, or a halogenated alkyl group, where at least one of R51 and R52 is a halogen group or a halogenated alkyl group. a5, f5, and n5 are 1 or 2, b5, c5, and e5 are integers of 1 to 4, d5 is an integer of 0 to 4, and g5 and m5 are integers of 1 to 3.)

The group 1 element of the long form periodic table means hydrogen, lithium, sodium, potassium, rubidium, cesium, and francium. The group 2 element means beryllium, magnesium, calcium, strontium, barium, and radium. The group 13 element means boron, aluminum, gallium, indium, and thallium. The group 14 element means carbon, silicon, germanium, tin, and lead. The group 15 element means nitrogen, phosphorus, arsenic, antimony, and bismuth.

Examples of the compound of formula (15) include the compounds of formulae (18-1) to (18-6). Examples of the compound of formula (16) include the compounds of formulae (19-1) to formula (19-8). Examples of the compound of formula (17) include the compound of formula (20). The compound of formula (18-6) is preferred, because it provides high effects.

The compounds of formulae (15) to (17) are not limited to the compounds of formulae (18-1) to formula (18-6), formulae (19-1) to formula (19-8), and formula (20), as long as the compounds have the structures represented by formulae (15) to (17).

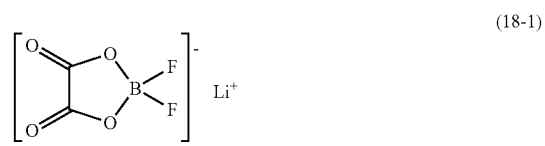
(18-1)

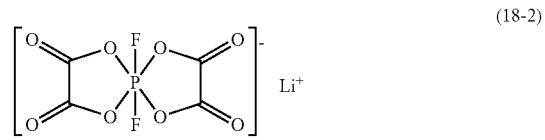
(18-2)

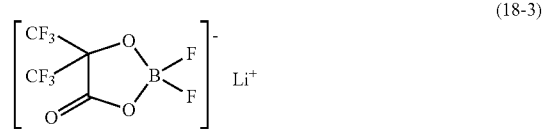
(18-3)

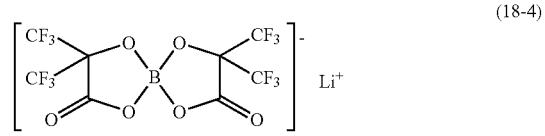
(18-4)

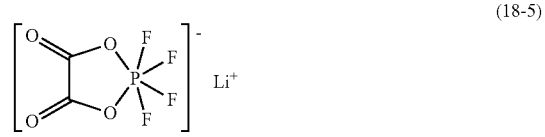
(18-5)

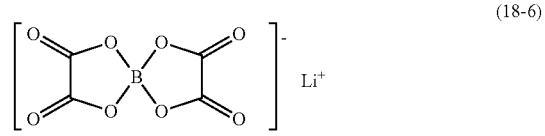
(18-6)

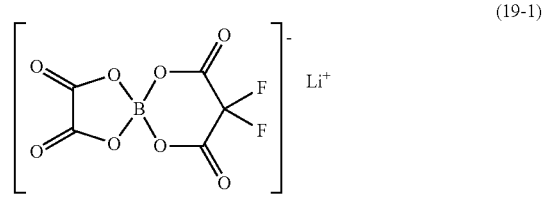
(19-1)

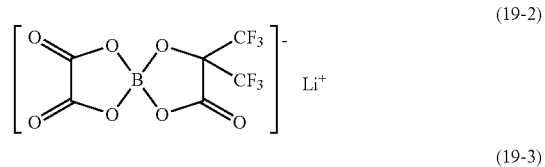
(19-2)

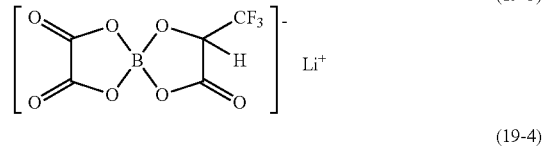
(19-3)

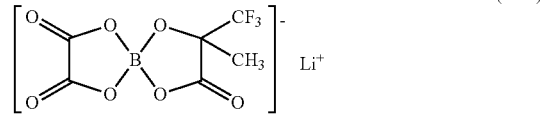
(19-4)

-continued

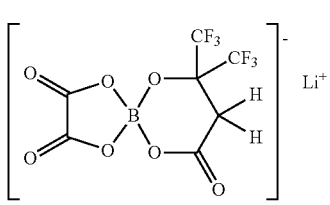
(19-5)

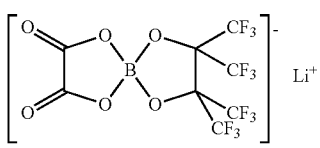
(19-6)

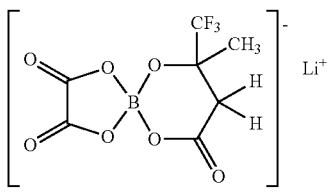
(19-7)

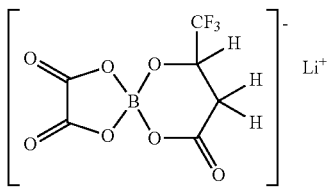
(19-8)

It is preferable that the other electrolyte salts contain at least one of the compounds of formulae (21) to (23). In this way, higher effects can be obtained when used with compounds such as lithium hexafluorophosphate. In formula (21), m and n may be the same or different, as with p, q, and r in formula (23).

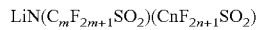
(21)

(m and n are integers of 1 or more.)

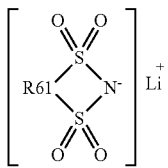
(22)

(R61 is a linear or branched perfluoroalkylene group of 2 to 4 carbon atoms.)

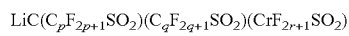
(23)

(p, q, and r are integers of 1 or more.)

Examples of the chain compound of formula (21) include lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$) (C$_2$F$_5$SO$_2$)), lithium (trifluoromethanesulfonyl)(heptafluoropropanesulfonyl)imide (LiN(CF$_3$SO$_2$) (C$_3$F$_7$SO$_2$)), and lithium (trifluoromethanesulfonyl)(nonafluorobutanesulfonyl)imide (LiN(CF$_3$SO$_2$) (C$_4$F$_9$SO$_2$)). These may be used either alone or as a mixture of two or more. Of these, lithium bis(trifluoromethanesulfonyl)imide is preferred, because it provides high effects.

Examples of the cyclic compound of formula (22) include a series of compounds represented by formulae (24-1) to (24-4), specifically, lithium 1,2-perfluoroethane disulfonylimide of formula (24-1), lithium 1,3-perfluoropropane disulfonylimide of formula (24-2), lithium 1,3-perfluorobutane disulfonylimide of formula (24-3), and lithium 1,4-perfluorobutane disulfonylimide of formula (24-4). These may be used either alone or as a mixture of two or more. Of these, lithium 1,3-perfluoropropane disulfonylimide is preferred, because it provides high effects.

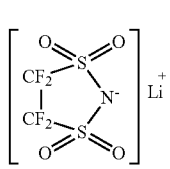
(24-1)

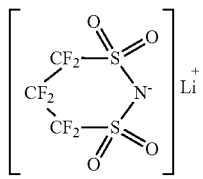
(24-2)

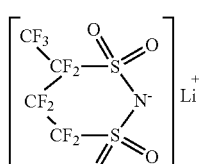
(24-3)

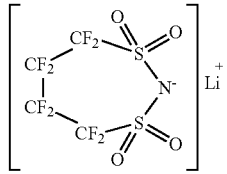
(24-4)

Examples of the chain compound of formula (21) include lithium tris(trifluoromethanesulfonyl)methide (LiC(CF$_3$SO$_2$)$_3$). The electrolyte salt content is preferably 0.3 mol/kg to 3.0 mol/kg with respect to the solvent. Ion conductivity may lower significantly outside this range.

The inherent viscosity of the solvent is preferably, for example, 10.0 mPa·s or less at 25° C., because it ensures the dissociation and ion mobility of the electrolyte salt. For the same reason, the inherent viscosity of the solvent dissolving the electrolyte salt (i.e., the inherent viscosity of the electrolytic solution) is preferably 10.0 mPa·s or less at 25° C.

First to fourth nonaqueous electrolyte batteries using the electrolytic solution are described below.

(1-2) First Nonaqueous Electrolyte Battery

Figure 2:
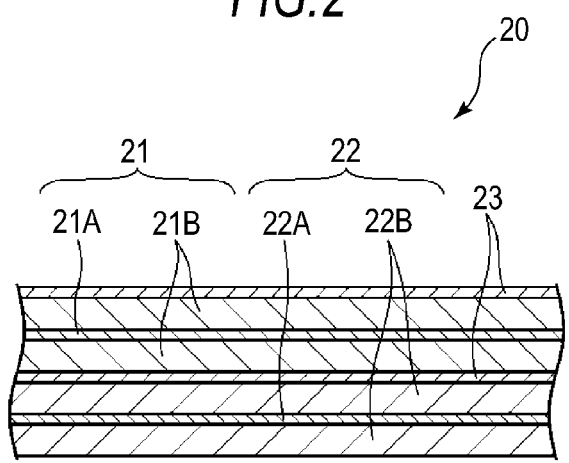
FIG. 2 is a partially magnified cross sectional view of a wound electrode unit shown in FIG. 1.

FIGS. 1 and 2 represent cross sectional configurations of a first nonaqueous electrolyte battery. FIG. 2 is a partially magnified view of a wound electrode unit 20 shown in FIG. 1. The nonaqueous electrolyte battery described here is, for example, a nonaqueous electrolyte secondary battery capable of charging and discharge, specifically, a lithium ion secondary battery in which, for example, the negative electrode capacity is represented by the storage and release of the electrode reaction substance lithium ions.

(Overall Configuration of Nonaqueous Electrolyte Battery)

The nonaqueous electrolyte battery is structured to include primarily a substantially hollow cylindrical battery canister 11, a wound electrode unit 20, and a pair of insulating plates 12 and 13. The wound electrode unit 20 and the insulating plates 12 and 13 are housed inside the cylindrical battery canister 11. The battery structure using such a battery canister 11 is called a cylindrical structure.

The battery canister 11 has, for example, a hollow structure with a closed end and an open end, and is configured from iron (Fe), aluminum (Al), or an alloy thereof. When the battery canister 11 is configured from iron, the surface of the battery canister 11 may be, for example, nickel (Ni) plated. The pair of insulating plates 12 and 13 is disposed on the both sides of the wound electrode unit 20, perpendicularly to the rolled surface.

The battery canister 11 is sealed with a battery lid 14 fastened to the open end of the battery canister 11 by swaging via a gasket 17, together with a safety valve mechanism 15 and a heat-sensitive resistive element (PTC: Positive Temperature Coefficient) 16. The battery lid 14 is formed using, for example, the same or similar materials used for the battery canister 11. The safety valve mechanism 15 and the heat-sensitive resistive element 16 are provided on the inner side of the battery lid 14. The safety valve mechanism 15 is electrically connected to the battery lid 14 via the heat-sensitive resistive element 16. The safety valve mechanism 15 cuts off the electrical connection between the battery lid 14 and the wound electrode unit 20 by the inversion of a disk plate 15A, when the inner pressure reaches a certain level as a result of internal shorting or external heat. The heat-sensitive resistive element 16 increases its resistance under elevated temperatures (restricts the current) to prevent abnormal heating due to high current. The gasket 17 is formed using, for example, insulating material, and is, for example, asphalt-coated.

The wound electrode unit 20 includes a positive electrode 21 and a negative electrode 22 laminated via a separator 23 and wound into a roll. A center pin 24 may be inserted at, for example, the center of the wound electrode unit 20. The positive electrode 21 of the wound electrode unit 20 is connected to a positive electrode lead 25 made of material such as aluminum, and the negative electrode 22 is connected to a negative electrode lead 26 made of material such as nickel. The positive electrode lead 25 is electrically connected to the battery lid 14 by, for example, being welded to the safety valve mechanism 15. The negative electrode lead 26 is electrically connected to the battery canister 11 by, for example, being welded thereto.

(Positive Electrode)

The positive electrode 21 is structured to include, for example, a positive electrode active material layer 21B provided on the both sides of a double-sided positive electrode collector 21A. The positive electrode active material layer 21B may be provided only on one side of the positive electrode collector 21A.

The positive electrode collector 21A is configured from materials, for example, such as aluminum, nickel, and stainless steel (SUS).

The positive electrode active material layer 21B includes positive electrode active material, which is one or more positive electrode materials capable of storing and releasing lithium ions. Other materials such as a binder and a conductive agent also may be contained, as required.

Lithium-containing compounds such as interlayer compounds containing, for example, lithium oxide, lithium phosphate, lithium sulfide, or a lithium-containing interlayer compound may be appropriately used as the positive electrode material capable of storing and releasing lithium, and these materials may be used as a mixture of two or more. Lithium-containing compounds containing lithium, a transition metal element, and oxygen (O) are preferably used to increase energy density. Examples of such lithium-containing compounds include a lithium composite oxide of formula (A) having a laminar rock salt-type structure, and a lithium composite phosphate of formula (B) having an olivine-type structure. The lithium-containing compound is preferably one containing at least one transition metal element selected from the group consisting of cobalt (Co), nickel (Ni), manganese (Mn), and iron (Fe). Examples of such lithium-containing compounds include a lithium composite oxide of formula (C), (D), or (E) having a laminar rock salt-type structure, a lithium composite oxide of formula (F) having a spinel-type structure, and a lithium composite phosphate of formula (G) having an olivine-type structure. Specific examples include $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), and $Li_eFePO_4$ (e≈1).

$$Li_pNi_{(1-q-r)}Mn_qM1_rO_{(2-y)}X_z \quad (A)$$

(In the formula, M1 represents at least one selected from group 2 to 15 elements, excluding nickel (Ni) and manganese (Mn). X represents at least one selected from group 16 and 17 elements, excluding oxygen (O). p, q, y, and z are values that fall within the ranges $0 \leq p \leq 1.5$, $0 \leq q \leq 1.0$, $0 \leq r \leq 1.0$, $-0.10 \leq y \leq 0.20$, and $0 \leq z \leq 0.2$.)

$$Li_aM2_bPO_4 \quad (B)$$

(In the formula, M2 represents at least one selected from group 2 to 15 elements. a and b are values that fall within the ranges $0 \leq a \leq 2.0$, and $0.5 \leq b \leq 2.0$.)

$$Li_fMn_{(1-g-h)}Ni_gM3_hO_{(2-j)}F_k \quad (C)$$

(In the formula, M3 represents at least one selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). f, g, h, j, and k are values that fall within the ranges $0.8 \leq f \leq 1.2$, $0 < g < 0.5$, $0 \leq h \leq 0.5$, $g+h<1$, $-0.1 \leq j \leq 0.2$, and $0 \leq k \leq 0.1$. Note that the lithium composition varies depending on the charge and discharge state, and the f value represents a value in the fully discharged state.)

$$Li_mNi_{(1-n)}M4_nO_{(2-p)}F_q \quad (D)$$

(In the formula, M4 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). m, n, p, and q are values that fall within the ranges $0.8 \leq m \leq 1.2$, $0.005 \leq n \leq 0.5$, $-0.1 \leq p \leq 0.2$, and $0 \leq q \leq 0.1$. Note that the lithium composition varies depending on the charge and discharge state, and the m value represents a value in the fully discharged state.)

$$Li_rCo_{(1-s)}M5_sO_{(2-t)}F_u \quad (E)$$

(In the formula, M5 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). r, s t, and u are values that fall within the ranges $0.8 \leq r \leq 1.2$, $0 \leq s < 0.5$, $-0.1 \leq t \leq 0.2$, and $0 \leq u \leq 0.1$. Note that the lithium composition varies depending on the charge and discharge state, and the r value represents a value in the fully discharged state.)

$$Li_vMn_{2-w}Mn_{2-w}M6_xO_xF_y \qquad (F)$$

(In the formula, M6 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). v, w, x, and y are values that fall within the ranges $0.9 \leq v \leq 1.1$, $0 \leq w \leq 0.6$, $3.7 \leq x \leq 4.1$, and $0 \leq y \leq 0.1$. Note that the lithium composition varies depending on the charge and discharge state, and the v value represents a value in the fully discharged state.)

$$Li_zM7PO_4 \qquad (G)$$

(In the formula, M7 represents at least one selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). z is a value that falls within the range $0.9 \leq z \leq 1.1$. Note that the lithium composition varies depending on the charge and discharge state, and the z value represents a value in the fully discharged state.)

(Insulating Layer)

An insulating layer may be formed on the particle surface of the lithium composite oxide. For example, ceramic particles may be used as insulating material, and a coating may be formed with the insulating material pulverized and mixed with the lithium composite oxide particles using, for example, a ball mill, a jet mill, a raikai mixer, or a pulverizer. Here, a dispersion medium or a solvent such as water may be used. Further, a coating may be formed by using a mechanochemical process such as mechanofusion, or by using a vapor-phase method such as sputtering, and chemical vapor deposition (CVD). Further, a sol-gel method may be used in which a precursor layer formed by dipping the material in an alkoxide solution of, for example, aluminum or silicon is calcined.

Examples of the ceramic used for the insulating layer include alumina, silica, magnesia, titania, and zirconia. Specific examples include $LiNbO_3$, LIPON ($Li_{3+y}PO_{4-x}N_x$), a group called a LISICON (Lithium-Super-Ion-Conductor), Thio-LISICON (for example, $Li_{3.25}Ge_{0.25}P_{0.75}S_4$), $Li_2S$ alone, $Li_2S-P_2S_5$, $Li_2S-SiS_2$, $Li_2S-GeS_2$, $Li_2S-B_2S_5$, $Li_2S-Al_2S_5$, and $Li_2O-Al_2O_3-TiO_2-P_2O_5$ (LATP).

Examples of the positive electrode material include oxides, disulfides, chalcogenides, and conductive polymers. Examples of the oxides include titanium oxide, vanadium oxide, and manganese dioxide. Examples of the disulfides include titanium disulfide, and molybdenum sulfide. Examples of the chalcogenides include niobium selenide. Examples of the conductive polymers include sulfur, polyaniline, and polythiophene.

The positive electrode material is not limited to those exemplified above. Further, the foregoing series of positive electrode materials may be used in any combination as a mixture of two or more.

Examples of the binder include synthetic rubbers such as styrene butadiene rubber, fluoro-rubber, and ethylene propylene diene, and polymer materials such as polyvinylidene fluoride. These may be used either alone or as a mixture of two or more.

Examples of the conductive agent include carbon materials such as graphite, carbon black, acetylene black, and Ketjen black. These may be used either alone or as a mixture of two or more. Materials such as metallic material and conductive polymers may be used as the positive electrode conductive agent, as long as the materials are conductive.

(Negative Electrode)

The negative electrode 22 is structured to include, for example, a negative electrode active material layer 22B provided on the both sides of a negative electrode collector 22A. The negative electrode active material layer 22B may be provided on only one side of the negative electrode collector 22A.

The negative electrode collector 22A is formed of materials, for example, such as copper, nickel, and stainless steel. Preferably, the surface of the negative electrode collector 22A is roughened. In this way, the adhesion of the negative electrode active material layer 22B to the negative electrode collector 22A can improve by the anchor effect. In this case, the surface of the negative electrode collector 22A may be roughened in at least a region facing the negative electrode active material layer 22B. For example, a method that forms fine particles by electrolysis treatment may be used as the roughing method. The electrolysis treatment is a method by which fine particles are formed on the surface of the negative electrode collector 22A to provide irregularities by electrolysis in an electrolysis vessel. The copper foil formed by electrolysis treatment, including a copper foil roughened by electrolysis treatment, is generally called an electrolytic copper foil.

In the negative electrode active material layer 22B, one or more negative electrode materials capable of storing and releasing lithium ions are contained as negative electrode active material. Other materials such as a binder and a conductive agent also may be contained, as required. Note that details of the binder and the conductive agent are, for example, the same as those described in conjunction with the positive electrode binder and the positive electrode conductive agent. In order to prevent, for example, accidental deposition of lithium metal during the charge and discharge, it is preferable in the negative electrode active material layer 22B that the negative electrode material have greater chargeable capacity compared to the discharge capacity of the positive electrode 21.

Carbon material is an example of the negative electrode material. Carbon materials undergo very little change in the crystalline structure during the storage and release of lithium ions, and can thus provide high energy density and excellent cycle characteristics. Carbon materials also function as a negative electrode conductive agent. Examples of carbon material include an easily graphitizable carbon, a non-graphitizable carbon having a (002) plane distance of 0.37 nm or more, and a graphite having a (002) plane distance of 0.34 nm or less. Specific examples include pyrolyzed carbons, cokes, glass-like carbon fibers, organic polymer compound calcined products, activated carbons, and carbon blacks. Cokes include pitch cokes, needle cokes, and petroleum cokes. The organic polymer compound calcined products refer to products obtained by calcining and carbonizing compounds such as phenol resin and furan resin at appropriate temperatures. The carbon material may be fibrous, spherical, granular, or scale-like in shape.

Other examples of the negative electrode material capable of storing and releasing lithium include materials capable of storing and releasing lithium, and that include one or more metallic elements and semi-metallic elements as constituting elements. In this way, high energy density can be obtained. The negative electrode material may include metallic elements or semi-metallic elements either alone or as an alloy or a compound, or may at least partially include one or more phases of these. As used herein, the "alloy" encompasses materials formed of two or more metallic elements, and materials formed of one or more metallic elements and one or more semi-metallic elements. Further, the "alloy" may include a non-metallic element. The structure may be a solid solution, a eutectic (eutectic mixture), or an intermetallic compound, or a mixture of two or more of these.

The metallic elements or semi-metallic elements may be, for example, metallic elements or semi-metallic elements capable of forming an alloy with lithium. Specific examples include magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). Materials that include at least one of these metallic elements and semi-metallic elements as a constituting element may be, for example, alloys or compounds of these metallic elements or semi-metallic elements. Specific examples include materials represented by the chemical formulae $Ma_sMb_tLi_u$ (s, t, and u are values that fall within the ranges s>0, t≥0, and u≥0), $Ma_gMc_gMd_r$ (p, q, and r are values that fall within the ranges p>0, q>0, and r≥0.). Ma represents at least one of metallic elements and semi-metallic elements capable of forming an alloy with lithium, and Mb represents at least one of metallic elements and semi-metallic elements, excluding lithium and Ma. Mc represents at least one of non-metallic elements, and Md represents at least one of metallic elements and semi-metallic elements, excluding Ma. These materials may be crystalline or amorphous.

The negative electrode material configured from metallic elements or semi-metallic elements capable of forming an alloy with lithium is preferably material that includes at least one of the group 14 metallic elements and the semi-metallic elements of the long form periodic table as a constituting element, particularly preferably material that includes at least one of silicon and tin as a constituting element, because these elements excel in storing and releasing lithium, and can thus provide high energy density.

For example, the negative electrode material that includes at least one of silicon and tin may be silicon, either alone or as an alloy or a compound, or may be tin, either alone or as an alloy or a compound, or may be material that at least partially includes one or more phases of these.

Examples of the silicon alloy include those containing at least one non-silicon second constituting element selected from the group consisting of tin, nickel, copper, iron, cobalt, manganese, zinc, indium, silver, titanium, germanium, bismuth, antimony (Sb), and chromium. Examples of the silicon compound include those containing, for example, oxygen or carbon (C), and the silicon compound may include the second constituting element above, in addition to silicon. Specific examples of the silicon alloy or compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $NSi_2$, $ZnSi_2$, SiC, $Si_3N_4$, $Si_2N_2O$, $SiO_v$ (0≤v≤2), and LiSiO.

Examples of the tin alloy include those containing at least one non-tin second constituting element selected from the group consisting of silicon, nickel, copper, iron, cobalt, manganese, zinc, indium, silver, titanium, germanium, bismuth, antimony, and chromium. Examples of the tin compound include those containing, for example, oxygen or carbon, and the tin compound may contain the second constituting element above, in addition to tin. Specific examples of the tin alloy or compound include $SnO_w$ (0<w≤2), $SnSiO_3$, LiSnO, and $Mg_2Sn$.

Preferably, the negative electrode material containing at least one of silicon and tin is one including, for example, tin as a first constituting element, and, additionally, second and third constituting elements. The second constituting element is at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon. The third constituting element is at least one selected from the group consisting of boron, carbon, aluminum, and phosphorus (P). Containing the second and third constituting elements improves cycle characteristics.

In particular, a SnCoC-containing material is preferred that contains tin, cobalt, and carbon as constituting elements, and in which the carbon content ranges from 9.9 mass to 29.7 mass %, and in which the proportion of the cobalt with respect to the total of tin and cobalt (Co/(Sn+Co)) ranges from 30 mass to 70 mass %. High energy density can be obtained in these composition ranges.

The SnCoC-containing material may contain other constituting elements, as required. Examples of other constituting elements include silicon, iron, nickel, chromium, indium, niobium, germanium, titanium, molybdenum, aluminum, phosphorus, gallium, and bismuth, which may be contained in a combination of two or more. In this way, higher effects can be obtained.

It is preferable that the SnCoC-containing material include a Sn-, Co-, and C-containing phase, and that this phase is a low-crystalline or amorphous phase. This phase is a reaction phase reactive to lithium, and provides excellent cycle characteristics. The half width of the diffraction peak obtained by the X-ray diffraction analysis of the phase is preferably 1.0° or more in terms of a diffraction angle 2θ, as measured with CuKα rays used as specific X-rays and at a sweep rate of 1°/min. In this way, the lithium is more smoothly stored and released, and the reactivity for the electrolyte weakens.

Whether the diffraction peak obtained by X-ray diffraction corresponds to the reaction phase reactive to lithium can easily be determined by comparing the X-ray diffraction charts before and after the electrochemical reaction with lithium. For example, the diffraction peak corresponds to the reaction phase reactive to lithium when there is a change in the diffraction peak position before and after the electrochemical reaction with lithium. In this case, for example, the diffraction peak of the low crystalline or amorphous reaction phase occurs at 2θ of 20° to 50°. It is considered that such a reaction phase includes, for example, the foregoing constituting elements, and mainly exists as a low crystalline or amorphous phase by the presence of carbon.

Note that the SnCoC-containing material may include a phase that contains each constituting element itself or a part of the constituting element, in addition to the low-crystalline or amorphous phase.

In the SnCoC-containing material, it is preferable that the constituting element carbon at least partially bind to the other constituting elements, namely, the metallic elements or semi-metallic elements. Bonding of the carbon with other elements suppresses agglomeration or crystallization of tin or other elements.

The state of element binding can be measured by, for example, X-ray photoelectron spectroscopy (XPS). XPS is a method whereby soft X-rays (Al-Kα rays or Mg-Kα rays are used in commercially available devices) are bombarded on a sample surface, and the kinetic energy of the photoelectrons ejected from the sample surface is measured to find the element composition in a region several nanometers from the sample surface, and the element binding state.

By first approximation, the binding energy of the element inner orbital electrons varies in a manner that correlates with the charge density on the element. For example, when there is a reduction in the charge density of the carbon element because of the interaction with the element nearby, the outer shell electrons such as the 2p electrons are reduced in number, and thus the 1s electrons of the carbon element are under a strong binding force from the shell. Specifically, the binding energy increases with decrease in the element charge density. In XPS, peaks shift toward higher energy regions when the binding energy increases.

In XPS, a peak of carbon is orbital (C1s) appears at 284.5 eV in the case of graphite in a device calibrated to produce a peak of the 4f orbital of a gold atom (Au4f) at 84.0 eV. The peak occurs at 284.8 eV in the case of surface-contaminating carbon. On the other hand, the C1s peak appears in a region below 284.5 eV when the charge density of the carbon element is high, as might occur when, for example, the carbon is binding to a more positive element than carbon. Specifically, when the carbon contained in the SnCoC-containing material is at least partially binding to the metallic elements or semi-metallic elements making up the other constituting elements, the peak of the C1s synthetic wave obtained for the SnCoC-containing material occurs in a region below 284.5 eV.

In the XPS measurement, it is preferable that the surface with the surface-contaminating carbon be lightly sputtered with the argon ion gun attached to the XPS device. Further, when the SnCoC-containing material to be measured is present in the negative electrode 22, the negative electrode 22 may be washed with a volatile solvent such as dimethyl carbonate after disassembling the nonaqueous electrolyte battery and taking out the negative electrode 22. Washing is performed to remove the low-volatile solvent and the electrolyte salt present on the surface of the negative electrode 22. Desirably, sampling is made in an inert atmosphere.

In the XPS measurement, for example, a C1s peak is used for the calibration of the spectrum energy axis. Because the surface of a substance is typically contaminated with carbon, the C1s peak of such surface-contaminating carbon at 284.8 eV is taken as the reference energy. In the XPS measurement, because the waveform of the C1s peak is obtained as the waveform that includes the peak of the surface-contaminating carbon and the peak of the carbon contained in the SnCoC-containing material, the peak of the surface-contaminating carbon and the peak of the carbon contained in the SnCoC-containing material are analyzed and separated by using, for example, commercially available software. In the waveform analysis, the position of the main peak on the lowest binding energy side is used as the reference energy (284.8 eV).

The SnCoC-containing material may be formed, for example, by melting a mixture of the raw material of each constituting element in a furnace such as an electric furnace, a high-frequency induction furnace, and an arc furnace, and solidifying the mixture. Exemplary methods of formation include atomization methods such as gas atomization, and water atomization, various rolling methods, and methods using mechanochemical reaction, such as mechanical alloying, and mechanical milling. Methods using mechanochemical reaction are preferred, because the SnCoC-containing material can have a low-crystalline or amorphous structure. Methods using mechanochemical reaction may use devices, for example, such as a planetary ball mill, and an attritor.

The raw materials may be a mixture of the constituting elements alone. However, it is preferable to use an alloy for some of the constituting elements other than carbon. Using such an alloy with carbon for synthesis by mechanical alloying produces a low-crystalline or amorphous structure, and shortens the reaction time. The raw materials may be in the form of a powder or an agglomerate.

Aside from the SnCoC-containing material, SnCoFeC-containing materials containing tin, cobalt, iron, and carbon as constituting elements are also preferable. The SnCoFeC-containing materials may have any compositions. For example, a composition with a low iron content is preferably 9.9 mass % to 29.7 mass % carbon, 0.3 mass % to 5.9 mass % iron, and 30 mass % to 70 mass % (Co/(Sn+Co)). Further, for example, a composition with a high iron content is preferably 11.9 mass to 29.7 mass % carbon, 26.4 mass % to 48.5 mass % ((Co+Fe)/(Sn+Co+Fe)), and 9.9 mass % to 79.5 mass % (Co/(Co+Fe)). High energy density can be obtained in these composition ranges. The crystallinity, the measurement method of the element binding state, and the forming method of the SnCoFeC-containing material are the same as those described in conjunction with the SnCoC-containing material.

The negative electrode active material layer 22B in which at least partially contains silicon (either alone or as an alloy or a compound), tin (either alone or as an alloy or a compound), or one or more phases of these is used as a negative electrode material capable of storing and releasing lithium is formed by using, for example, a vapor-phase method, a liquid-phase method, a spray method, a coating method, or a calcining method, either alone or in a combination of two or more. In this case, it is preferable that the negative electrode collector 22A and the negative electrode active material layer 22B form an alloy in at least part of the interface. Specifically, the constituting elements of the negative electrode collector 22A may diffuse into the negative electrode active material layer 22B at the interface, or the constituting elements of the negative electrode active material layer 22B may diffuse into the negative electrode collector 22A at the interface. Further, both the constituting elements of these layers may diffuse into the other layer at the interface. In this way, destruction due to the expansion and contraction of the negative electrode active material layer 22B during the charge and discharge can be suppressed, and the electron conductivity between the negative electrode collector 22A and the negative electrode active material layer 22B can be improved.

The vapor-phase method may be a physical deposition method or a chemical deposition method, specifically, for example, a vacuum vapor deposition method, a sputtering method, an ion plating method, a laser abrasion method, a chemical vapor deposition (CVD) method, or a plasma chemical vapor deposition method. The liquid-phase method may be performed by using known methods such as electrolytic plating, and non-electrolytic plating. The coating method is a method in which, for example, a particulate negative electrode active material is mixed with other materials such as a binder, and dispersed in a solvent for application. The calcining method is a method that involves, for example, a heat treatment performed at a temperature higher than the melting point of the binder or the like after the coating method. The calcining method may be performed by using known methods, for example, such as an atmospheric calcining method, a reactive calcining method, and a hot-press calcining method.

The negative electrode material capable of storing and releasing lithium may be, for example, a metal oxide or a polymer compound capable of storing and releasing lithium. Examples of the metal oxide include lithium titanium oxides containing titanium and lithium (such as lithium titanate; $Li_4Ti_5O_{12}$), iron oxides, ruthenium oxides, and molybdenum oxides. Examples of the polymer compound include polyacetylene, polyaniline, and polypyrrole.

The negative electrode material capable of storing and releasing lithium is not limited to these. Further, the series of negative electrode materials exemplified above may be used in any combination of two or more.

The negative electrode active material using the foregoing negative electrode materials exists as particles. Specifically, the negative electrode active material layer 22B includes a plurality of negative electrode active material particles, and the negative electrode active material particles are formed by using, for example, the vapor-phase method. The negative electrode active material particles may be formed by using methods other than the vapor-phase method.

When the negative electrode active material particles are formed by a deposition method such as a vapor-phase method, the negative electrode active material particles may have a monolayer structure formed after a single deposition step, or a multilayer structure formed after a plurality of deposition steps. However, when the negative electrode active material particles are formed by using a vapor deposition method that involves high temperature for the deposition, the negative electrode active material particles preferably have a multilayer structure. By dividing the deposition step of the negative electrode material (the negative electrode material is successively deposited in thin layers), the negative electrode collector 22A is exposed to high temperature for a shorter time period than in a single deposition step, and is less likely to receive thermal damage.

The negative electrode active material particles grow, for example, from the surface of the negative electrode collector 22A in a direction along the thickness of the negative electrode active material layer 22B, and is joined to the negative electrode collector 22A at the base. In this case, the negative electrode active material particles are preferably formed by using the vapor-phase method, and form an alloy in at least part of the interface with the negative electrode collector 22A. More specifically, the constituting elements of the negative electrode collector 22A may diffuse into the negative electrode active material particles at the interface, or the constituting elements of the negative electrode active material particles may diffuse into the negative electrode collector 22A at the interface. Further, both the constituting elements of these layers may diffuse into the other at the interface.

It is particularly preferable that the negative electrode active material layer 22B have an oxide-containing film coating the surface of the negative electrode active material particles (region in contact with the electrolytic solution), as required. The oxide-containing film serves as a protective film against the electrolytic solution, and suppresses the degradation reaction of the electrolytic solution even after the repeated charge and discharge. In this way, cycle characteristics can be improved. The oxide-containing film may cover the surface of the negative electrode active material particles either partially or entirely.

The oxide-containing film contains an oxide of a metallic element or semi-metallic element. Examples of the oxide of a metallic element or semi-metallic element include oxides of aluminum, silicon, zinc, germanium, and tin. The oxide-containing film contains preferably at least one oxide selected from the group consisting of silicon oxide, germanium oxide, and tin oxide, particularly preferably an oxide of silicon. This makes it easier to coat the whole surface of the negative electrode active material particles, and an excellent protective function can be obtained. The oxide-containing film may contain oxides other than those exemplified above.

The oxide-containing film is formed by using one or more methods, for example, such as a vapor-phase method, and a liquid-phase method. Examples of the vapor-phase method include a vapor deposition method, a sputtering method, and a CVD method. Examples of the liquid-phase method include a liquid phase deposition method, a sol-gel method, a polysilazane method, an electrodeposition method, a coating method, and a dip coating method. The liquid-phase method is more preferred, of which a liquid phase deposition method is more preferred, because it enables the negative electrode active material particles to be easily coated over a wide range. In the liquid phase deposition method, the fluoride ions from the fluoride complex of the metallic element or semi-metallic element are captured by an anion capturing agent in a solution that contains the fluoride complex and the anion capturing agent dissolved as a species that allows the fluoride ions to be easily coordinated, and in this way the metallic element or semi-metallic element oxides are deposited to coat the surface of the negative electrode active material particles. The oxide-containing film is formed after water washing and drying.

The negative electrode active material layer 22B preferably includes a metallic material that does not form an alloy with the electrode reaction substance, as required, in a space between or within the negative electrode active material particles. In this way, the metallic material binds the negative electrode active material particles together, and the presence of the metallic material in the space suppresses the expansion and contraction of the negative electrode active material layer 22B to improve cycle characteristics.

In the metallic material, for example, a metallic element that does not form an alloy with lithium is contained as a constituting element. The metallic element may be, for example, at least one selected from the group consisting of iron, cobalt, nickel, zinc, and copper, and is preferably cobalt. In this way, the metallic material easily enters the space, and provides an excellent bonding effect. The metallic material may contain metallic elements other than those exemplified above. As used herein, "metallic material" encompasses a wide range of concept, from elements alone to alloys, and to metal compounds. The metallic material is formed, for example, by using a vapor-phase method or a liquid-phase method. Liquid-phase methods such as electrolytic plating and non-electrolytic plating are preferred, of which electrolytic plating is more preferred. In this way, the metallic material can easily enter the space, and can be formed in a shorter time period. The negative electrode active material layer 22B may include one of or both of the oxide-containing film and the metallic material. Preferably, both are contained to improve cycle characteristics.

Figure 3:
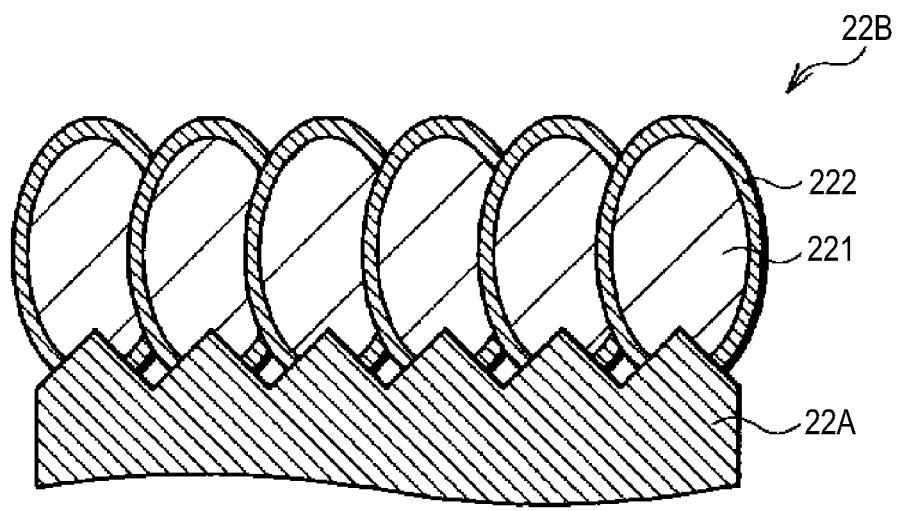
FIG. 3 is a cross sectional view schematically illustrating a configuration of a negative electrode shown in FIG. 2.
Figure 4:
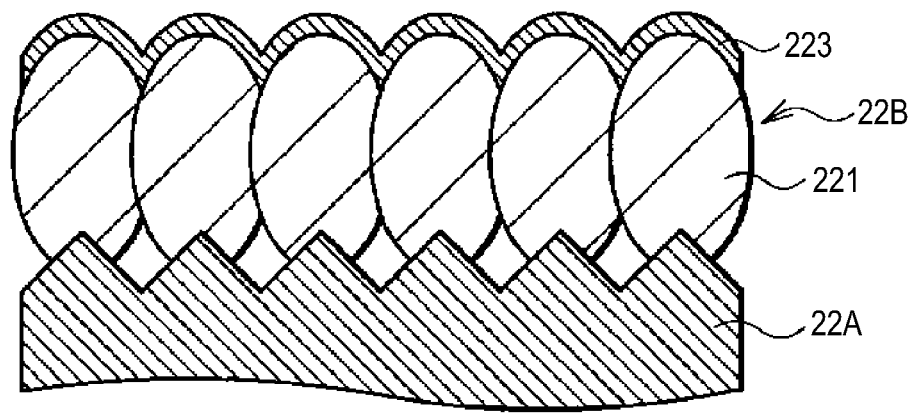
FIG. 4 is a cross sectional view schematically illustrating another configuration of the negative electrode shown in FIG. 2.

A specific configuration of the negative electrode 22 is described below with reference to FIGS. 3 to 6. First, the negative electrode active material layer 22B is described as having a plurality of negative electrode active material particles and the oxide-containing film. FIG. 3 schematically illustrates a cross sectional structure of the negative electrode 22, and FIG. 4 schematically illustrates a cross sectional structure of a negative electrode of a reference example. In FIGS. 3 and 4, the negative electrode active material particles have a monolayer structure.

In the negative electrode 22 with the negative electrode active material layer 22B having a plurality of negative electrode active material particles and the oxide-containing film, for example, depositing negative electrode material on the negative electrode collector 22A by using a vapor-phase method such as a vapor deposition method forms a plurality of negative electrode active material particles 221 on the negative electrode collector 22A, as illustrated in FIG. 3. In this case, in the presence of a plurality of projections (for example, fine particles formed by electrolysis treatment) on the roughened surface of the negative electrode collector 22A, the negative electrode active material particles 221 grow from each projection along the thickness direction. The negative electrode active material particles 221 are thus arrayed on the negative electrode collector 22A, and joined to the surface of the negative electrode collector 22A at the base. When an oxide-containing film 222 is subsequently formed on the surface of the negative electrode active material particles 221 by using, for example, a liquid-phase method such as a liquid phase deposition method, the oxide-containing film 222 coats the negative electrode active material particles 221 over substantially the entire surface, coating the negative electrode active material particles 221 over a wide range from the top to the base. The coating formed over a wide range by the oxide-containing film 222 is the characteristic of forming the oxide-containing film 222 by using a liquid-phase method. Specifically, the coating formed by the oxide-containing film 222 by using a liquid-phase method covers the negative electrode active material particles 221 not only at the top but down to the base, coating the negative electrode active material particles 221 with the oxide-containing film 222 all the way down to the base.

In contrast, in the negative electrode of the reference example, for example, an oxide-containing film 223 formed in a similar fashion by a vapor-phase method after forming a plurality of negative electrode active material particles 221 by using a vapor-phase method coats only the top of the negative electrode active material particles 221, as illustrated in FIG. 4. The narrow coating formed by the oxide-containing film 223 is the characteristic of forming the oxide-containing film 223 by using a vapor-phase method. Specifically, the coating formed by the oxide-containing film 223 formed by using the vapor-phase method covers only the top of the negative electrode active material particles 221 and does not cover the base, and the oxide-containing film 223 does not coat the negative electrode active material particles 221 all the way down to the base.

Figure 5A:
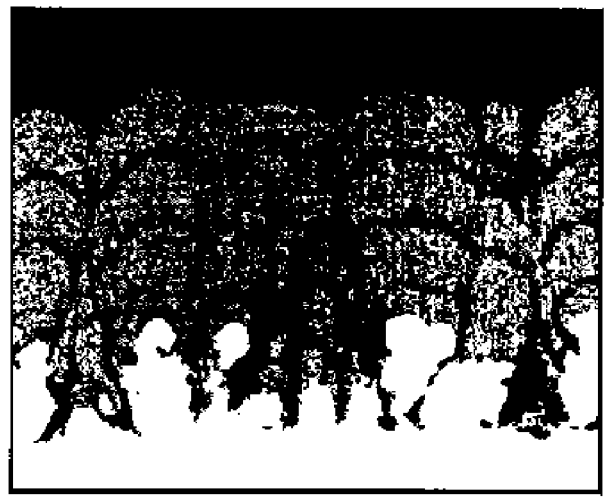
FIGS. 5A and 5B are a SEM micrograph and a schematic diagram, respectively, of a cross section structure of the negative electrode shown in FIG. 2.
Figure 5B:
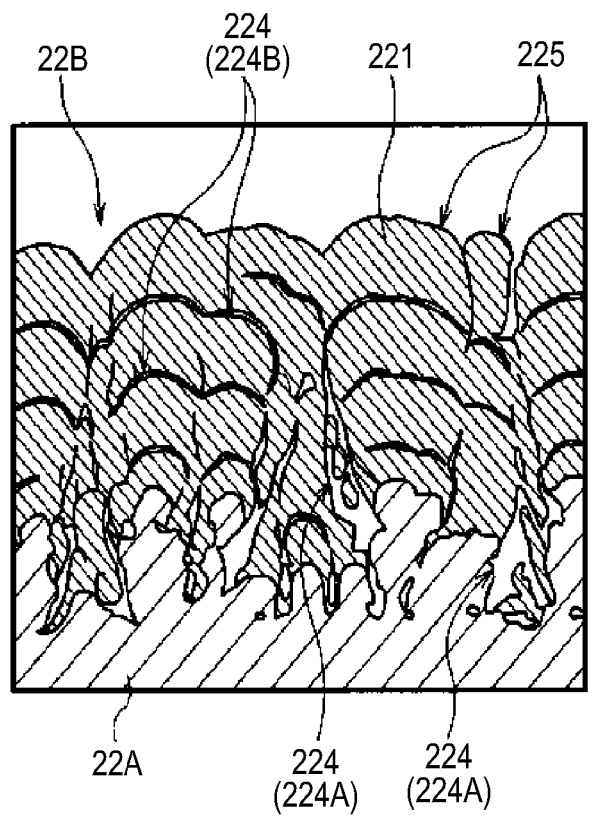

Referring to FIG. 3, the negative electrode active material layer 22B is described as being formed by using a vapor-phase method. However, the oxide-containing film is also formed so as to cover substantially the whole surface of the negative electrode active material particles when the negative electrode active material layer 22B is formed by using a method such as a sinter method. In the following, the negative electrode active material layer 22B is described as having the negative electrode active material particles, and a metallic material that does not form an alloy with the electrode reaction substance. FIGS. 5A and 5B represent a magnified cross sectional structure of the negative electrode 22. FIG. 5A is a scanning electron micrograph (SEM; secondary electron image). FIG. 5B is a schematic diagram of the SEM image shown in FIG. 5A. The negative electrode active material particles 221 shown in FIGS. 5A and 5B have a multilayer structure within the particles.

When the negative electrode active material particles 221 have a multilayer structure, a plurality of spaces 224 occurs in the negative electrode active material layer 22B because of the array structure, the multilayer structure, and the surface structure of the negative electrode active material particles 221. Broadly, the spaces 224 include two different types of spaces, 224A and 224B, categorized according to the cause of the space. The space 224A occurs between adjacent negative electrode active material particles 221, whereas the space 224B occurs between layers of the negative electrode active material particles 221.

Note that voids 225 may occur at the exposed surface (outermost surface) of the negative electrode active material particles 221. The voids 225 occur between whisker-like fine projections (not illustrated) as these projections occur on the surface of the negative electrode active material particles 221. The voids 225 may occur over the whole exposed surface, or only in a part of the exposed surface of the negative electrode active material particles 221. However, because the whisker-like projections occur on the surface of the negative electrode active material particles 221 every time these particles 221 are formed, the voids 225 may occur at each layer of the negative electrode active material particles 221, in addition to the exposed surface.

Figure 6A:
FIGS. 6A and 6B are a SEM micrograph and a schematic diagram, respectively, of a cross section structure of the negative electrode shown in FIG. 2.
Figure 6B:
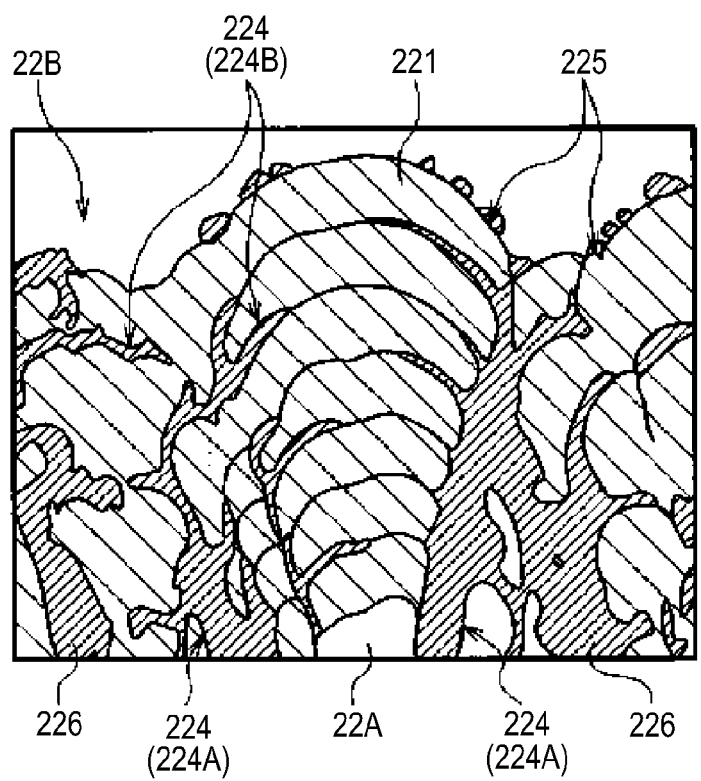

FIGS. 6A and 6B represent another cross sectional structure of the negative electrode 22, corresponding to FIGS. 5A and 5B, respectively. In the spaces 224A and 224B, the negative electrode active material layer 22B has a metallic material 226 that does not form an alloy with the electrode reaction substance. In this case, the metallic material 226 may be present in at least one of the spaces 224A and 224B. However, the metallic material 226 is preferably present in both of the spaces 224A and 224B, because it provides higher effects.

The metallic material 226 moves into the space 224A between the adjacent negative electrode active material particles 221. Specifically, when the negative electrode active material particles 221 are formed by using a method such as a vapor-phase method, the negative electrode active material particles 221 grow from each projection on the surface of the negative electrode collector 22A, and thus create the space 224A between the adjacent negative electrode active material particles 221. The spaces 224A may lower the adhesion of the negative electrode active material layer 22B, and thus the metallic material 226 is charged into the space 224A to improve adhesion. In this case, the space 224A should preferably be filled as much as possible, though it may be sufficient to fill only a part of the space 224A. In this way, the adhesion of the negative electrode active material layer 22B can further improve. The charged amount of the metallic material 226 is preferably 20% or more, more preferably 40% or more, further preferably 800 or more.

The metallic material 226 also moves into the space 224B inside the negative electrode active material particles 221. Specifically, when the negative electrode active material particles 221 have a multilayer structure, the space 224B occurs at each layer. As with the case of the space 224A, the space 224B may lower the adhesion of the negative electrode active material layer 22B, and is thus filled with the metallic material 226 to improve adhesion. In this case, the space 224B should preferably be filled as much as possible, though it may be sufficient to fill only a part of the space 224B. In this way, the adhesion of the negative electrode active material layer 22B can further improve.

In the negative electrode active material layer 22B, the metallic material 226 may be present in the voids 225, in order to prevent the whisker-like fine projections (not illustrated) generating on the outermost exposed surface of the negative electrode active material particles 221 from adversely affecting the performance of the nonaqueous electrolyte battery. Specifically, whisker-like fine projections occur on the surface when the negative electrode active material particles 221 are formed by using a method such as a vapor-phase method, and as a result the voids 225 occur between the projections. The voids 225 increase the surface area of the negative electrode active material particles 221, and thus increase the amount of the irreversible coating formed on the surface. This may slow the progress of the electrode reaction (charge and discharge reaction). The voids 225 are thus filled with the metallic material 226 to suppress deterioration of the progress of the electrode reaction. In this case, the voids 225 should preferably be filled as much as possible, though it may be sufficient to fill only a part of the voids 225. This makes it possible to more effectively suppress the deterioration of the progress of electrode reaction. Referring to FIGS. 6A and 6B, the presence of the metallic material 226 scattered over the surface on the uppermost layer of the negative electrode active material particles 221 means that the fine projections are present at these locations. It is not necessarily required that the metallic material 226 is scattered over the surface of the negative electrode active material particles 221, and the metallic material 226 may coat the whole surface.

The metallic material 226 moved into the space 224B also functions to fill the voids 225 at each layer. Specifically, when the negative electrode material is deposited multiple times, the fine projections occur on the surface of the negative electrode active material particles 221 every time the negative electrode material is deposited. Thus, the metallic material 226 fills not only the space 224B of each layer, but the voids 225 at each layer.

In FIGS. 5A and 5B and FIGS. 6A and 6B, the negative electrode active material particles 221 is described as having a multilayer structure, and the spaces 224A and 224B are described as both being present in the negative electrode active material layer 22B. Accordingly, the negative electrode active material layer 22B has the metallic material 226 in the spaces 224A and 224B. On the other hand, when the negative electrode active material particles 221 have a monolayer structure, and when only the space 224A is present in the negative electrode active material layer 22B, the negative electrode active material layer 22B has the metallic material 226 only in the space 224A. The voids 225 are present in both of these cases, and thus the metallic material 226 is present in the voids 225 in either case.

(Separator)

The separator 23 is provided to isolate the positive electrode 21 and the negative electrode 22 from each other, and allows for passage of lithium ions while preventing current shorting caused by contacting of the electrodes. The separator 23 may be, for example, a porous film having an average pore diameter of about 5 μm or less. Specific examples include a porous film of synthetic resin such as polytetrafluoroethylene, polypropylene, and polyethylene; a ceramic porous film; and a laminate of two or more of these porous films. A polyolefin porous film is preferred for its excellent shorting preventing effect, and for its shutdown effect to improve the safety of the nonaqueous electrolyte battery. Polyethylene is particularly preferred for its ability to exhibit the shutdown effect in a temperature range of from 100° C. to 160° C., and for its excellent electrochemical stability. Polypropylene also may be preferably used. Other resins also may be used as copolymerization products or mixtures with polyethylene or polypropylene, provided that the resins have chemical stability. The separator 23 is impregnated with the liquid electrolyte electrolytic solution.

(Insulating Layer)

The insulating layer may be formed between the separator 23 and the negative electrode 22, though not illustrated. The insulating layer also may be formed between the separator 23 and the negative electrode 22, and between the separator 23 and the positive electrode 21. Further, the insulating layer may be formed between the separator 23 and the positive electrode 21.

The insulating layer is, for example, a porous film that contains insulating material ceramic particles, and a binder. Examples of the ceramic include alumina, silica, magnesia, titania, zirconia, $LiNbO_3$, LIPON ($Li_{3+y}PO_{4-x}N_x$), a group called a LISICON (Lithium-Super-Ion-Conductor), Thio-LISICON (for example, $Li_{3.25}Ge_{0.25}P_{0.75}S_4$), $Li_2S$ alone, $Li_2S$—$P_2S_5$, $Li_2S$—$SiS_2$, $Li_2S$—$GeS_2$, $Li_2S$—$B_2S_5$, $Li_2S$—$Al_2S_5$, and $Li_2O$—$Al_2O_3$—$TiO_2$—$P_2O_5$ (LATP). Examples of the binder include polymer compounds such as polyvinylidene fluoride.

The insulating layer may be formed, for example, as follows. For example, ceramic particles and a binder are diluted with a solvent such as N-methyl-2-pyrrolidone to prepare a mixture. The negative electrode is then dipped in the mixture, and appropriately subjected to a pressurization treatment to adjust the thickness. The solvent is then removed by drying to obtain the insulating layer.

The insulating layer also may be formed, for example, as follows. Ceramic particles and a binder are diluted with a solvent such as N-methyl-2-pyrrolidone to prepare a mixture. A separator such as a polyolefin separator is then dipped in the mixture. The solvent, for example, N-methyl-2-pyrrolidone, is then removed with water. After drying, the insulating layer is formed on the both surfaces of the separator.

[Operation of Nonaqueous Electrolyte Battery]

In the nonaqueous electrolyte battery, for example, the lithium ions are released from the positive electrode 21 while charging, and stored in the negative electrode 22 via the electrolytic solution impregnating the separator 23. During the discharge, for example, the lithium ions are released from the negative electrode 22, and stored in the positive electrode 21 via the electrolytic solution impregnating the separator 23.

The secondary battery may be designed so that the open circuit voltage (i.e., battery voltage) in the fully charged state ranges from, for example, 3.60 V to 6.00 V, preferably 4.25 V to 6.00 V, further preferably 4.30 V to 4.55 V. Further, the amount of released lithium per unit mass increases in a battery that uses, for example, a Ni- or Co-containing laminar rock salt type lithium composite oxide as the positive electrode active material, and in which the fully charged open circuit voltage is 4.25 V or more, compared with a battery using the same positive electrode active material and having a fully charged open circuit voltage of 4.20 V. Thus, the amounts of the positive electrode active material and the negative electrode active material are adjusted taking this into account. In this way, high energy density can be obtained.

[Nonaqueous Electrolyte Battery Producing Method]

The nonaqueous electrolyte battery is produced, for example, according to the following procedures.

The positive electrode 21 is fabricated first by mixing the positive electrode active material with optional materials such as a binder and a conductive agent to provide a positive electrode mixture. The positive electrode mixture is then dispersed in an organic solvent or the like to obtain a paste-like positive electrode mixture slurry. The positive electrode mixture slurry is evenly applied on the both sides of the positive electrode collector 21A, and dried to form the positive electrode active material layer 21B. Finally, the positive electrode active material layer 21B is compression molded with a roller press machine or the like while being heated as required. The compression molding may be repeated more than once.

The negative electrode 22 is fabricated using the same procedure used for the positive electrode 21. Specifically, the negative electrode active material is mixed with optional materials such as a binder and a conductive agent to provide a negative electrode mixture, which is then dispersed in an organic solvent to obtain a paste-like negative electrode mixture slurry. The negative electrode mixture slurry is then evenly applied to the both sides of the negative electrode collector 22A to form the negative electrode active material layer 22B. The negative electrode active material layer 22B is then compression molded.

The negative electrode 22 may be fabricated using different procedures from the procedures used for the positive electrode 21. In this case, the negative electrode material is first deposited on the both sides of the negative electrode collector 22A by using a vapor-phase method such as a vapor deposition method to form negative electrode active material particles. Then, an oxide-containing film is formed by using a liquid-phase method such as a liquid-phase deposition method, as required, and/or a metallic material is formed by using a liquid-phase method such as electrolytic plating to form the negative electrode active material layer 22B.

Finally, the nonaqueous electrolyte battery is assembled with the positive electrode 21 and the negative electrode 22. First, the positive electrode lead 25 is attached to the positive electrode collector 21A, and the negative electrode lead 26 to the negative electrode collector 22A, by using a method such as welding. The positive electrode 21 and the negative electrode 22 are then laminated via the separator 23 and the laminate is wound into a roll to fabricate the wound electrode unit 20. The center pin 24 is inserted at the center of the wound electrode unit 20. Thereafter, the wound electrode unit 20 is housed inside the battery canister 11 with interposed between the insulating plates 12 and 13. Here, the positive electrode lead 25 and the negative electrode lead 26 are attached to the safety valve mechanism 15 and the battery canister 11, respectively, at the leading ends, using a method such as welding. Then, the electrolytic solution is injected into the battery canister 11 to impregnate the separator 23 with the electrolytic solution. Finally, the battery lid 14, the safety valve mechanism 15, and the heat-sensitive resistive element 16 are swaged to the open end of the battery canister via the gasket 17. This completes the nonaqueous electrolyte battery represented in FIG. 1 to FIGS. 6A and 6B.

[Effects of Nonaqueous Electrolyte Battery]

The nonaqueous electrolyte battery of the embodiment of the present technology including a ceramic-containing insulating layer can improve safety. However, the nonaqueous electrolyte battery including a ceramic-containing insulating layer may possibly undergo deterioration of battery characteristics in a low temperature environment. Such deterioration of battery characteristics in a low temperature environment becomes prominent when the electrolytic solution contains additives, such as those represented by formulae (2) to (14), that form a coating on the electrodes. This is believed to be due to the hydroxyl group present on the surface of the ceramic particles preventing movement of the lithium ions. In the present technology, on the other hand, the electrolytic solution contains the compound (imide salt) of formula (1). It is believed that this will cause the imide compound created by removing the terminal of the imide salt of formula (1) contained in the electrolytic solution to react with the hydroxyl group on the surface of the ceramic particles (for example, alumina) contained in the insulating layer, and produces a —N—Li— group on the ceramic particle surface. Specifically, it is believed that the terminal $SO_2$—F of the imide salt reacts with the surface OH group of the ceramic particles, and produces a F—$SO_2$—N—$SO_2$—O-alumina particle bond over the particles surface. The desirable coating formed on the ceramic particle surface not only improves ion conductivity, but enables the negative electrode coating to be modified. Capacity deterioration during the low temperature cycle can thus be suppressed even with the ceramic particle insulating layer and the coating-forming additives used together.

(1-3) Second Nonaqueous Electrolyte Battery

[Configuration of Nonaqueous Electrolyte Battery]

A second nonaqueous electrolyte battery is a lithium metal secondary battery in which the negative electrode capacity is represented by the deposition and dissolution of the lithium metal. The nonaqueous electrolyte battery has the same configuration as the first nonaqueous electrolyte battery, and is produced by using the same procedures used for the first nonaqueous electrolyte battery, except that the negative electrode active material layer 22B is configured from lithium metal.

The nonaqueous electrolyte battery uses lithium metal as the negative electrode active material, and can thus provide higher energy density. The negative electrode active material layer 22B may be present already at the time of the assembly, or may be configured from the lithium metal deposited during the charging process after the assembly. Further, the negative electrode active material layer 22B may be used as a collector, and the negative electrode collector 22A may be omitted.

[Operation of Nonaqueous Electrolyte Battery]

In the nonaqueous electrolyte battery, for example, the lithium ions are released from the positive electrode 21 while charging, and deposit as lithium metal on the surface of the negative electrode collector 22A via the electrolytic solution impregnating the separator 23. During the discharge, for example, the lithium metal dissolves out as lithium ions from the negative electrode active material layer 22B, and is stored in the positive electrode 21 via the electrolytic solution impregnating the separator 23.

The second nonaqueous electrolyte battery in which the capacity of the negative electrode 22 is represented by the deposition and dissolution of the lithium metal includes the electrolytic solution. Thus, low temperature cycle characteristics can be improved by the same effect as that of the first nonaqueous electrolyte battery. Other effects of the nonaqueous electrolyte battery are also as described for the first nonaqueous electrolyte battery.

(1-4) Third Nonaqueous Electrolyte Battery

Figure 7:
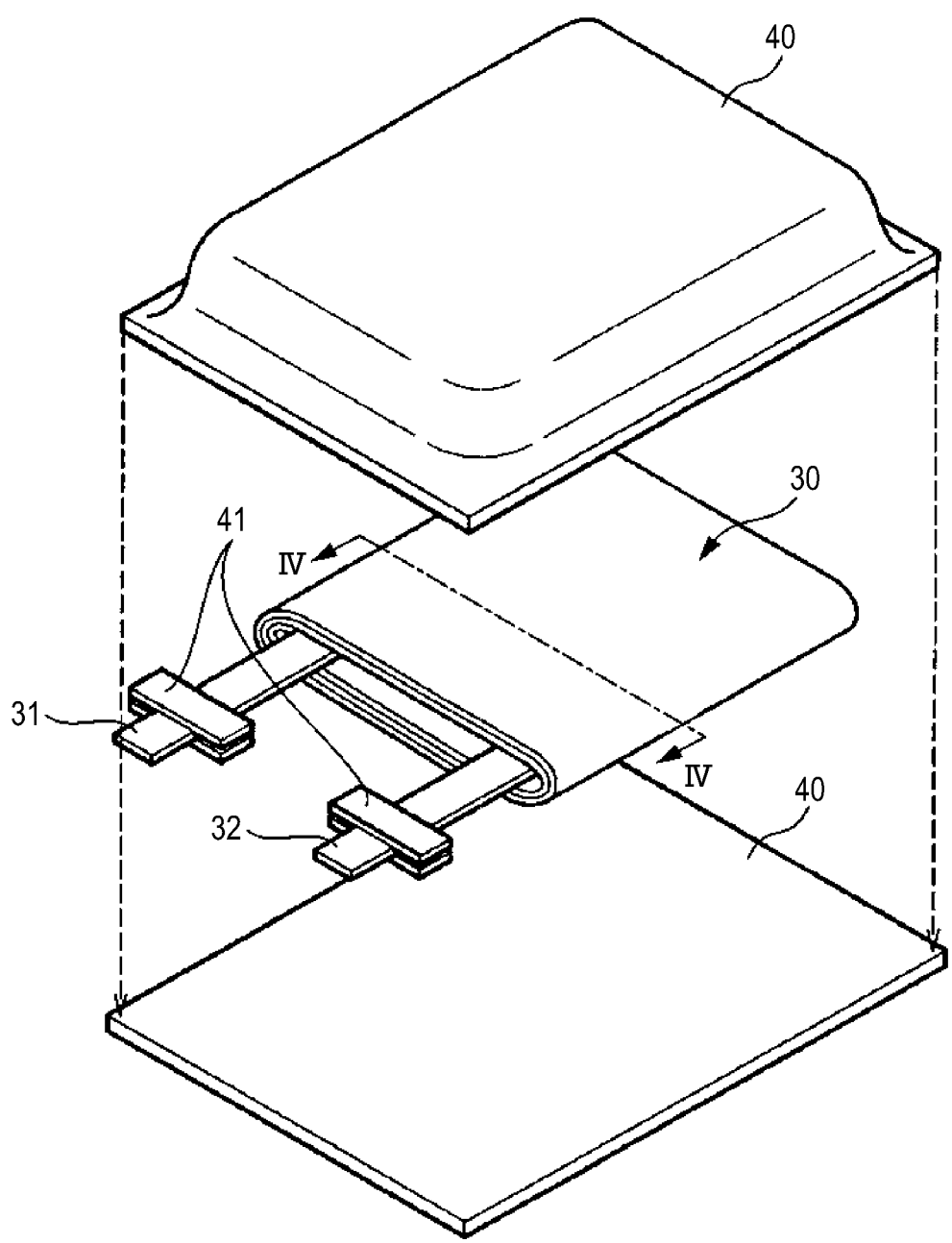
FIG. 7 is an exploded perspective view illustrating a configuration of a second nonaqueous electrolyte battery according to the embodiment of the present technology.
Figure 8:
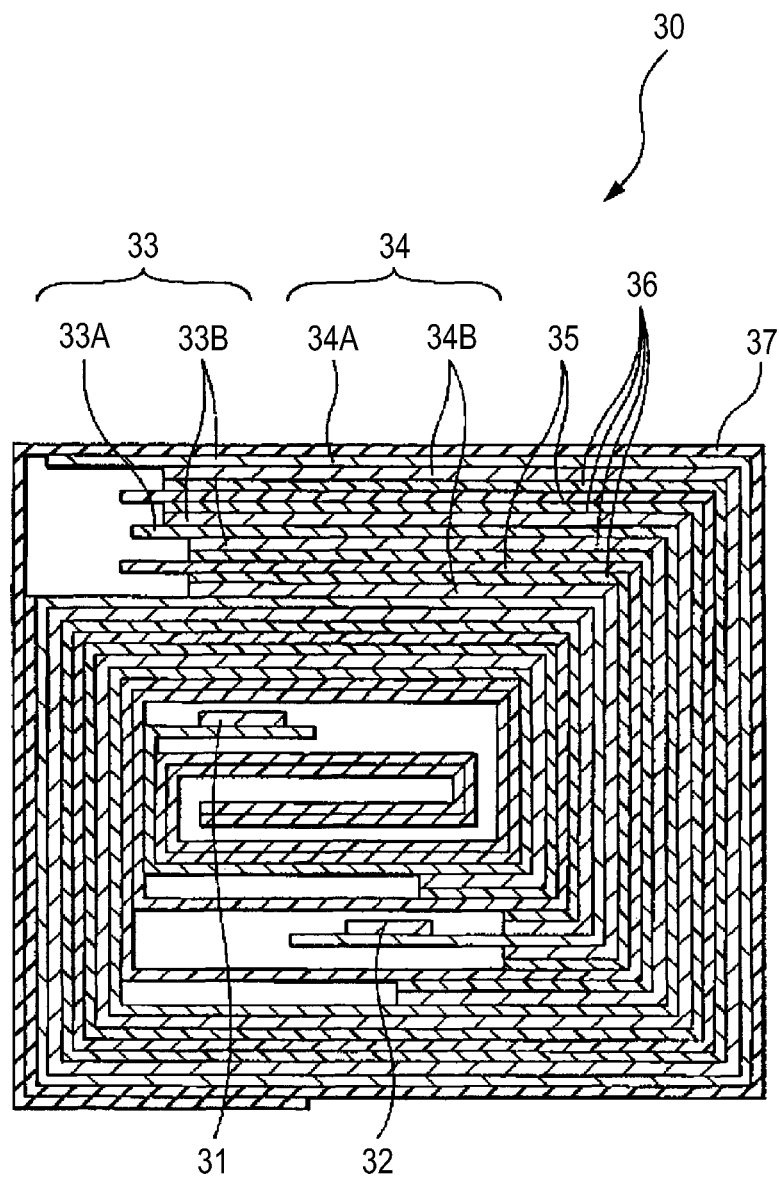
FIG. 8 is a cross sectional view of a wound electrode unit shown in FIG. 7.

FIG. 7 is an exploded perspective view illustrating a configuration of a third nonaqueous electrolyte battery. FIG. 8 is a magnified cross section of a wound electrode unit 30 of FIG. 7 taken along the line IV-IV.

[Overall Configuration of Nonaqueous Electrolyte Battery]

As with the first nonaqueous electrolyte battery, the third nonaqueous electrolyte battery is a lithium ion secondary battery, and mainly includes the wound electrode unit 30 housed inside a film-like exterior member 40, and to which a positive electrode lead 31 and a negative electrode lead 32 are attached. The battery structure using the exterior member 40 is called a laminate film structure.

For example, the positive electrode lead 31 and the negative electrode lead 32 lead out in the same direction out of the exterior member 40. However, the positions and the lead direction of the positive electrode lead 31 and the negative electrode lead 32 relative to the wound electrode unit 30 are not particularly limited. The positive electrode lead 31 is formed using, for example, aluminum. The negative electrode lead 32 is formed using, for example, copper, nickel, or stainless steel. These materials are formed into, for example, a thin plate or a mesh.

(Exterior Member)

The exterior member 40 is, for example, a deformable film-like exterior member provided as a laminate film that includes a fuse layer, a metal layer, and a surface protective layer laminated in this order. For example, two laminate films are bonded to each other by being fused or with an adhesive or the like at the peripheries of the opposing fuse layers of the laminate films on the both sides of the wound electrode unit 30. The fuse layer is, for example, a polyethylene film or a polypropylene film. The metal layer is, for example, an aluminum foil. The surface protective layer is, for example, a nylon film or a polyethylene terephthalate film.

The exterior member 40 is preferably an aluminum laminate film that includes a polyethylene film, an aluminum foil, and a nylon film laminated in this order. Aside from the aluminum laminate film, the exterior member 40 may be a laminate film of some other laminate structure, a polymer film of polypropylene or the like, or a metal film.

An adhesive film 41 for preventing entry of ambient air is inserted between the exterior member 40 and the positive and negative electrode leads 31 and 32. The adhesive film 41 is formed of material adherent to the positive and negative electrode leads 31 and 32. Examples of such material include polyolefin resins such as polyethylene, polypropylene, modified-polyethylene, and modified-polypropylene.

(Positive Electrode, Negative Electrode, and Separator)

The wound electrode unit 30 includes a positive electrode 33 and a negative electrode 34 laminated via a separator 35 and an electrolyte layer 36 and wound into a roll, and the outermost periphery is protected by a protective tape 37. The positive electrode 33 includes a positive electrode active material layer 33B provided, for example, on the both sides of a positive electrode collector 33A. The positive electrode collector 33A and the positive electrode active material layer 33B are configured in the same way as the positive electrode collector 21A and the positive electrode active material layer 21B, respectively, of the first nonaqueous electrolyte battery. The negative electrode 34 includes a negative electrode active material layer 34B provided, for example, on the both sides of a negative electrode collector 34A. The negative electrode collector 34A and the negative electrode active material layer 34B are configured in the same way as the negative electrode collector 22A and the negative electrode active material layer 22B, respectively, of the first nonaqueous electrolyte battery.

The separator 35 is configured in the same way as the separator 23 of the first nonaqueous electrolyte battery. The insulating layer is also configured in the same way as in the first nonaqueous electrolyte battery. Specifically, the insulating layer may be formed between the positive electrode 33 and the separator 35, or between the negative electrode 34 and the separator 35, or between the separator 35 and the positive and negative electrodes 33 and 34. Further, the insulating layer may be formed on the surface of the positive electrode active material lithium composite oxide.

(Electrolyte Layer)

The electrolyte layer 36 contains a polymer compound holding an electrolytic solution. Other materials such as additives also may be contained, as required. The electrolyte layer 36 is a non-fluidic electrolyte, for example, such as a gel electrolyte. The gel electrolyte is preferred, because it can provide high ion conductivity (for example, 1mS/cm or more at room temperature), and can prevent the electrolytic solution from leaking.

Examples of the polymer compound include one or more of the polymer materials selected from polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Other examples include polyvinyl acetate, polyvinyl alcohol, polymethylmethacrylate, polyacrylic acid, polymethacrylic acid, styrene-butadiene rubber, nitrile-butadiene rubber, polystyrene, polycarbonate, and a copolymer of vinylidene fluoride and hexafluoropyrene. These may be used alone or as a mixture of one or more. Of these, polyvinylidene fluoride, and a copolymer of vinylidene fluoride and hexafluoropyrene are preferred, because these are electrochemically stable.

The composition of the electrolytic solution is the same as that for the first nonaqueous electrolyte battery. However, in the electrolyte layer 36 as the gel electrolyte, the solvent of the electrolytic solution is inclusive of not only liquid solvents, but a wide range of ion conductive materials that can dissociate the electrolyte salt. Thus, a polymer compound having ion conductivity is also confined within the definition of the solvent.

(Insulating Layer)

In addition to the polymer compound holding the electrolytic solution, an insulating material may be contained to form the electrolyte 36 as the insulating layer.

The insulating material may be, for example, ceramic particles. Examples of ceramics include alumina, silica, magnesia, titania, zirconia, $LiNbO_3$, LIPON ($Li_{3+y}PO_{4-x}N_x$), a group called a LISICON (Lithium-Super-Ion-Conductor), Thio-LISICON (for example, $Li_{3.25}Ge_{0.25}P_{0.75}S_4$), $Li_2S$ alone, $Li_2S$—$P_2S_5$, $Li_2S$—$SiS_2$, $Li_2S$—$GeS_2$, $Li_2S$—$B_2S_5$, $Li_2S$—$Al_2S_5$, and $Li_2O$—$Al_2O_3$—$TiO_2$—$P_2O_5$ (LATP).

Note that the electrolytic solution may directly be used instead of the gel electrolyte layer 36 that includes the polymer compound holding the electrolytic solution. In this case, the separator 35 is impregnated with the electrolytic solution.

[Operation of Nonaqueous Electrolyte Battery]

In the nonaqueous electrolyte battery, for example, the lithium ions are released from the positive electrode 33 while charging, and stored in the negative electrode 34 via the electrolyte layer 36. During the discharge, for example, the lithium ions are released from the negative electrode 34, and stored in the positive electrode 33 via the electrolyte layer 36.

[Nonaqueous Electrolyte Battery Producing Method]

The nonaqueous electrolyte battery including the gel electrolyte layer 36 is produced by, for example, the following three procedures.

In a first producing method, the positive electrode 33 and the negative electrode 34 are fabricated using the same procedure used for the positive electrode 21 and the negative electrode 22 of the first nonaqueous electrolyte battery. Specifically, the positive electrode 33 is fabricated by forming the positive electrode active material layer 33B on the both sides of the positive electrode collector 33A. The negative electrode 34 is fabricated by forming the negative electrode active material layer 34B on the both sides of the negative electrode collector 34A. Thereafter, a precursor solution containing an electrolytic solution, a polymer compound, and a solvent is prepared, and applied to the positive electrode 33 and the negative electrode 34. The solvent is then evaporated to form the gel electrolyte layer 36. The positive electrode lead 31 and the negative electrode lead 32 are then attached to the positive electrode collector 33A and the negative electrode collector 34A, respectively, by using a method such as welding. The positive electrode 33 and the negative electrode 34 with the electrolyte layer 36 are then laminated via the separator 35 and the laminate is wound into a roll, and the protective tape 37 is attached to the outermost periphery to fabricate the wound electrode unit 30. Finally, the wound electrode unit 30 is sandwiched between a pair of film-like exterior members 40, and the outer peripheries of the exterior members 40 are bonded by a method such as a heat fuse method to seal the wound electrode unit 30 therein. In this case, the adhesive film 41 is inserted between the positive and negative electrode leads 31 and 32 and the exterior member 40. This completes the nonaqueous electrolyte battery represented in FIGS. 7 and 8.

In a second producing method, the positive electrode lead 31 and the negative electrode lead 32 are first attached to the positive electrode 33 and the negative electrode 34, respectively. The positive electrode 33 and the negative electrode 34 are then laminated via the separator 35 and the laminated is wound into a roll, and the protective tape 37 is attached to the outermost peripheries to fabricate a wound unit as a precursor of the wound electrode unit 30. The wound unit is then sandwiched between a pair of film-like exterior members 40, and the all outer peripheries except for one side are bonded by using a method such as a heat fuse method to house the wound unit inside a bag of the exterior members 40. Then, an electrolyte composition is prepared that contains an electrolytic solution, the raw material monomer of a polymer compound, a polymerization initiator, and optional materials such as a polymerization inhibitor, and injected into the bag of the exterior members 40. The opening of the exterior member 40 is then sealed by using a method such as a heat fuse method. The monomer is then heat polymerized into a polymer compound, and the gel electrolyte layer 36 is formed as a result. This completes the nonaqueous electrolyte battery.

In a third producing method, first, a wound unit is formed and housed in a bag of the exterior members 40 in the same manner as in the second producing method, except for using a separator 35 coated with a polymer compound on the both sides. Examples of the polymer compound applied to the separator 35 include polymers that contain a vinylidene fluoride component (including a homopolymer, a copolymer, and a multicomponent copolymer). Specific examples include polyvinylidene fluoride, and binary copolymers containing vinylidene fluoride and hexafluoropropylene components, and ternary copolymers containing vinylidene fluoride, hexafluoropropylene, and chlorotrifluoroethylene components. The polymer compound may contain one or more other polymer compounds, in addition to the polymer containing a vinylidene fluoride component. Thereafter, an electrolytic solution is prepared, and injected into the exterior member 40. The opening of the exterior member 40 is then sealed by using a method such as a heat fuse method. Finally, the exterior member 40 is heated under applied load to contact the separator 35 to the positive electrode 33 and the negative electrode 34 via the polymer compound. As a result, the polymer compound is impregnated with the electrolytic solution, and gels to form the electrolyte layer 36. This completes the nonaqueous electrolyte battery.

The swelling of the battery is suppressed more in the third producing method than in the first procedure. Further, in the third producing method, the raw material monomer of the polymer compound, the solvent, and other materials hardly remain in the electrolyte layer 36 as compared with the second producing method, and formation of the polymer compound can be desirably controlled. Thus, sufficient adhesion can be provided between the electrolyte layer 36 and the positive and negative electrodes 33 and 34 and the separator 35.

In the third nonaqueous electrolyte battery in which the capacity of the negative electrode 34 is represented by the storage and release of lithium ions, the electrolyte layer 36 contains the electrolyte (electrolytic solution). Thus, cycle characteristics can be improved by the same effect as that of the first nonaqueous electrolyte battery. Other effects of the nonaqueous electrolyte battery are also as described for the first nonaqueous electrolyte battery. Note that the third nonaqueous electrolyte battery is not necessarily required to be configured in the same way as the first nonaqueous electrolyte battery, and may by configured in the same way as the second nonaqueous electrolyte battery. The same effects also can be obtained in this way.

(1-4) Fourth Nonaqueous Electrolyte Battery

Figure 9:
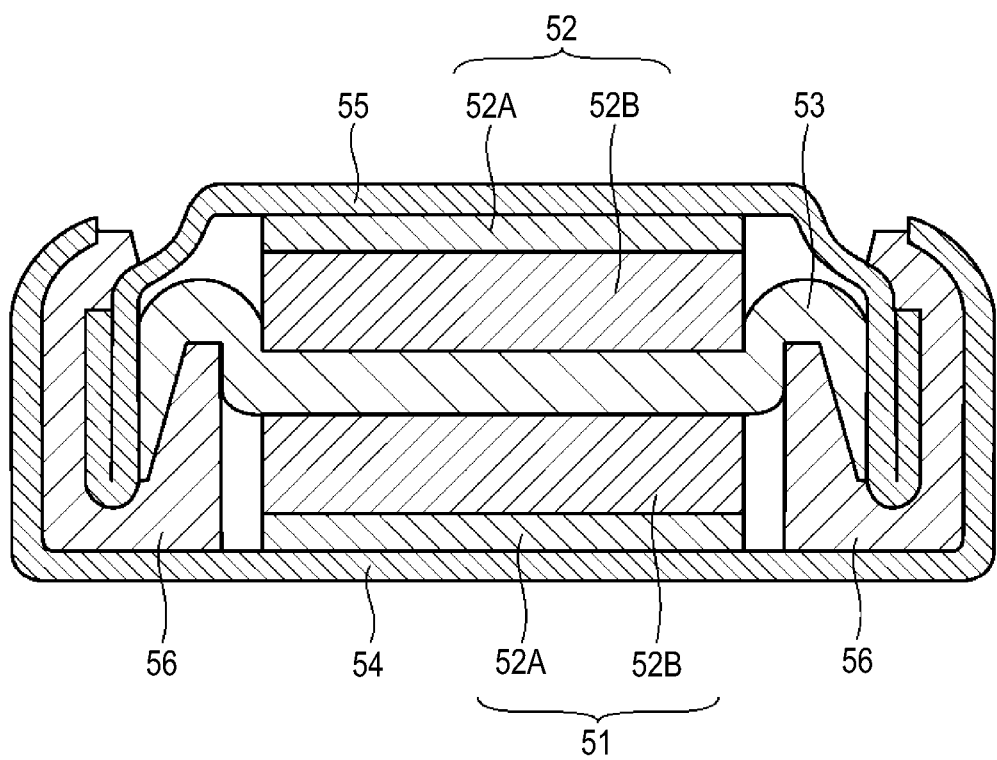
FIG. 9 is a cross sectional view illustrating a configuration of a fourth nonaqueous electrolyte battery according to the embodiment of the present technology.

FIG. 9 represents a cross sectional configuration of a fourth nonaqueous electrolyte battery. In the fourth nonaqueous electrolyte battery, a positive electrode 51 is attached to an exterior canister 54, and a negative electrode 52 is housed in an exterior cup 55. These are laminated via a separator 53 impregnated with the electrolytic solution, and swaged by a gasket 56. The battery structure using the exterior canister 54 and the exterior cup 55 are called a coin-type structure.

The positive electrode 51 is provided by providing a positive electrode active material layer 51B over one surface of the positive electrode collector 51A. The negative electrode 52 is provided by providing a negative electrode active material layer 52B over one surface of the negative electrode collector 52A. The positive electrode collector 51A, the positive electrode active material layer 51B, the negative electrode collector 52A, the negative electrode active material layer 52B, and the separator 53 are configured in the same way as the positive electrode collector 21A, the positive electrode active material layer 21B, the negative electrode collector 22A, the negative electrode active material layer 22B, and the separator 23, respectively, of the first nonaqueous electrolyte battery. The electrolytic solution impregnating the separator 53 has the same composition as the electrolytic solution of the first nonaqueous electrolyte battery. The insulating layer is also as described in the first nonaqueous electrolyte battery. Specifically, the insulating layer may be provided between the positive electrode 51 and the separator 53, or between the negative electrode 52 and the separator 53, or between the separator 53 and the positive and negative electrodes 51 and 52. Further, the insulating layer may be formed on the surface of the positive electrode active material lithium composite oxide. The coin-type nonaqueous electrolyte battery has the same advantages and effects as the first nonaqueous electrolyte battery.

2. Second Embodiment (Examples of Battery Pack)

Figure 10:
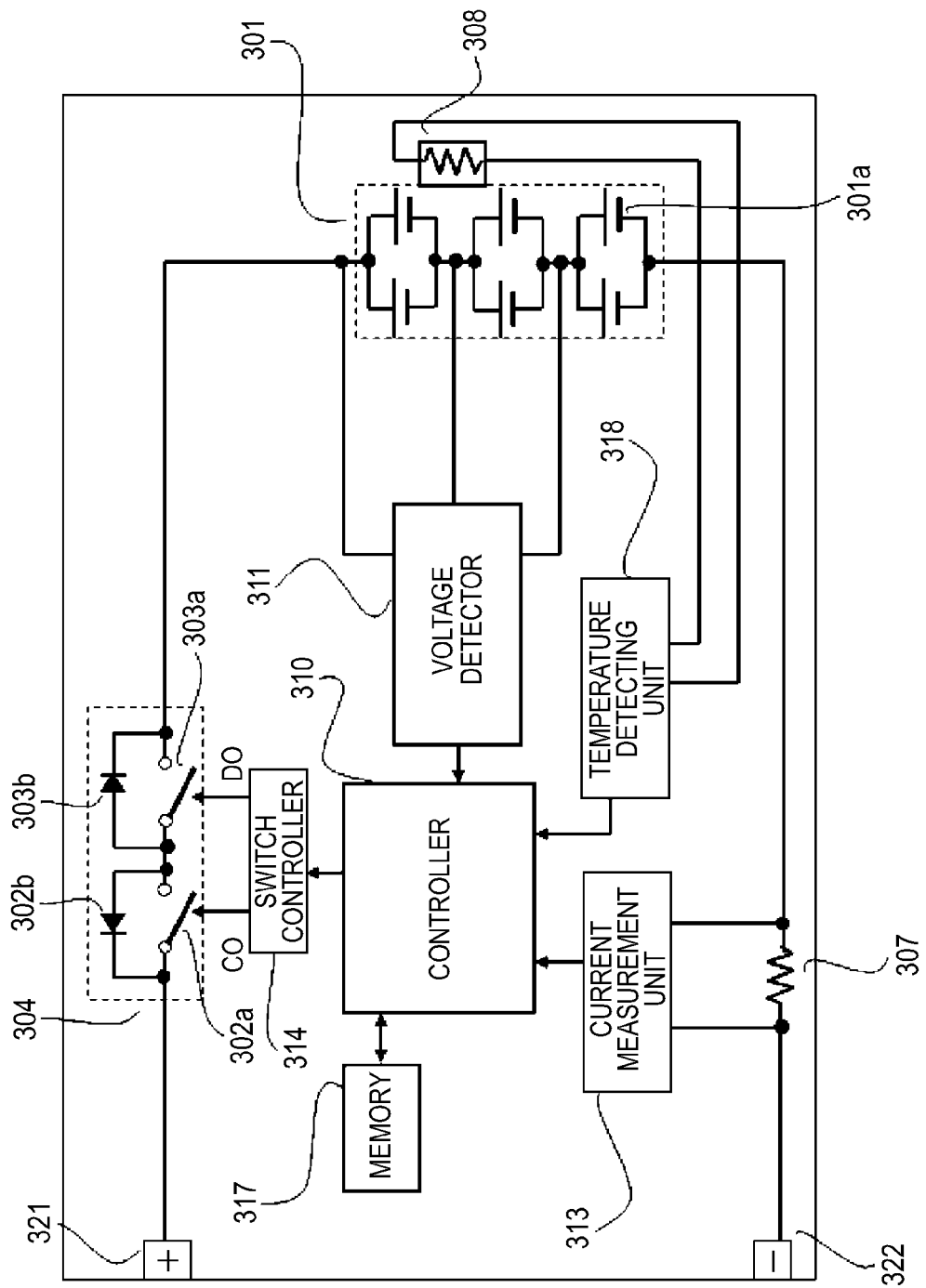
FIG. 10 is a block diagram representing an exemplary configuration of a battery pack according to an embodiment of the present technology.

FIG. 10 is a block diagram representing an exemplary circuit configuration of a battery pack to which the nonaqueous electrolyte battery (nonaqueous electrolyte secondary battery) of the embodiment of the present technology is applied. The battery pack includes an assembled battery 301; an exterior; switch unit 304 including a charge control switch 302a and a discharge control switch 303a; a current detecting resistor 307, a temperature detecting element 308, and a controller 310.

The battery pack also includes a positive electrode terminal 321 and a negative electrode terminal 322. During the charging process, the positive electrode terminal 321 and the negative electrode terminal 322 are connected to the positive electrode terminal and the negative electrode terminal, respectively, of the charger for charging. During use in an electronic device, the positive electrode terminal 321 and the negative electrode terminal 322 are connected to the positive electrode terminal and the negative electrode terminal, respectively, of the electronic device for discharge.

The assembled battery 301 is configured from a plurality of nonaqueous electrolyte batteries 301a connected to each other in series and/or in parallel. The nonaqueous electrolyte batteries 301a are realized by the nonaqueous electrolyte battery of the embodiment of the present technology. Note that, in the example represented in FIG. 10, a total of six nonaqueous electrolyte batteries 301a are connected in a two parallel series and three serial series (2P3S) configuration.

However, the batteries may be connected in any way, as in n parallel series and m serial series (n and m are integers).

The switch unit 304 includes the charge control switch 302a and a diode 302b, and the discharge control switch 303a and a diode 303b, and is controlled by the controller 310. The diode 302b is reverse biased for the charge current flowing into the assembled battery 301 from the positive electrode terminal 321, and forward biased for the discharge current flowing into the assembled battery 301 from the negative electrode terminal 322. The diode 303b is forward biased for the charge current, and reverse biased for the discharge current. The switch unit, provided on the positive side in this example, may be provided on the negative side.

The charge and discharge controller controls the charge control switch 302a, turning it off upon the battery voltage reaching the overcharge detection voltage, and blocking the flow of the charge current into the current path of the assembled battery 301. Once the charge control switch is turned off, only discharge is possible via the diode 302b. The control unit 310 also controls the charge control switch 302a, turning it off when there is a large current flow during the charging process, and blocking the charge current from flowing into the current path of the assembled battery 301.

The controller 310 controls the discharge control switch 303a, turning it off upon the battery voltage reaching the overdischarge detection voltage, and blocking the flow of the discharge current into the current path of the assembled battery 301. Once the discharge control switch 303a is turned off, only charging is possible via the diode 303b. The controller 310 also controls the discharge control switch 303a, turning it off when there is a large current flow during the discharge, and blocking the discharge current from flowing into the current path of the assembled battery 301.

The temperature detecting element 308 is, for example, a thermistor, and is provided near the assembled battery 301. The temperature detecting element 308 measures the temperature of the assembled battery 301, and sends the measured temperature to the controller 310. A voltage detector 311 measures the voltage of the assembled battery 301, and the voltage of each nonaqueous electrolyte battery 301a forming the assembled battery 301, and sends the measured voltage to the controller 310 after A/D conversion. A current measurement unit 313 measures a current using the current detecting resistor 307, and sends the measured current to the controller 310.

A switch controller 314 controls the charge control switch 302a and the discharge control switch 303a of the switch unit 304 based on the input voltage and current from the voltage detector 311 and the current measurement unit 313. The switch controller 314 sends a control signal to the switch unit 304 when any of the voltages of the nonaqueous electrolyte batteries 301a reaches or falls below the overcharge detection voltage or overdischarge detection voltage, or when there is an abrupt large current flow, so as to prevent overcharge and overdischarge, and overcurrent charge and discharge.

For example, when the nonaqueous electrolyte battery is a lithium ion secondary battery, the overcharge detection voltage is set at, for example, 4.20 V±0.05 V, and the overdischarge detection voltage at, for example, 2.4 V±0.1 V.

A semiconductor switch, for example, such as a MOSFET may be used as the charge and discharge switch. In this case, the parasitic diodes of the MOSFET serve as the diodes 302b and 303b. When a P-channel-type FET is used as the charge and discharge switch, the switch controller 314 supplies control signals DO and CO to the gates of the charge control switch 302a and the discharge control switch 303a, respectively. When realized as P-channel-type switches, the charge control switch 302a and the discharge control switch 303a turn on at a gate potential lower than the source potential by at least a predetermined voltage. Specifically, during the normal charging and discharge operations, the control signals CO and DO are brought to low level, and the charge control switch 302a and the discharge control switch 303a are turned on.

For example, when there is overcharge or overdischarge, the control signals CO and DO are brought to high level, and the charge control switch 302a and the discharge control switch 303a are turned off.

A memory 317 is a RAM or ROM, and, for example, a non-volatile memory such as an EPROM (Erasable Programmable Read Only Memory) is used. The memory 317 stores information such as the numerical values computed in the controller 310, and the battery internal resistance values in the initial state of the nonaqueous electrolyte batteries 301a measured during the production. The memory 317 may be rewritten as appropriate. (The full charge capacity of the nonaqueous electrolyte batteries 301a may be stored to enable, for example, calculations of the remaining capacity with the controller 310.)

A temperature detecting unit 318 measures a temperature using the temperature detecting element 308, and performs other operations, including control of the charge and discharge in case of abnormal heating, and calibrations in the calculations of the remaining capacity.

3. Third Embodiment

The nonaqueous electrolyte battery, and the battery pack using it can be installed in, for example, devices such as electronic devices, electric vehicles, and power storage devices, or can be used to supply power to these devices.

Examples of the electronic devices include laptop personal computers, PDAs (personal digital assistance), cell phones, cordless handsets, videos, digital still cameras, electronic books, electronic dictionaries, music players, radios, headphones, gaming machines, navigation systems, memory cards, pacemakers, hearing aids, electric power tools, electric shavers, refrigerators, air conditioners, televisions, stereos, water heaters, microwave ovens, dishwashers, washing machines, driers, illumination equipment, toys, medical equipment, robots, load conditioners, and traffic lights.

Examples of the electric vehicles include railway cars, caddie carts, mobility scooters, and electric automobiles (including hybrid cars). The nonaqueous electrolyte battery and the battery pack can be used as the driving power supply or auxiliary power supply for these vehicles.

Examples of the power storage devices include power storage power supplies for houses and buildings, or for power-generating facilities.

Among these application examples, the following describes a specific example of a power storage system using a power storage device to which the nonaqueous electrolyte battery of the embodiment of the present technology is applied.

The power storage system may be configured, for example, as follows. A first power storage system is a power storage system that charges a power storage device with a power generating unit that generates power from renewable energy. A second power storage system is a power storage system that includes a power storage device, and that supplies power to an electronic device connected to the power storage device. A third power storage system is an electronic device that receives power from the power storage device. These power storage systems are realized as systems for efficiently supplying power in collaboration with an external power supply network.

A fourth power storage system is an electric vehicle that includes a converter for converting the supplied power from a power storage device into the driving power of a vehicle, and a control unit that processes information concerning vehicle control based on information concerning the power storage device. A fifth power storage system is a power system that includes a power information transmitting/receiving unit for transmitting and receiving signals to and from other devices via a network, and that controls the charge and discharge of the power storage device based on the information received by the transmitting/receiving unit. A sixth power storage system is a power storage system that receives power from the power storage device, or supplies power to the power storage device from a power generating unit or a power grid. The power storage system is described below.

(3-1) Home Power Storage System as Application Example

Figure 11:
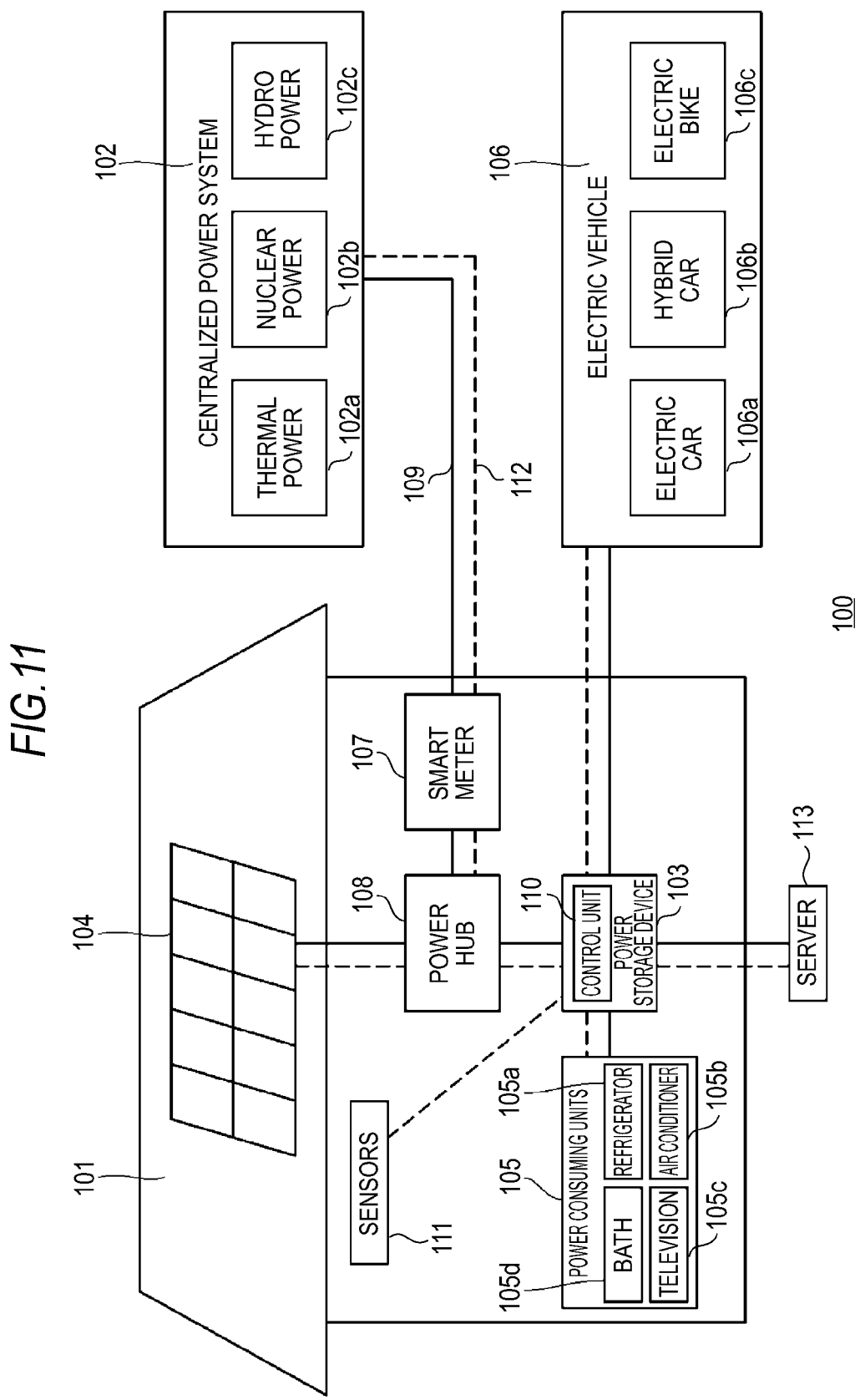
FIG. 11 is a schematic diagram representing an example of the nonaqueous electrolyte battery of the embodiment of the present technology applied to a home power storage system.

A home power storage system using a power storage device that uses the nonaqueous electrolyte battery of the embodiment of the present technology is described below as an application example, with reference to FIG. 11. For example, in a power storage system 100 for a house 101, power is supplied to a power storage device 103 from a centralized power system 102 such as a thermal power 102a, a nuclear power 102b, and a hydro power 102c via, for example, a power grid 109, information network 112, a smart meter 107, and a power hub 108. Power is also supplied to the power storage device 103 from an independent power supply such as a home power generating unit 104. The power storage device 103 stores the supplied power. The power storage device 103 is used to feed power used in the house 101. Aside from the house 101, the same power storage system also can be used for buildings.

The house 101 is equipped with the power generating unit 104, power consuming units 105, the power storage device 103, a control unit 110 for controlling various units, the smart meter 107, and sensors 111 for acquiring a variety of information. These units are connected to one another via the power grid 109 and the information network 112. The power generating unit 104 is realized by, for example, a solar cell, or a fuel cell, and the generated power is supplied to the power consuming units 105 and/or to the power storage device 103. The power consuming units 105 include a refrigerator 105a, an air conditioner 105b, a television receiver 105c, and a bath 105d. The power consuming units 105 also includes an electric vehicle 106. The electric vehicle 106 is an electric car 106a, a hybrid car 106b, or an electric bike 106c.

The nonaqueous electrolyte battery of the embodiment of the present technology is applied to the power storage device 103. The nonaqueous electrolyte battery of the embodiment of the present technology may be configured from, for example, the lithium ion secondary battery described above. The smart meter 107 functions to measure the amounts of the commercial power used, and send the measured amounts to a power company. The power grid 109 may include one or more of a DC power feed, an AC power feed, and a non-contact power feed.

The sensors 111 include, for example, a motion sensor, an illuminance sensor, an object detection sensor, a power consumption sensor, a vibration sensor, a contact sensor, a temperature sensor, and an infrared sensor. The information acquired by the sensors 111 is sent to the control unit 110. The information from the sensors 111 can be used to grasp parameters such as weather conditions and human conditions, and allows the power consuming units 105 to be automatically controlled to minimize energy consumption. The control unit 110 can send information concerning the house 101 to, for example, an external power company via the Internet.

The power hub 108 is provided for processes such as branching of power lines, and DC/AC conversion. The information network 112 connected to the control unit 110 may communicate by using various communication methods, including methods using a communications interface such as UART (Universal Asynchronous Receiver-Transceiver: a transmitting/receiving circuit for asynchronous serial communications), and methods using a radio communication standard sensor network, such as Bluetooth, ZigBee, and Wi-Fi. The Bluetooth is applicable to multimedia communications, and enables point-to-multipoint communications. ZigBee uses an IEEE (Institute of Electrical and Electronics Engineers) 802.15.4 physical layer. IEEE 802.15.4 is the name used to refer to short distance radio network standards called PAN (Personal Area Network) or W (Wireless) PAN.

The control unit 110 is connected to an external server 113. The server 113 may be administered by any of the house 101, a power company, and a service provider. Examples of the information sent and received by the server 113 include power consumption information, life pattern information, power rate, weather information, natural disaster information, and information concerning power trade. The information may be transmitted and received by a home power consuming unit (for example, a television receiver), or by external devices (for example, such as a mobile phone). Further, the information may be displayed by devices having display functions, for example, such as a television receiver, a mobile phone, and a PDA (Personal Digital Assistants).

The control unit 110 that controls the other units is configured from, for example, a CPU (Central Processing Unit), a RAM (Random Access Memory), and a ROM (Read Only Memory), and is installed in the power storage device 103 in this example. The control unit 110 is connected to the power storage device 103, the home power generating unit 104, the power consuming units 105, the sensors 111, and the server 113 via the information network 112, and functions to adjust, for example, the amount of the commercial power used, and the amount of generated power. The control unit 110 may also have other functions, including a power trade function in the power market.

As described above, the power storage device 103 can store not only the power from the centralized power system 102 including the thermal power 102a, the nuclear power 102b, and the hydro power 102c, but the power generated by the home power generating unit 104 (solar power, wind power). In this way, the amount of outgoing power can be controlled constant, or controlled to discharge only in necessary amounts, even when there are fluctuations in the power generated by the home power generating unit 104. For example, the power obtained from the solar power may be stored in the power storage device 103, whereas the power supplied at a late-hour discount rate may be stored in the power storage device 103 during the night time, and the stored power in the power storage device 103 may be discharged during the day time in which the power is supplied at higher rates.

The control unit 110, described as being installed in the power storage device 103 in this example, may be installed in the smart meter 107, or may be configured alone. Further, the power storage system 100 may be used for more than one home in an apartment, or for homes in detached housing.

(3-2) Vehicle Power Storage System as Application Example

Figure 12:
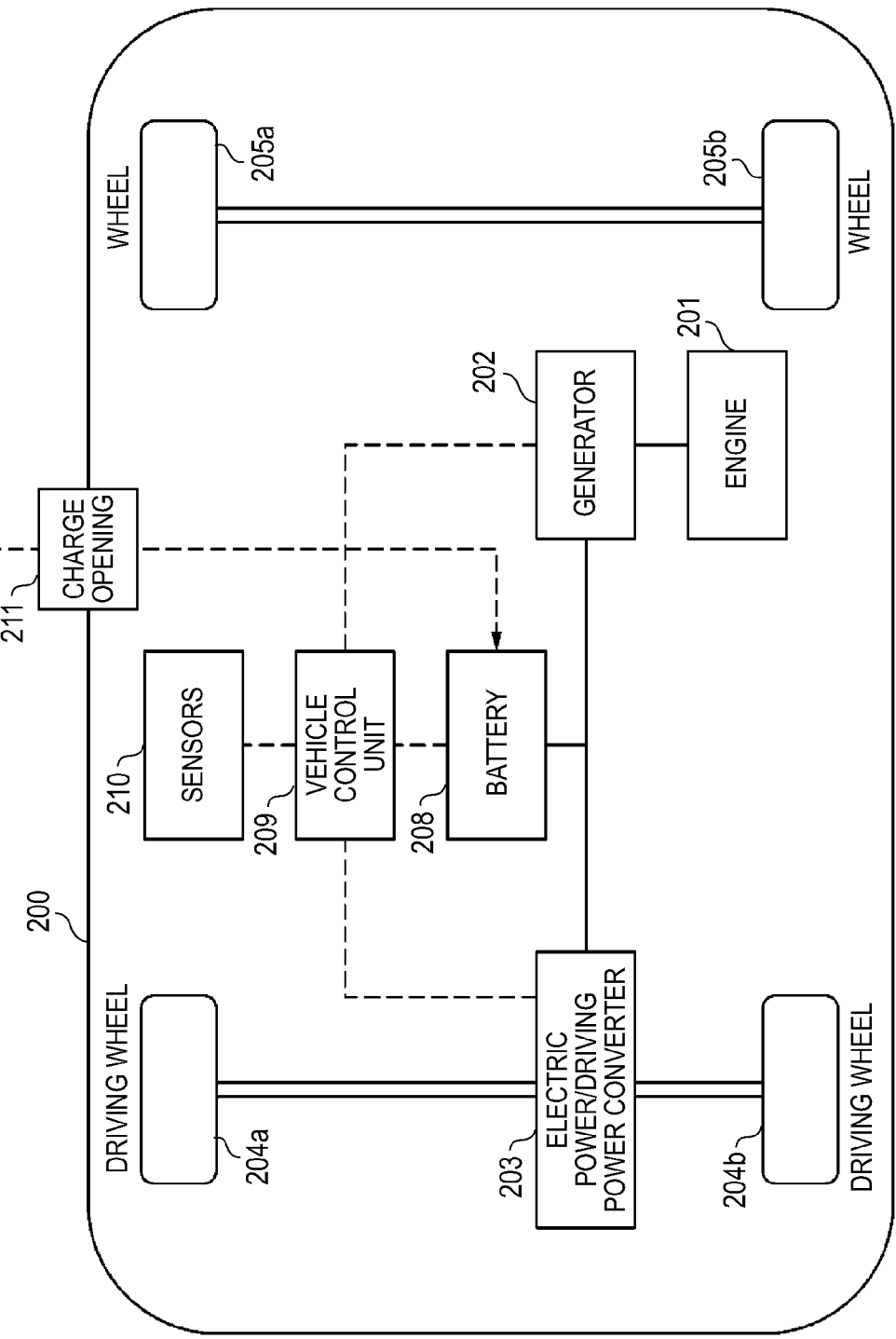
FIG. 12 is a schematic diagram representing an exemplary configuration of a hybrid vehicle using a series hybrid system to which the present technology is applied.

A vehicle power storage system using the present technology is described below as an application example, with reference to FIG. 12. FIG. 12 schematically represents an exemplary configuration of a hybrid vehicle using a series hybrid system based on the present technology. The series hybrid system is a car that runs on power converted by an electric power/driving power converter, using the power generated by a generator driven by an engine, or using the power generated by the generator and stored in a battery.

A hybrid vehicle 200 includes an engine 201, a generator 202, an electric power/driving power converter 203, a driving wheel 204a, a driving wheel 204b, a wheel 205a, a wheel 205b, a battery 208, a vehicle control unit 209, sensors 210, and a charge opening 211. The nonaqueous electrolyte battery of the embodiment of the present technology is applied to the battery 208.

The hybrid vehicle 200 uses the electric power/driving power converter 203 as the power source. An example of the electric power/driving power converter 203 is a motor. The power from the battery 208 activates the electric power/driving power converter 203, and the torque of the electric power/driving power converter 203 is transmitted to the driving wheels 204a and 204b. Note that a direct current-alternate current (DC-AC) converter or a reverse (AC-DC) converter may be used at necessary locations to make the electric power/driving power converter 203 an alternate current motor or a direct current motor. The sensors 210 control the rotation speed of the engine, or the throttle valve opening (throttle opening; not illustrated) via the vehicle control unit 209. The sensors 210 include a velocity sensor, an acceleration sensor, and an engine rotation speed sensor.

The torque of the engine 201 transmits to the generator 202, and the power generated by the generator 202 using the torque may be accumulated in the battery 208.

Deceleration of the hybrid vehicle 200 by braking with a braking mechanism (not illustrated) causes the deceleration resistance to add to the torque of the electric power/driving power converter 203, and the regenerative power generated by the electric power/driving power converter 203 using the torque is accumulated in the battery 208.

By being connected to a power supply external to the hybrid vehicle 200, the battery 208 may receive and accumulate the power supplied from the external power supply through the charge opening 211 provided as an inlet.

Though not illustrated, an information processor that processes information concerning vehicle control based on information concerning the nonaqueous electrolyte battery may be provided. Examples of such information processors include an information processor that displays the remaining battery level based on information concerning the remaining amount of the battery.

In this example, the series hybrid car was described that runs on a motor using the power generated by the generator driven by the engine, or using the power generated by the generator and accumulated in the battery. However, the present technology is also applicable to a parallel hybrid car that uses both the engine and motor outputs as the driving source, and that runs by appropriately switching three different modes that use only the engine, only the motor, and both the engine and the motor. Further, the present technology is effectively applicable also to electric vehicles that run only on a driving motor without using an engine.

EXAMPLES

The following lists the compounds of formulae (1) to (14) used in the Examples and Comparative Examples below. The compounds except for $Li_2PO_3F$ and $LiPO_2F_2$ are appended with shortened names. In the following, the compounds except for $Li_2PO_3F$ and $LiPO_2F_2$ will be referred to by their shortened names for convenience.

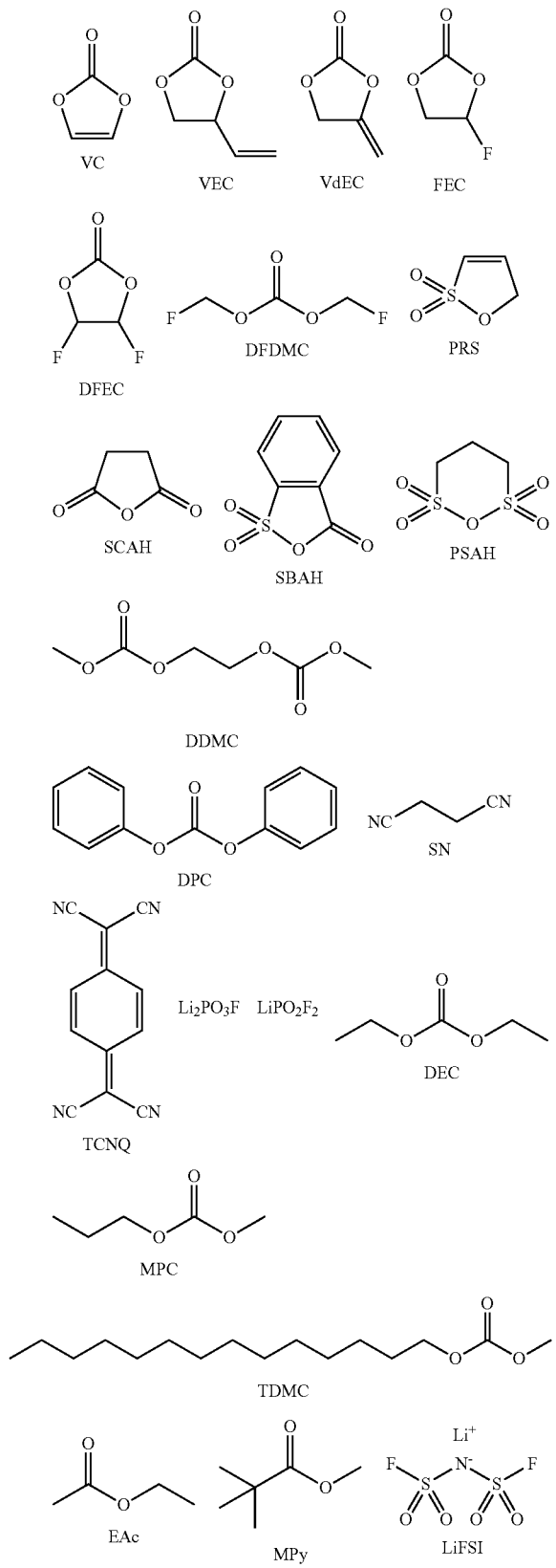

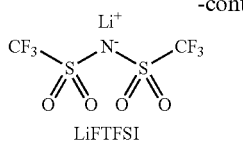
LiFTFSI

VC: vinylene carbonate, VEC: vinyl ethylene carbonate, VdEC: 4-methylene-1,3-dioxolan-2-one, FEC: 4-fluoro-1,3-dioxolan-2-one, DFEC: 4,5-difluoro-1,3-oxolane-2-one, DFDMC: bisfluoromethyl carbonate, PRS: propenesultone, SCAH: succinic acid anhydride, SBAH: sulfobenzoic acid anhydride, PSAH: propanedisulfonic acid anhydride, DDMC: 1,2-di(methoxycarbonyloxy)ethane, DPC: benzoic acid anhydride, SN: succinonitrile, AN: adiponitrile (CN(CH$_2$)$_4$CN), TCNO: tetracyanoquinodimethane, DEC: diethyl carbonate, MPC: methyl propyl carbonate, TDMC: tetradecane methyl carbonate, EAc: ethyl acetate, MPy: methyl trimethylacetate, LiFSI: lithium bis(fluorosulfonyl)imide, LiTFSI: lithium bis(trifluorosulfonyl)imide Example 1-1

Fabrication of Positive Electrode

First, the positive electrode 21 was fabricated. Specifically, lithium carbonate (Li$_2$CO$_3$) and cobalt carbonate (CoCO$_3$) were mixed at a 0.5:1 molar ratio, and calcined in air at 900° C. for 5 hours to obtain a lithium-cobalt composite oxide (LiCoO$_2$).

Then, the positive electrode active material lithium-cobalt composite oxide (91 parts by mass), the conductive agent graphite (6 parts by mass), and the binder polyvinylidene fluoride (3 parts by mass) were mixed to obtain a positive electrode mixture, and the mixture was dispersed in N-methyl-2-pyrrolidone to obtain a paste-like positive electrode mixture slurry. Finally, the positive electrode mixture slurry was applied onto the both surfaces of the positive electrode collector 21A realized by a belt-like aluminum foil (12 μm thick), dried, and compression molded with a roller press machine to form the positive electrode active material layer 21B. The positive electrode lead 25, made of aluminum, was then welded to one end of the positive electrode collector 21A.

(Fabrication of Negative Electrode and Insulating Layer)

A granular graphite powder (negative electrode active material; 96 parts by mass; average particle diameter of 20 μm), a styrene-butadiene copolymer modified with acrylic acid (1.5 parts by mass), carboxymethyl cellulose (1.5 parts by mass), and an appropriate amount of water were stirred to prepare a negative electrode slurry. The negative electrode mixture slurry was then evenly applied onto the both surfaces of a negative electrode collector realized by a 15-μm thick belt-like copper foil, dried, and compression molded to form a negative electrode active material layer. Here, the amounts of the positive electrode active material and the negative electrode active material were adjusted so as to make the open circuit voltage (i.e., battery voltage) in the fully charged state 4.3 V.

An alumina particle powder (insulating material ceramic; 80 parts by mass; average particle diameter of 0.5 μm), and polyvinylidene fluoride (PVdF; binder; 20 parts by mass) were mixed, and diluted with the solvent N-methyl-2-pyrrolidone to prepare a mixture. The negative electrode plate was immersed in the mixture, and the thickness was adjusted with a gravure roller. The negative electrode plate was then passed through a drier in a 120° C. atmosphere to remove the solvent. As a result, a 5-μm thick porous film was formed on the negative electrode.

(Fabrication of Wound Electrode Unit)

A nickel negative electrode lead was attached to one end of the negative electrode collector. Then, the positive electrode, a separator realized by a microporous polyethylene film (20 μm thick), and the negative electrode were laminated in this order, and wound multiple times in spirals, and the terminating end was fixed with an adhesive tape to form a wound electrode unit.

(Battery Assemble)

A nickel-plated iron battery canister was prepared. With the wound electrode unit sandwiched between a pair of insulating plates, the negative electrode lead and the positive electrode lead were welded to the battery canister and the safety valve mechanism, respectively, and the wound electrode unit was housed inside the battery canister. Then, an electrolytic solution was injected into the battery canister using a reduced pressure method.

(Preparation of Electrolytic Solution)

The electrolytic solution was prepared as follows. First, ethylene carbonate (EC) and dimethyl carbonate (DMC) were mixed at amass ratio (EC:DMC) of 25:75 to prepare a mixed solvent. VC was then added to the mixed solvent in 1 mass % to prepare an additive solution. The electrolyte salts LiFSI (0.05 mol/L) and LiPF$_6$ (1.05 mol/L) were dissolved in the mixed solvent to prepare an electrolytic solution.

Thereafter, the battery canister was swaged via an asphalt-coated gasket to fix the safety valve mechanism, the heat-sensitive resistive element, and the battery lid. As a result, the battery canister was sealed air-tight, and the cylindrical secondary battery was completed.

Example 1-2

A secondary battery was fabricated in the same manner as in Example 1-1, except that the additive VEC, instead of VC, was added to the mixed solvent in 2 mass % for the preparation of the electrolytic solution.

Example 1-3

A secondary battery was fabricated in the same manner as in Example 1-1, except that the additive VdEC, instead of VC, was added to the mixed solvent in 1 mass % for the preparation of the electrolytic solution.

Example 1-4

A secondary battery was fabricated in the same manner as in Example 1-1, except that the additive FEC, instead of VC, was added to the mixed solvent in 0.1 mass % for the preparation of the electrolytic solution.

Example 1-5

A secondary battery was fabricated in the same manner as in Example 1-1, except that the additive FEC, instead of VC, was added to the mixed solvent in 1 mass % for the preparation of the electrolytic solution.

Example 1-6

A secondary battery was fabricated in the same manner as in Example 1-1, except that the additive FEC, instead of VC, was added to the mixed solvent in 5 mass %, and that LiFSI and LiPF$_6$ were mixed in 0.01 mol/L and 1.09 mol/L, respectively, for the preparation of the electrolytic solution.

Example 1-7

A secondary battery was fabricated in the same manner as in Example 1-1, except that the additive FEC, instead of VC, was added to the mixed solvent in 5 mass % for the preparation of the electrolytic solution.

Example 1-8

A secondary battery was fabricated in the same manner as in Example 1-1, except that the additive FEC, instead of VC, was added to the mixed solvent in 5 mass %, and that LiFSI and LiPF$_6$ were mixed in 0.1 mol/L and 1 mol/L, respectively, for the preparation of the electrolytic solution.

Example 1-9

A secondary battery was fabricated in the same manner as in Example 1-1, except that the additive FEC, instead of VC, was added to the mixed solvent in 5 mass %, and that LiFSI and LiPF$_6$ were mixed in 0.2 mol/L and 0.9 mol/L, respectively, for the preparation of the electrolytic solution.

Example 1-10

A secondary battery was fabricated in the same manner as in Example 1-1, except that the additive FEC, instead of VC, was added to the mixed solvent in 5 mass %, and that LiFSI and LiPF$_6$ were mixed in 0.5 mol/L and 0.6 mol/L, respectively, for the preparation of the electrolytic solution.

Example 1-11

A secondary battery was fabricated in the same manner as in Example 1-1, except that the additive FEC, instead of VC, was added to the mixed solvent in 10 mass % for the preparation of the electrolytic solution.

Example 1-12

A secondary battery was fabricated in the same manner as in Example 1-1, except that the additive FEC, instead of VC, was added to the mixed solvent in 20 mass % for the preparation of the electrolytic solution.

Example 1-13

A secondary battery was fabricated in the same manner as in Example 1-1, except that the additives FEC and VC were added to the mixed solvent in 5 mass % and 1 mass %, respectively, for the preparation of the electrolytic solution.

Example 1-14

A secondary battery was fabricated in the same manner as in Example 1-1, except that the additives FEC and SN were added to the mixed solvent in 5 mass and 2 mass %, respectively, for the preparation of the electrolytic solution.

Example 1-15

A secondary battery was fabricated in the same manner as in Example 1-1, except that the additives FEC and PSAH were added to the mixed solvent in 5 mass and 1 mass %, respectively, for the preparation of the electrolytic solution.

Example 1-16

A secondary battery was fabricated in the same manner as in Example 1-1, except that the additive DFEC, instead of VC, was added to the mixed solvent in 1 mass % for the preparation of the electrolytic solution.

Example 1-17

A secondary battery was fabricated in the same manner as in Example 1-1, except that the additive DFDMC, instead of VC, was added to the mixed solvent in 1 mass % for the preparation of the electrolytic solution.

Example 1-18

A secondary battery was fabricated in the same manner as in Example 1-1, except that the additive PRS, instead of VC, was added to the mixed solvent in 1 mass % for the preparation of the electrolytic solution.

Example 1-19

A secondary battery was fabricated in the same manner as in Example 1-1, except that the additive SCAH, instead of VC, was added to the mixed solvent in 1 mass % for the preparation of the electrolytic solution.

Example 1-20

A secondary battery was fabricated in the same manner as in Example 1-1, except that the additive SBAH, instead of VC, was added to the mixed solvent in 1 mass % for the preparation of the electrolytic solution.

Example 1-21

A secondary battery was fabricated in the same manner as in Example 1-1, except that the additive PSAH, instead of VC, was added to the mixed solvent in 1 mass % for the preparation of the electrolytic solution.

Example 1-22

A secondary battery was fabricated in the same manner as in Example 1-1, except that the additive DDMC, instead of VC, was added to the mixed solvent in 0.1 mass % for the preparation of the electrolytic solution.

Example 1-23

A secondary battery was fabricated in the same manner as in Example 1-1, except that the additive DPC, instead of VC, was added to the mixed solvent in 1 mass % for the preparation of the electrolytic solution.

Example 1-24

A secondary battery was fabricated in the same manner as in Example 1-1, except that the additive SN, instead of VC, was added to the mixed solvent in 0.5 mass % for the preparation of the electrolytic solution.

Example 1-25

A secondary battery was fabricated in the same manner as in Example 1-1, except that the additive SN, instead of VC, was added to the mixed solvent in 2 mass % for the preparation of the electrolytic solution.

Example 1-26

A secondary battery was fabricated in the same manner as in Example 1-1, except that the additive SN, instead of VC, was added to the mixed solvent in 5 mass % for the preparation of the electrolytic solution.

Example 1-27

A secondary battery was fabricated in the same manner as in Example 1-1, except that the additive AN, instead of VC, was added to the mixed solvent in 0.5 mass % for the preparation of the electrolytic solution.

Example 1-28

A secondary battery was fabricated in the same manner as in Example 1-1, except that the additive AN, instead of VC, was added to the mixed solvent in 2 mass % for the preparation of the electrolytic solution.

Example 1-29

A secondary battery was fabricated in the same manner as in Example 1-1, except that the additive AN, instead of VC, was added to the mixed solvent in 5 mass % for the preparation of the electrolytic solution.

Example 1-30

A secondary battery was fabricated in the same manner as in Example 1-1, except that the additive TCNQ, instead of VC, was added to the mixed solvent in 1 mass % for the preparation of the electrolytic solution.

Example 1-31

A secondary battery was fabricated in the same manner as in Example 1-1, except that the additive $Li_2PO_3F$, instead of VC, was added to the mixed solvent in 0.1 mass % for the preparation of the electrolytic solution.

Example 1-32

A secondary battery was fabricated in the same manner as in Example 1-1, except that the additive $LiPO_2F_2$, instead of VC, was added to the mixed solvent in 0.1 mass % for the preparation of the electrolytic solution.

Example 1-33

A secondary battery was fabricated in the same manner as in Example 1-1, except that the additive DEC, instead of VC, was added to the mixed solvent in 1 mass % for the preparation of the electrolytic solution.

Example 1-34

A secondary battery was fabricated in the same manner as in Example 1-1, except that the additive MPC, instead of VC, was added to the mixed solvent in 1 mass % for the preparation of the electrolytic solution.

Example 1-35

A secondary battery was fabricated in the same manner as in Example 1-1, except that the additive TDMC, instead of VC, was added to the mixed solvent in 1 mass % for the preparation of the electrolytic solution.

Example 1-36

A secondary battery was fabricated in the same manner as in Example 1-1, except that the additive EAc, instead of VC, was added to the mixed solvent in 5 mass % for the preparation of the electrolytic solution.

Example 1-37

A secondary battery was fabricated in the same manner as in Example 1-1, except that the additive MPy, instead of VC, was added to the mixed solvent in 5 mass % for the preparation of the electrolytic solution.

Examples 1-38 to 1-58

Secondary batteries were fabricated in the same manner as in Examples 1-1 to 1-3, Example 1-7, Examples 1-16 to 1-23, Example 1-25, and Examples 1-30 to 1-37, except that a silica particle powder having an average particle diameter of 1 μm was used as the insulating material ceramic, instead of the alumina particle powder.

Examples 1-59 to 1-79

Secondary batteries were fabricated in the same manner as in Examples 1-1 to 1-3, Example 1-7, Examples 1-16 to 1-23, Example 1-25, and Examples 1-30 to 1-37, except that the amounts of the positive electrode active material and the negative electrode active material were adjusted so as to make the open circuit voltage (i.e., battery voltage) in the fully charged state 4.45 V.

Comparative Example 1-1

A secondary battery was fabricated in the same manner as in Example 1-1, except that the insulating layer was not formed on the negative electrode, and that the electrolyte salt LiFSI was not mixed and $LiPF_6$ was mixed in 1.1 mol/L without adding the additive VC for the preparation of the electrolytic solution.

Comparative Example 1-2

A secondary battery was fabricated in the same manner as in Example 1-1, except that the electrolyte salt LiFSI was not mixed and $LiPF_6$ was mixed in 1.1 mol/L without adding VC for the preparation of the electrolytic solution.

Comparative Examples 1-3 to 1-23

Secondary batteries were fabricated in the same manner as in Examples 1-1 to 1-21, respectively, except that the electrolyte salt LiFSI was not mixed and $LiPF_6$ was mixed in 1.1 mol/L for the preparation of the electrolytic solution.

Comparative Example 1-24

A secondary battery was fabricated in the same manner as in Example 1-1, except that the electrolyte salt LiTFSI, instead of LiFSI, was mixed in 0.05 mol/L for the preparation of the electrolytic solution.

Comparative Example 1-25

A secondary battery was fabricated in the same manner as in Example 1-43, except that the insulating layer was not formed on the negative electrode, and that the electrolyte salt LiFSI was not mixed and LiPF$_6$ was mixed in 1.1 mol/L without adding VC for the preparation of the electrolytic solution.

Comparative Example 1-26

A secondary battery was fabricated in the same manner as in Example 1-43, except that the electrolyte salt LiFSI was not mixed and LiPF$_6$ was mixed in 1.1 mol/L without adding VC for the preparation of the electrolytic solution.

The secondary batteries fabricated as above were measured for low temperature cycle characteristics, as follows.
(Low Temperature Cycle)

For the measurement of low temperature cycle characteristics, the first cycle of charge and discharge was performed at 23° C., and the second cycle at −5° C. to check discharge capacity. The 3rd to 50th charge and discharge cycles were performed at −5° C., and the percentage remaining discharge capacity (%) after 50 cycles was determined with respect to the 100 discharge capacity after 2 cycles which is set to be 100. The charge and discharge conditions for the first cycle are as follows. The battery was charged under a constant current density of 1 mA/cm$^2$ until the battery voltage reached the charge voltage shown in Table 1. The battery was further charged under the constant charge voltage of Table 1 until the current density reached 0.02 mA/cm$^2$, and discharged at a constant current density of 1 mA/cm$^2$ until the battery voltage reached 3 V.

The results of the low temperature cycle characteristics measurements for Examples 1-1 to 1-63 and Comparative Examples 1-1 to 1-26 are presented in Table 1.

TABLE 1

| | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 1-1 | 4.3 | Alumina | VC | 1 | 0.05 | 1.05 | — | 75 |
| Example 1-2 | | | VEC | 2 | 0.05 | 1.05 | | 75 |
| Example 1-3 | | | VdEC | 1 | 0.05 | 1.05 | | 74 |
| Example 1-4 | | | FEC | 0.1 | 0.05 | 1.05 | | 63 |
| Example 1-5 | | | FEC | 1 | 0.05 | 1.05 | | 74 |
| Example 1-6 | | | FEC | 5 | 0.01 | 1.09 | | 66 |
| Example 1-7 | | | FEC | 5 | 0.05 | 1.05 | | 76 |
| Example 1-8 | | | FEC | 5 | 0.1 | 1 | | 75 |
| Example 1-9 | | | FEC | 5 | 0.2 | 0.9 | | 74 |
| Example 1-10 | | | FEC | 5 | 0.5 | 0.6 | | 68 |
| Example 1-11 | | | FEC | 10 | 0.05 | 1.05 | | 76 |
| Example 1-12 | | | FEC | 20 | 0.05 | 1.05 | | 74 |
| Example 1-13 | | | FEC/VC | 5/1 | 0.05 | 1.05 | | 75 |
| Example 1-14 | | | FEC/SN | 5/2 | 0.05 | 1.05 | | 81 |
| Example 1-15 | | | FEC/PSAH | 5/1 | 0.05 | 1.05 | | 82 |
| Example 1-16 | | | DFEC | 1 | 0.05 | 1.05 | | 75 |
| Example 1-17 | | | DFDMC | 1 | 0.05 | 1.05 | | 74 |
| Example 1-18 | | | PRS | 1 | 0.05 | 1.05 | | 80 |
| Example 1-19 | | | SCAH | 1 | 0.05 | 1.05 | | 79 |
| Example 1-20 | | | SBAH | 1 | 0.05 | 1.05 | | 79 |
| Example 1-21 | | | PSAH | 1 | 0.05 | 1.05 | | 82 |
| Example 1-22 | | | DDMC | 0.1 | 0.05 | 1.05 | | 80 |
| Example 1-23 | | | DPC | 1 | 0.05 | 1.05 | | 77 |
| Example 1-24 | | | SN | 0.5 | 0.05 | 1.05 | | 78 |
| Example 1-25 | | | SN | 2 | 0.05 | 1.05 | | 81 |
| Example 1-26 | | | SN | 5 | 0.05 | 1.05 | | 74 |
| Example 1-27 | | | AN | 0.5 | 0.05 | 1.05 | | 76 |
| Example 1-28 | | | AN | 2 | 0.05 | 1.05 | | 80 |
| Example 1-29 | | | AN | 5 | 0.05 | 1.05 | | 71 |
| Example 1-30 | | | TCNQ | 1 | 0.05 | 1.05 | | 80 |
| Example 1-31 | | | Li$_2$PO$_3$F | 0.1 | 0.05 | 1.05 | | 80 |
| Example 1-32 | | | LiPO$_2$F$_2$ | 0.1 | 0.05 | 1.05 | | 82 |
| Example 1-33 | | | DEC | 1 | 0.05 | 1.05 | | 81 |
| Example 1-34 | | | MPC | 1 | 0.05 | 1.05 | | 80 |
| Example 1-35 | | | TDMC | 1 | 0.05 | 1.05 | | 80 |
| Example 1-36 | | | EAc | 5 | 0.05 | 1.05 | | 82 |
| Example 1-37 | | | MPy | 5 | 0.05 | 1.05 | | 81 |
| Example 1-38 | 4.3 | Silica | VC | 1 | 0.05 | 1.05 | — | 72 |
| Example 1-39 | | | VEC | 2 | 0.05 | 1.05 | | 72 |
| Example 1-40 | | | VdEC | 1 | 0.05 | 1.05 | | 72 |
| Example 1-41 | | | FEC | 5 | 0.05 | 1.05 | | 75 |
| Example 1-42 | | | DFEC | 1 | 0.05 | 1.05 | | 74 |
| Example 1-43 | | | DFDMC | 1 | 0.05 | 1.05 | | 73 |
| Example 1-44 | | | PRS | 1 | 0.05 | 1.05 | | 78 |
| Example 1-45 | | | SCAH | 1 | 0.05 | 1.05 | | 77 |
| Example 1-46 | | | SBAH | 1 | 0.05 | 1.05 | | 77 |
| Example 1-47 | | | PSAH | 1 | 0.05 | 1.05 | | 80 |
| Example 1-48 | | | DDMC | 0.1 | 0.05 | 1.05 | | 79 |
| Example 1-49 | | | DPC | 1 | 0.05 | 1.05 | | 76 |
| Example 1-50 | | | SN | 2 | 0.05 | 1.05 | | 79 |
| Example 1-51 | | | TCNQ | 1 | 0.05 | 1.05 | | 78 |
| Example 1-52 | | | Li$_2$PO$_3$F | 0.1 | 0.05 | 1.05 | | 79 |

TABLE 1-continued

|  | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 1-53 |  |  | LiPO$_2$F$_2$ | 0.1 | 0.05 | 1.05 |  | 80 |
| Example 1-54 |  |  | DEC | 1 | 0.05 | 1.05 |  | 80 |
| Example 1-55 |  |  | MPC | 1 | 0.05 | 1.05 |  | 79 |
| Example 1-56 |  |  | TDMC | 1 | 0.05 | 1.05 |  | 77 |
| Example 1-57 |  |  | EAc | 5 | 0.05 | 1.05 |  | 80 |
| Example 1-58 |  |  | MPy | 5 | 0.05 | 1.05 |  | 80 |
| Example 1-59 | 4.45 | Alumina | VC | 1 | 0.05 | 1.05 | — | 55 |
| Example 1-60 |  |  | VEC | 2 | 0.05 | 1.05 |  | 55 |
| Example 1-61 |  |  | VdEC | 1 | 0.05 | 1.05 |  | 54 |
| Example 1-62 |  |  | FEC | 5 | 0.05 | 1.05 |  | 58 |
| Example 1-63 |  |  | DFEC | 1 | 0.05 | 1.05 |  | 56 |
| Example 1-64 |  |  | DFDMC | 1 | 0.05 | 1.05 |  | 56 |
| Example 1-65 |  |  | PRS | 1 | 0.05 | 1.05 |  | 60 |
| Example 1-66 |  |  | SCAH | 1 | 0.05 | 1.05 |  | 59 |
| Example 1-67 |  |  | SBAH | 1 | 0.05 | 1.05 |  | 61 |
| Example 1-68 |  |  | PSAH | 1 | 0.05 | 1.05 |  | 63 |
| Example 1-69 |  |  | DDMC | 0.1 | 0.05 | 1.05 |  | 60 |
| Example 1-70 |  |  | DPC | 1 | 0.05 | 1.05 |  | 58 |
| Example 1-71 |  |  | SN | 2 | 0.05 | 1.05 |  | 60 |
| Example 1-72 |  |  | TCNQ | 1 | 0.05 | 1.05 |  | 59 |
| Example 1-73 |  |  | Li$_2$PO$_3$F | 0.1 | 0.05 | 1.05 |  | 59 |
| Example 1-74 |  |  | LiPO$_2$F$_2$ | 0.1 | 0.05 | 1.05 |  | 61 |
| Example 1-75 |  |  | DEC | 1 | 0.05 | 1.05 |  | 61 |
| Example 1-76 |  |  | MPC | 1 | 0.05 | 1.05 |  | 60 |
| Example 1-77 |  |  | TDMC | 1 | 0.05 | 1.05 |  | 60 |
| Example 1-78 |  |  | EAc | 5 | 0.05 | 1.05 |  | 61 |
| Example 1-79 |  |  | MPy | 5 | 0.05 | 1.05 |  | 60 |
| Comparative Example 1-1 | 4.3 | — | — | — | — | 1.1 | — | 76 |
| Comparative Example 1-2 |  | Alumina | — | — | — | 1.1 | — | 66 |
| Comparative Example 1-3 |  | Alumina | VC | 1 | — | 1.1 | — | 56 |
| Comparative Example 1-4 |  | Alumina | VEC | 2 | — | 1.1 | — | 60 |
| Comparative Example 1-5 |  | Alumina | VdEC | 1 | — | 1.1 | — | 57 |
| Comparative Example 1-6 |  | Alumina | FEC | 5 | — | 1.1 | — | 56 |
| Comparative Example 1-7 |  | Alumina | DFEC | 1 | — | 1.1 | — | 55 |
| Comparative Example 1-8 |  | Alumina | DFDMC | 1 | — | 1.1 | — | 60 |
| Comparative Example 1-9 |  | Alumina | PRS | 1 | — | 1.1 | — | 58 |
| Comparative Example 1-10 |  | Alumina | SCAH | 1 | — | 1.1 | — | 55 |
| Comparative Example 1-11 |  | Alumina | SBAH | 1 | — | 1.1 | — | 54 |
| Comparative Example 1-12 |  | Alumina | PSAH | 1 | — | 1.1 | — | 53 |
| Comparative Example 1-13 |  | Alumina | DDMC | 0.1 | — | 1.1 | — | 57 |
| Comparative Example 1-14 |  | Alumina | DPC | 1 | — | 1.1 | — | 59 |
| Comparative Example 1-15 |  | Alumina | SN | 2 | — | 1.1 | — | 58 |
| Comparative Example 1-16 |  | Alumina | TCNQ | 1 | — | 1.1 | — | 59 |
| Comparative Example 1-17 |  | Alumina | Li$_2$PO$_3$F | 0.1 | — | 1.1 | — | 58 |
| Comparative Example 1-18 |  | Alumina | LiPO$_2$F$_2$ | 0.1 | — | 1.1 | — | 57 |
| Comparative Example 1-19 |  | Alumina | DEC | 1 | — | 1.1 | — | 55 |
| Comparative Example 1-20 |  | Alumina | MPC | 1 | — | 1.1 | — | 55 |
| Comparative Example 1-21 |  | Alumina | TDMC | 1 | — | 1.1 | — | 52 |
| Comparative Example 1-22 |  | Alumina | EAc | 5 | — | 1.1 | — | 58 |
| Comparative Example 1-23 |  | Alumina | MPy | 5 | — | 1.1 | — | 57 |

TABLE 1-continued

|  | Charge voltage [V] | Insulating material | Additive Material | Additive Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Comparative Example 1-24 |  | Alumina | VC | 1 | — | 1.05 | 0.05 | 56 |
| Comparative Example 1-25 | 4.45 | — | — | — | — | 1.1 | — | 58 |
| Comparative Example 1-26 |  | Alumina | — | 0.1 | — | 1.1 | — | 37 |

As can be seen from Table 1, the inclusion of LiFSI in the electrolytic solution made it possible to suppress the deterioration of the low temperature cycle characteristics in Examples 1-1 to 1-79, despite the insulating layer formed on the negative electrode. On the other hand, the low temperature cycle characteristics lowered in Comparative Examples 1-2 and 1-26, in which the insulating layer was formed on the negative electrode, and in which the electrolytic solution did not contain LiFSI. The low temperature cycle characteristics lowered even further in Comparative Examples 1-3 to 1-24, in which the insulating layer was formed on the negative electrode, and in which the electrolytic solution contained additives.

Examples 2-1 to 2-79

Secondary batteries were fabricated in the same manner as in Examples 1-1 to 1-79, except that the insulating layer was not formed on the negative electrode, and that the separator had heat-resistant insulating layers formed on the both surfaces.
(Formation of Insulating Layer)
A PVdF solution was prepared in which the insulating material ceramic alumina was dispersed at a PVdF:alumina ratio of 20:80 (mass ratio). Then, a microporous polyethylene separator having a thickness of 16 μm was dipped in the alumina-dispersed PVdF solution, and dried with 80° C. heated air after removing NMP with water. As a result, heat-resistant insulating layers having a total thickness of 4.5 μm were formed on the both surfaces of the microporous polyethylene separator, and a separator with the heat-resistant insulating layers was fabricated.

Comparative Example 2-1

A secondary battery was fabricated in the same manner as in Example 2-1, except that the insulating layer was not formed, and that the electrolyte salt LiFSI was not mixed and LiPF$_6$ was mixed in 1.1 mol/L without adding the additive VC for the preparation of the electrolytic solution.

Comparative Example 2-2

A secondary battery was fabricated in the same manner as in Example 2-1, except that the electrolyte salt LiFSI was not mixed and LiPF$_6$ was mixed in 1.1 mol/L without adding VC for the preparation of the electrolytic solution.

Comparative Examples 2-3 to 2-23

Secondary batteries were fabricated in the same manner as in Examples 2-1 to 2-21, except that the electrolyte salt LiFSI was not mixed and LiPF$_6$ was mixed in 1.1 mol/L for the preparation of the electrolytic solution.

Comparative Example 2-24

A secondary battery was fabricated in the same manner as in Example 2-1, except that the electrolyte salt LiTFSI, instead of LiFSI, was mixed in 0.05 mol/L for the preparation of the electrolytic solution.

Comparative Example 2-25

A secondary battery was fabricated in the same manner as in Example 2-43, except that the insulating layer was not formed, and that the electrolyte salt LiFSI was not mixed and LiPF$_6$ was mixed in 1.1 mol/L without adding VC for the preparation of the electrolytic solution.

Comparative Example 2-26

A secondary battery was fabricated in the same manner as in Example 2-43, except that the electrolyte salt LiFSI was not mixed and LiPF$_6$ was mixed in 1.1 mol/L without adding VC for the preparation of the electrolytic solution.
(Low Temperature Cycle Characteristics)
The secondary batteries fabricated as above were measured for low temperature cycle characteristics, as above. The charge voltage shown in Table 2 was used. The measurement results are presented in Table 2.

TABLE 2

|  | Charge voltage [V] | Insulating material | Additive Material | Additive Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 2-1 | 4.3 | Alumina | VC | 1 | 0.05 | 1.05 | — | 74 |
| Example 2-2 |  |  | VEC | 2 | 0.05 | 1.05 |  | 72 |
| Example 2-3 |  |  | VdEC | 1 | 0.05 | 1.05 |  | 72 |
| Example 2-4 |  |  | FEC | 0.1 | 0.05 | 1.05 |  | 62 |

TABLE 2-continued

|  | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 2-5 |  |  | FEC | 1 | 0.05 | 1.05 |  | 72 |
| Example 2-6 |  |  | FEC | 5 | 0.01 | 1.09 |  | 65 |
| Example 2-7 |  |  | FEC | 5 | 0.05 | 1.05 |  | 76 |
| Example 2-8 |  |  | FEC | 5 | 0.1 | 1 |  | 75 |
| Example 2-9 |  |  | FEC | 5 | 0.2 | 0.9 |  | 74 |
| Example 2-10 |  |  | FEC | 5 | 0.5 | 0.6 |  | 67 |
| Example 2-11 |  |  | FEC | 10 | 0.05 | 1.05 |  | 76 |
| Example 2-12 |  |  | FEC | 20 | 0.05 | 1.05 |  | 73 |
| Example 2-13 |  |  | FEC/VC | 5/1 | 0.05 | 1.05 |  | 74 |
| Example 2-14 |  |  | FEC/SN | 5/2 | 0.05 | 1.05 |  | 79 |
| Example 2-15 |  |  | FEC/PSAH | 5/1 | 0.05 | 1.05 |  | 77 |
| Example 2-16 |  |  | DFEC | 1 | 0.05 | 1.05 |  | 74 |
| Example 2-17 |  |  | DFDMC | 1 | 0.05 | 1.05 |  | 75 |
| Example 2-18 |  |  | PRS | 1 | 0.05 | 1.05 |  | 77 |
| Example 2-19 |  |  | SCAH | 1 | 0.05 | 1.05 |  | 77 |
| Example 2-20 |  |  | SBAH | 1 | 0.05 | 1.05 |  | 76 |
| Example 2-21 |  |  | PSAH | 1 | 0.05 | 1.05 |  | 81 |
| Example 2-22 |  |  | DDMC | 0.1 | 0.05 | 1.05 |  | 78 |
| Example 2-23 |  |  | DPC | 1 | 0.05 | 1.05 |  | 76 |
| Example 2-24 |  |  | SN | 0.5 | 0.05 | 1.05 |  | 77 |
| Example 2-25 |  |  | SN | 2 | 0.05 | 1.05 |  | 79 |
| Example 2-26 |  |  | SN | 5 | 0.05 | 1.05 |  | 72 |
| Example 2-27 |  |  | AN | 0.5 | 0.05 | 1.05 |  | 74 |
| Example 2-28 |  |  | AN | 2 | 0.05 | 1.05 |  | 79 |
| Example 2-29 |  |  | AN | 5 | 0.05 | 1.05 |  | 70 |
| Example 2-30 |  |  | TCNQ | 1 | 0.05 | 1.05 |  | 77 |
| Example 2-31 |  |  | Li$_2$PO$_3$F | 0.1 | 0.05 | 1.05 |  | 78 |
| Example 2-32 |  |  | LiPO$_2$F$_2$ | 0.1 | 0.05 | 1.05 |  | 79 |
| Example 2-33 |  |  | DEC | 1 | 0.05 | 1.05 |  | 79 |
| Example 2-34 |  |  | MPC | 1 | 0.05 | 1.05 |  | 77 |
| Example 2-35 |  |  | TDMC | 1 | 0.05 | 1.05 |  | 77 |
| Example 2-36 |  |  | EAc | 5 | 0.05 | 1.05 |  | 79 |
| Example 2-37 |  |  | MPy | 5 | 0.05 | 1.05 |  | 79 |
| Example 2-38 | 4.3 | Silica | VC | 1 | 0.05 | 1.05 | — | 71 |
| Example 2-39 |  |  | VEC | 2 | 0.05 | 1.05 |  | 70 |
| Example 2-40 |  |  | VdEC | 1 | 0.05 | 1.05 |  | 70 |
| Example 2-41 |  |  | FEC | 5 | 0.05 | 1.05 |  | 76 |
| Example 2-42 |  |  | DFEC | 1 | 0.05 | 1.05 |  | 70 |
| Example 2-43 |  |  | DFDMC | 1 | 0.05 | 1.05 |  | 71 |
| Example 2-44 |  |  | PRS | 1 | 0.05 | 1.05 |  | 76 |
| Example 2-45 |  |  | SCAH | 1 | 0.05 | 1.05 |  | 78 |
| Example 2-46 |  |  | SBAH | 1 | 0.05 | 1.05 |  | 76 |
| Example 2-47 |  |  | PSAH | 1 | 0.05 | 1.05 |  | 78 |
| Example 2-48 |  |  | DDMC | 0.1 | 0.05 | 1.05 |  | 76 |
| Example 2-49 |  |  | DPC | 1 | 0.05 | 1.05 |  | 76 |
| Example 2-50 |  |  | SN | 2 | 0.05 | 1.05 |  | 77 |
| Example 2-51 |  |  | TCNQ | 1 | 0.05 | 1.05 |  | 76 |
| Example 2-52 |  |  | Li$_2$PO$_3$F | 0.1 | 0.05 | 1.05 |  | 77 |
| Example 2-53 |  |  | LiPO$_2$F$_2$ | 0.1 | 0.05 | 1.05 |  | 78 |
| Example 2-54 |  |  | DEC | 1 | 0.05 | 1.05 |  | 78 |
| Example 2-55 |  |  | MPC | 1 | 0.05 | 1.05 |  | 77 |
| Example 2-56 |  |  | TDMC | 1 | 0.05 | 1.05 |  | 75 |
| Example 2-57 |  |  | EAc | 5 | 0.05 | 1.05 |  | 77 |
| Example 2-58 |  |  | MPy | 5 | 0.05 | 1.05 |  | 77 |
| Example 2-59 | 4.45 | Alumina | VC | 1 | 0.05 | 1.05 | — | 53 |
| Example 2-60 |  |  | VEC | 2 | 0.05 | 1.05 |  | 54 |
| Example 2-61 |  |  | VdEC | 1 | 0.05 | 1.05 |  | 52 |
| Example 2-62 |  |  | FEC | 5 | 0.05 | 1.05 |  | 57 |
| Example 2-63 |  |  | DFEC | 1 | 0.05 | 1.05 |  | 55 |
| Example 2-64 |  |  | DFDMC | 1 | 0.05 | 1.05 |  | 54 |
| Example 2-65 |  |  | PRS | 1 | 0.05 | 1.05 |  | 59 |
| Example 2-66 |  |  | SCAH | 1 | 0.05 | 1.05 |  | 58 |
| Example 2-67 |  |  | SBAH | 1 | 0.05 | 1.05 |  | 60 |
| Example 2-68 |  |  | PSAH | 1 | 0.05 | 1.05 |  | 63 |
| Example 2-69 |  |  | DDMC | 0.1 | 0.05 | 1.05 |  | 60 |
| Example 2-70 |  |  | DPC | 1 | 0.05 | 1.05 |  | 55 |
| Example 2-71 |  |  | SN | 2 | 0.05 | 1.05 |  | 57 |
| Example 2-72 |  |  | TCNQ | 1 | 0.05 | 1.05 |  | 60 |
| Example 2-73 |  |  | Li$_2$PO$_3$F | 0.1 | 0.05 | 1.05 |  | 57 |
| Example 2-74 |  |  | LiPO$_2$F$_2$ | 0.1 | 0.05 | 1.05 |  | 60 |
| Example 2-75 |  |  | DEC | 1 | 0.05 | 1.05 |  | 59 |
| Example 2-76 |  |  | MPC | 1 | 0.05 | 1.05 |  | 58 |
| Example 2-77 |  |  | TDMC | 1 | 0.05 | 1.05 |  | 56 |

TABLE 2-continued

| | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 2-78 | | | EAc | 5 | 0.05 | 1.05 | | 60 |
| Example 2-79 | | | MPy | 5 | 0.05 | 1.05 | | 60 |
| Comparative Example 2-1 | 4.3 | — | — | — | — | 1.1 | — | 76 |
| Comparative Example 2-2 | | Alumina | — | — | — | 1.1 | — | 60 |
| Comparative Example 2-3 | | Alumina | VC | 1 | — | 1.1 | — | 50 |
| Comparative Example 2-4 | | Alumina | VEC | 2 | — | 1.1 | — | 53 |
| Comparative Example 2-5 | | Alumina | VdEC | 1 | — | 1.1 | — | 51 |
| Comparative Example 2-6 | | Alumina | FEC | 5 | — | 1.1 | — | 50 |
| Comparative Example 2-7 | | Alumina | DFEC | 1 | — | 1.1 | — | 49 |
| Comparative Example 2-8 | | Alumina | DFDMC | 1 | — | 1.1 | — | 53 |
| Comparative Example 2-9 | | Alumina | PRS | 1 | — | 1.1 | — | 54 |
| Comparative Example 2-10 | | Alumina | SCAH | 1 | — | 1.1 | — | 50 |
| Comparative Example 2-11 | | Alumina | SBAH | 1 | — | 1.1 | — | 49 |
| Comparative Example 2-12 | | Alumina | PSAH | 1 | — | 1.1 | — | 47 |
| Comparative Example 2-13 | | Alumina | DDMC | 0.1 | — | 1.1 | — | 51 |
| Comparative Example 2-14 | | Alumina | DPC | 1 | — | 1.1 | — | 52 |
| Comparative Example 2-15 | | Alumina | SN | 2 | — | 1.1 | — | 52 |
| Comparative Example 2-16 | | Alumina | TCNQ | 1 | — | 1.1 | — | 53 |
| Comparative Example 2-17 | | Alumina | Li$_2$PO$_3$F | 0.1 | — | 1.1 | — | 52 |
| Comparative Example 2-18 | | Alumina | LiPO$_2$F$_2$ | 0.1 | — | 1.1 | — | 53 |
| Comparative Example 2-19 | | Alumina | DEC | 1 | — | 1.1 | — | 53 |
| Comparative Example 2-20 | | Alumina | MPC | 1 | — | 1.1 | — | 52 |
| Comparative Example 2-21 | | Alumina | TDMC | 1 | — | 1.1 | — | 50 |
| Comparative Example 2-22 | | Alumina | EAc | 5 | — | 1.1 | — | 53 |
| Comparative Example 2-23 | | Alumina | MPy | 5 | — | 1.1 | — | 51 |
| Comparative Example 2-24 | | Alumina | VC | 1 | — | 1.1 | — | 51 |
| Comparative Example 2-25 | 4.45 | — | — | — | — | 1.1 | — | 58 |
| Comparative Example 2-26 | | Alumina | — | 0.1 | — | 1.1 | — | 30 |

It can be seen from Table 2 that the inclusion of LiFSI in the electrolytic solution made it possible to suppress the deterioration of the low temperature cycle characteristics in Examples 2-1 to 2-79, despite the insulating layers formed on the both surfaces of the separator. On the other hand, the low temperature cycle characteristics lowered in Comparative Examples 2-2 and 2-26, in which the insulating layer was formed on the both surfaces of the separator, and in which the electrolytic solution did not contain LiFSI. The low temperature cycle characteristics lowered even further in Comparative Examples 2-3 to 2-24, in which the insulating layer was formed on the both surfaces of the separator, and in which the electrolytic solution contained additives.

Examples 3-1 to 3-37, Examples 3-59 to 3-79

Secondary batteries were fabricated in the same manner as in Examples 1-1 to 1-37 and Examples 1-59 to Example 1-79, except that the insulating layer was not formed on the negative electrode, and that a positive electrode active material was used that was obtained by forming the insulating layer on the surface of a lithium-cobalt composite oxide by using the method below.

(Formation of Insulating Layer)

A lithium.cobalt composite oxide having an average particles diameter of 11.0 μm, and alumina having an average particles diameter of 0.3 μm were used. The alumina was weighed, and 5 parts by mass of the alumina was lightly mixed with 95 parts by mass of the lithium-cobalt composite oxide. The mixture was then charged into a high-speed agitation mixer, a type of high-speed rotary impact grinder. The mixture was treated for 10 min with the rotor blades rotated at 2,000 rpm, and a lithium transition metal composite oxide was formed in which the alumina was partially in contact with the surface of the lithium-cobalt composite oxide particles.

The product was heated at a rate of 3° C./min, and allowed to cool after being maintained at 150° C. for 8 hours. As a result, a positive electrode active material having an average particles diameter of 12.8 μm was obtained (as measured by using a laser scattering method).

Examples 3-38 to 3-58

Secondary batteries were fabricated in the same manner as in Examples 3-1 to 3-3, Example 3-7, Examples 3-16 to 3-23, Example 3-25, and Examples 3-30 to 3-37, respectively, except that the insulating layer was not formed on the negative electrode, and that a positive electrode active material was used that was obtained by forming the insulating layer on the surface of a lithium-cobalt composite oxide by using the method below.
(Formation of Insulating Layer)

A lithium-cobalt composite oxide having an average particles diameter of 11.0 μl, and silica having an average particles diameter of 0.2 μm were used. The silica was weighed, and 5 parts by mass of the silica was lightly mixed with 95 parts by mass of the lithium-cobalt composite oxide. The mixture was then charged into a high-speed agitation mixer, a type of high-speed rotary impact grinder. The mixture was treated for 10 min with the rotor blades rotated at 2,000 rpm, and a lithium transition metal composite oxide was formed in which the silica was partially in contact with the surface of the lithium-cobalt composite oxide particles. The product was heated at a rate of 3° C./min, and allowed to cool after being maintained at 150° C. for 8 hours. As a result, a positive electrode active material having an average particles diameter of 12.6 μm was obtained (as measured by using a laser scattering method).

Comparative Example 3-1

A secondary battery was fabricated in the same manner as in Example 3-1, except that the insulating layer was not formed, and that the electrolyte salt LiFSI was not mixed and LiPF$_6$ was mixed in 1.1 mol/L without adding the additive VC for the preparation of the electrolytic solution.

Comparative Example 3-2

A secondary battery was fabricated in the same manner as in Example 3-1, except that the electrolyte salt LiFSI was not mixed and LiPF$_6$ was mixed in 1.1 mol/L without adding VC for the preparation of the electrolytic solution.

Comparative Examples 3-3 to 3-23

Secondary batteries were fabricated in the same manner as in Examples 3-1 to 3-21, respectively, except that the electrolyte salt LiFSI was not mixed and LiPF$_6$ was mixed in 1.1 mol/L for the preparation of the electrolytic solution.

Comparative Example 3-24

A secondary battery was fabricated in the same manner as in Example 3-1, except that the electrolyte salt LiTFSI, instead of LiFSI, was mixed in 0.05 mol/L for the preparation of the electrolytic solution.

Comparative Example 3-25

A secondary battery was fabricated in the same manner as in Example 3-43, except that the insulating layer was not formed, and that the electrolyte salt LiFSI was not mixed and LiPF$_6$ was mixed in 1.1 mol/L without adding VC for the preparation of the electrolytic solution.

Comparative Example 3-26

A secondary battery was fabricated in the same manner as in Example 3-43, except that the electrolyte salt LiFSI was not mixed and LiPF$_6$ was mixed in 1.1 mol/L without adding VC for the preparation of the electrolytic solution.
(Low Temperature Cycle Characteristics)

The secondary batteries fabricated as above were measured for low temperature cycle characteristics, as above. The charge voltage shown in Table 3 was used. The measurement results are presented in Table 3.

TABLE 3

| | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 3-1 | 4.3 | Alumina | VC | 1 | 0.05 | 1.05 | — | 77 |
| Example 3-2 | | | VEC | 2 | 0.05 | 1.05 | | 75 |
| Example 3-3 | | | VdEC | 1 | 0.05 | 1.05 | | 74 |
| Example 3-4 | | | FEC | 0.1 | 0.05 | 1.05 | | 63 |
| Example 3-5 | | | FEC | 1 | 0.05 | 1.05 | | 72 |
| Example 3-6 | | | FEC | 5 | 0.01 | 1.09 | | 66 |
| Example 3-7 | | | FEC | 5 | 0.05 | 1.05 | | 76 |
| Example 3-8 | | | FEC | 5 | 0.1 | 1 | | 75 |
| Example 3-9 | | | FEC | 5 | 0.2 | 0.9 | | 75 |
| Example 3-10 | | | FEC | 5 | 0.5 | 0.6 | | 69 |
| Example 3-11 | | | FEC | 10 | 0.05 | 1.05 | | 76 |
| Example 3-12 | | | FEC | 20 | 0.05 | 1.05 | | 74 |
| Example 3-13 | | | FEC/VC | 5/1 | 0.05 | 1.05 | | 77 |
| Example 3-14 | | | FEC/SN | 5/2 | 0.05 | 1.05 | | 84 |
| Example 3-15 | | | FEC/PSAH | 5/1 | 0.05 | 1.05 | | 83 |
| Example 3-16 | | | DFEC | 1 | 0.05 | 1.05 | | 77 |
| Example 3-17 | | | DFDMC | 1 | 0.05 | 1.05 | | 76 |
| Example 3-18 | | | PRS | 1 | 0.05 | 1.05 | | 82 |

TABLE 3-continued

|  | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 3-19 |  |  | SCAH | 1 | 0.05 | 1.05 |  | 82 |
| Example 3-20 |  |  | SBAH | 1 | 0.05 | 1.05 |  | 82 |
| Example 3-21 |  |  | PSAH | 1 | 0.05 | 1.05 |  | 83 |
| Example 3-22 |  |  | DDMC | 0.1 | 0.05 | 1.05 |  | 81 |
| Example 3-23 |  |  | DPC | 1 | 0.05 | 1.05 |  | 80 |
| Example 3-24 |  |  | SN | 0.5 | 0.05 | 1.05 |  | 82 |
| Example 3-25 |  |  | SN | 2 | 0.05 | 1.05 |  | 85 |
| Example 3-26 |  |  | SN | 5 | 0.05 | 1.05 |  | 80 |
| Example 3-27 |  |  | AN | 0.5 | 0.05 | 1.05 |  | 81 |
| Example 3-28 |  |  | AN | 2 | 0.05 | 1.05 |  | 83 |
| Example 3-29 |  |  | AN | 5 | 0.05 | 1.05 |  | 79 |
| Example 3-30 |  |  | TCNQ | 1 | 0.05 | 1.05 |  | 85 |
| Example 3-31 |  |  | Li$_2$PO$_3$F | 0.1 | 0.05 | 1.05 |  | 81 |
| Example 3-32 |  |  | LiPO$_2$F$_2$ | 0.1 | 0.05 | 1.05 |  | 84 |
| Example 3-33 |  |  | DEC | 1 | 0.05 | 1.05 |  | 82 |
| Example 3-34 |  |  | MPC | 1 | 0.05 | 1.05 |  | 82 |
| Example 3-35 |  |  | TDMC | 1 | 0.05 | 1.05 |  | 81 |
| Example 3-36 |  |  | EAc | 5 | 0.05 | 1.05 |  | 82 |
| Example 3-37 |  |  | MPy | 5 | 0.05 | 1.05 |  | 81 |
| Example 3-38 | 4.3 | Silica | VC | 1 | 0.05 | 1.05 | — | 73 |
| Example 3-39 |  |  | VEC | 2 | 0.05 | 1.05 |  | 75 |
| Example 3-40 |  |  | VdEC | 1 | 0.05 | 1.05 |  | 73 |
| Example 3-41 |  |  | FEC | 5 | 0.05 | 1.05 |  | 79 |
| Example 3-42 |  |  | DFEC | 1 | 0.05 | 1.05 |  | 77 |
| Example 3-43 |  |  | DFDMC | 1 | 0.05 | 1.05 |  | 76 |
| Example 3-44 |  |  | PRS | 1 | 0.05 | 1.05 |  | 82 |
| Example 3-45 |  |  | SCAH | 1 | 0.05 | 1.05 |  | 78 |
| Example 3-46 |  |  | SBAH | 1 | 0.05 | 1.05 |  | 78 |
| Example 3-47 |  |  | PSAH | 1 | 0.05 | 1.05 |  | 84 |
| Example 3-48 |  |  | DDMC | 0.1 | 0.05 | 1.05 |  | 81 |
| Example 3-49 |  |  | DPC | 1 | 0.05 | 1.05 |  | 77 |
| Example 3-50 |  |  | SN | 2 | 0.05 | 1.05 |  | 81 |
| Example 3-51 |  |  | TCNQ | 1 | 0.05 | 1.05 |  | 81 |
| Example 3-52 |  |  | Li$_2$PO$_3$F | 0.1 | 0.05 | 1.05 |  | 80 |
| Example 3-53 |  |  | LiPO$_2$F$_2$ | 0.1 | 0.05 | 1.05 |  | 81 |
| Example 3-54 |  |  | DEC | 1 | 0.05 | 1.05 |  | 80 |
| Example 3-55 |  |  | MPC | 1 | 0.05 | 1.05 |  | 79 |
| Example 3-56 |  |  | TDMC | 1 | 0.05 | 1.05 |  | 78 |
| Example 3-57 |  |  | EAc | 5 | 0.05 | 1.05 |  | 79 |
| Example 3-58 |  |  | MPy | 5 | 0.05 | 1.05 |  | 79 |
| Example 3-59 | 4.45 | Alumina | VC | 1 | 0.05 | 1.05 | — | 55 |
| Example 3-60 |  |  | VEC | 2 | 0.05 | 1.05 |  | 55 |
| Example 3-61 |  |  | VdEC | 1 | 0.05 | 1.05 |  | 53 |
| Example 3-62 |  |  | FEC | 5 | 0.05 | 1.05 |  | 59 |
| Example 3-63 |  |  | DFEC | 1 | 0.05 | 1.05 |  | 57 |
| Example 3-64 |  |  | DFDMC | 1 | 0.05 | 1.05 |  | 58 |
| Example 3-65 |  |  | PRS | 1 | 0.05 | 1.05 |  | 63 |
| Example 3-66 |  |  | SCAH | 1 | 0.05 | 1.05 |  | 61 |
| Example 3-67 |  |  | SBAH | 1 | 0.05 | 1.05 |  | 63 |
| Example 3-68 |  |  | PSAH | 1 | 0.05 | 1.05 |  | 66 |
| Example 3-69 |  |  | DDMC | 0.1 | 0.05 | 1.05 |  | 63 |
| Example 3-70 |  |  | DPC | 1 | 0.05 | 1.05 |  | 61 |
| Example 3-71 |  |  | SN | 2 | 0.05 | 1.05 |  | 62 |
| Example 3-72 |  |  | TCNQ | 1 | 0.05 | 1.05 |  | 60 |
| Example 3-73 |  |  | Li$_2$PO$_3$F | 0.1 | 0.05 | 1.05 |  | 60 |
| Example 3-74 |  |  | LiPO$_2$F$_2$ | 0.1 | 0.05 | 1.05 |  | 61 |
| Example 3-75 |  |  | DEC | 1 | 0.05 | 1.05 |  | 59 |
| Example 3-76 |  |  | MPC | 1 | 0.05 | 1.05 |  | 58 |
| Example 3-77 |  |  | TDMC | 1 | 0.05 | 1.05 |  | 55 |
| Example 3-78 |  |  | EAc | 5 | 0.05 | 1.05 |  | 58 |
| Example 3-79 |  |  | MPy | 5 | 0.05 | 1.05 |  | 59 |
| Comparative Example 3-1 | 4.3 | — | — | — | — | 1.1 | — | 76 |
| Comparative Example 3-2 |  | Alumina | — | — |  | 1.1 |  | 71 |
| Comparative Example 3-3 |  | Alumina | VC | 1 |  | 1.1 |  | 64 |
| Comparative Example 3-4 |  | Alumina | VEC | 2 |  | 1.1 |  | 63 |
| Comparative Example 3-5 |  | Alumina | VdEC | 1 |  | 1.1 |  | 64 |
| Comparative Example 3-6 |  | Alumina | FEC | 5 |  | 1.1 |  | 63 |

TABLE 3-continued

| | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Comparative Example 3-7 | | Alumina | DFEC | 1 | — | 1.1 | | 59 |
| Comparative Example 3-8 | | Alumina | DFDMC | 1 | — | 1.1 | | 63 |
| Comparative Example 3-9 | | Alumina | PRS | 1 | — | 1.1 | | 64 |
| Comparative Example 3-10 | | Alumina | SCAH | 1 | — | 1.1 | | 60 |
| Comparative Example 3-11 | | Alumina | SBAH | 1 | — | 1.1 | | 59 |
| Comparative Example 3-12 | | Alumina | PSAH | 1 | — | 1.1 | | 57 |
| Comparative Example 3-13 | | Alumina | DDMC | 0.1 | — | 1.1 | | 61 |
| Comparative Example 3-14 | | Alumina | DPC | 1 | — | 1.1 | | 62 |
| Comparative Example 3-15 | | Alumina | SN | 2 | — | 1.1 | | 62 |
| Comparative Example 3-16 | | Alumina | TCNQ | 1 | — | 1.1 | | 63 |
| Comparative Example 3-17 | | Alumina | Li$_2$PO$_3$F | 0.1 | — | 1.1 | | 62 |
| Comparative Example 3-18 | | Alumina | LiPO$_2$F$_2$ | 0.1 | — | 1.1 | | 63 |
| Comparative Example 3-19 | | Alumina | DEC | 1 | — | 1.1 | | 61 |
| Comparative Example 3-20 | | Alumina | MPC | 1 | — | 1.1 | | 62 |
| Comparative Example 3-21 | | Alumina | TDMC | 1 | — | 1.1 | | 60 |
| Comparative Example 3-22 | | Alumina | EAc | 5 | — | 1.1 | | 59 |
| Comparative Example 3-23 | | Alumina | MPy | 5 | — | 1.1 | — | 60 |
| Comparative Example 3-24 | | Alumina | VC | 1 | — | 1.05 | 0.05 | 65 |
| Comparative Example 3-25 | 4.45 | — | — | — | — | 1.1 | — | 58 |
| Comparative Example 3-26 | | Alumina | — | 0.1 | — | 1.1 | — | 30 |

As can be seen from Table 3, the inclusion of LiFSI in the electrolytic solution made it possible to suppress the deterioration of the low temperature cycle characteristics in Examples 3-1 to 3-63, despite the insulating layer formed on the positive electrode. On the other hand, the low temperature cycle characteristics lowered in Comparative Examples 3-2 and 3-26, in which the insulating layer was formed on the positive electrode, and in which the electrolytic solution did not contain LiFSI. The low temperature cycle characteristics lowered even further in Comparative Examples 3-3 to 3-24, in which the insulating layer was formed on the both surfaces of the separator, and in which the electrolytic solution contained additives.

Example 4-1

A secondary battery was fabricated that included an insulating layer containing insulating particles mixed with a gel electrolyte, as follows.
(Fabrication of Positive Electrode)
First, the positive electrode 21 was fabricated. Specifically, lithium carbonate (Li$_2$CO$_3$) and cobalt carbonate (CoCO$_3$) were mixed at a 0.5:1 molar ratio, and calcined in air at 900° C. for 5 hours to obtain a lithium-cobalt composite oxide (LiCoO$_2$).

The positive electrode active material lithium-cobalt composite oxide (91 parts by mass), the conductive agent graphite (6 parts by mass), and the binder polyvinylidene fluoride (3 parts by mass) were then mixed to prepare a positive electrode mixture, and dispersed in N-methyl-2-pyrrolidone to obtain a paste-like positive electrode mixture slurry. Finally, the positive electrode mixture slurry was applied to the both surfaces of a positive electrode collector realized by a belt-like aluminum foil (12 μm thick), dried, and compression molded with a roller press machine to form a positive electrode active material layer. An aluminum positive electrode lead was then welded to one end of the positive electrode collector.
(Fabrication of Negative Electrode)
The negative electrode active material granular graphite powder having an average particle diameter of 20 μm (97 parts by mass), PVdF (3 parts by mass), and an appropriate amount of NMP were stirred to prepare a negative electrode slurry. The negative electrode mixture slurry was then evenly applied to the both surfaces of a negative electrode collector realized by a 15-μm thick belt-like copper foil, dried, and compression molded to form a negative electrode active material layer. Here, the amounts of the positive electrode active material and the negative electrode active material were adjusted to make the open circuit voltage (i.e., battery voltage) in the fully charged state 4.3 V.

(Formation of Gel Electrolyte Layer (Insulating Layer))

A gel electrolyte layer containing alumina particles as an insulating material ceramic was formed as an insulating layer on the positive and negative electrodes fabricated as above. The gel electrolyte layer was formed by obtaining a sol-like electrolyte solution prepared by mixing, stirring, and dissolving polyvinylidene fluoride having 6.90 hexafluoropropylene copolymerized, an alumina particle powder having an average particle diameter of 0.3 μl, a nonaqueous electrolytic solution, and dimethyl carbonate.

The nonaqueous electrolytic solution was prepared as follows. Specifically, a 1:1 (mass ratio) mixed solvent of ethylene carbonate (EC) and propylene carbonate (PC) was prepared. VC was then added in 1 mass % to the mixed solvent to prepare an additive solution. Then, the electrolyte salts LiFSI (0.05 mol/L) and $LiPF_6$ (1.05 mol/L) were dissolved in the mixed solvent to prepare an electrolytic solution.

The resulting sol-like electrolyte solution was then evenly applied to the both surfaces of the positive and negative electrodes, followed by drying to remove the solvent. As a result, a gel electrolyte layer was formed on the both surfaces of the positive and negative electrodes.

(Battery Assemble)

The belt-like positive electrode and the belt-like negative electrode each having the gel electrolyte layer formed on the both surfaces were laminated to prepare a laminate, and the laminate was wound along the longitudinal direction to obtain an wound electrode unit. Finally, the wound unit was sandwiched between exterior films each formed as a pair of resin films sandwiching an aluminum foil. The exterior films were closed by heat fusing the film peripheries under reduced pressure to seal the wound unit in the fused exterior films. Here, the positive and negative electrode terminals were sandwiched between the exterior films in such a manner that the portions of the electrodes with resin pieces were placed at the sealed portion of the exterior films. This completed the gel electrolyte battery (secondary battery).

Examples 4-2 to 4-37

Secondary batteries were fabricated in the same manner as in Example 4-1, except that the same material and amount of the additives, and the same material and amount of the electrolyte salts as those used in Examples 1-2 to 1-37 were used for the preparation of the electrolytic solution.

Examples 4-38 to 4-58

Secondary batteries were fabricated in the same manner as in Examples 4-1 to 4-3, Example 4-7, Examples 4-16 to 4-23, Example 4-25, and Examples 4-30 to 4-37, except that silica particles, instead of alumina particles, were used as the insulating material ceramic.

Examples 4-59 to 4-79

Secondary batteries were fabricated in the same manner as in Examples 4-1 to 4-3, Example 4-7, Examples 4-16 to 4-23, Example 4-25, and Examples 4-30 to 4-37, except that the amounts of the positive and negative electrode active materials were adjusted to make the charge termination voltage 4.45 V.

Comparative Example 4-1

A secondary battery was fabricated in the same manner as in Example 4-1, except that the insulating layer was not formed, and that the electrolyte salt LiFSI was not mixed and $LiPF_6$ was mixed in 1.1 mol/L without adding the additive VC for the preparation of the electrolytic solution.

Comparative Example 4-2

A secondary battery was fabricated in the same manner as in Example 4-1, except that the electrolyte salt LiFSI was not mixed and $LiPF_6$ was mixed in 1.1 mol/L without adding VC for the preparation of the electrolytic solution.

Comparative Examples 4-3 to 4-23

Secondary batteries were fabricated in the same manner as in Examples 4-1 to 4-21, except that the electrolyte salt LiFSI was not mixed and $LiPF_6$ was mixed in 1.1 mol/L for the preparation of the electrolytic solution.

Comparative Example 4-24

A secondary battery was fabricated in the same manner as in Example 4-1, except that the electrolyte salt LiTFSI, instead of LiFSI, was mixed in 0.05 mol/L for the preparation of the electrolytic solution.

Comparative Example 4-25

A secondary battery was fabricated in the same manner as in Example 4-43, except that the insulating layer was not formed, and that the electrolyte salt LiFSI was not mixed and $LiPF_6$ was mixed in 1.1 mol/L without adding VC for the preparation of the electrolytic solution.

Comparative Example 4-26

A secondary battery was fabricated in the same manner as in Example 4-43, except that the electrolyte salt LiFSI was not mixed and $LiPF_6$ was mixed in 1.1 mol/L without adding VC for the preparation of the electrolytic solution.

(Low Temperature Cycle Characteristics)

The secondary batteries fabricated as above were measured for low temperature cycle characteristics, as above. The charge voltage shown in Table 4 was used. The measurement results are presented in Table 4.

TABLE 4

| | Charge voltage [V] | Insulating material | Additive Material | Additive Amount [mass %] | LiFSI amount [mol/L] | $LiPF_6$ amount [mol/L] | LiTFSI amount [mol/L] | Percentage remaining discharge capacity [%] |
|---|---|---|---|---|---|---|---|---|
| Example 4-1 | 4.3 | Alumina | VC | 1 | 0.05 | 1.05 | — | 59 |
| Example 4-2 | | | VEC | 2 | 0.05 | 1.05 | | 61 |
| Example 4-3 | | | VdEC | 1 | 0.05 | 1.05 | | 58 |

TABLE 4-continued

| | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 4-4 | | | FEC | 0.1 | 0.05 | 1.05 | | 47 |
| Example 4-5 | | | FEC | 1 | 0.05 | 1.05 | | 58 |
| Example 4-6 | | | FEC | 5 | 0.01 | 1.09 | | 53 |
| Example 4-7 | | | FEC | 5 | 0.05 | 1.05 | | 61 |
| Example 4-8 | | | FEC | 5 | 0.1 | 1 | | 60 |
| Example 4-9 | | | FEC | 5 | 0.2 | 0.9 | | 58 |
| Example 4-10 | | | FEC | 5 | 0.5 | 0.6 | | 48 |
| Example 4-11 | | | FEC | 10 | 0.05 | 1.05 | | 59 |
| Example 4-12 | | | FEC | 20 | 0.05 | 1.05 | | 56 |
| Example 4-13 | | | FEC/VC | 5/1 | 0.05 | 1.05 | | 60 |
| Example 4-14 | | | FEC/SN | 5/2 | 0.05 | 1.05 | | 65 |
| Example 4-15 | | | FEC/PSAH | 5/1 | 0.05 | 1.05 | | 65 |
| Example 4-16 | | | DFEC | 1 | 0.05 | 1.05 | | 60 |
| Example 4-17 | | | DFDMC | 1 | 0.05 | 1.05 | | 60 |
| Example 4-18 | | | PRS | 1 | 0.05 | 1.05 | | 64 |
| Example 4-19 | | | SCAH | 1 | 0.05 | 1.05 | | 62 |
| Example 4-20 | | | SBAH | 1 | 0.05 | 1.05 | | 60 |
| Example 4-21 | | | PSAH | 1 | 0.05 | 1.05 | | 65 |
| Example 4-22 | | | DDMC | 0.1 | 0.05 | 1.05 | | 64 |
| Example 4-23 | | | DPC | 1 | 0.05 | 1.05 | | 62 |
| Example 4-24 | | | SN | 0.5 | 0.05 | 1.05 | | 62 |
| Example 4-25 | | | SN | 2 | 0.05 | 1.05 | | 65 |
| Example 4-26 | | | SN | 5 | 0.05 | 1.05 | | 60 |
| Example 4-27 | | | AN | 0.5 | 0.05 | 1.05 | | 60 |
| Example 4-28 | | | AN | 2 | 0.05 | 1.05 | | 64 |
| Example 4-29 | | | AN | 5 | 0.05 | 1.05 | | 58 |
| Example 4-30 | | | TCNQ | 1 | 0.05 | 1.05 | | 63 |
| Example 4-31 | | | Li$_2$PO$_3$F | 0.1 | 0.05 | 1.05 | | 65 |
| Example 4-32 | | | LiPO$_2$F$_2$ | 0.1 | 0.05 | 1.05 | | 65 |
| Example 4-33 | | | DEC | 1 | 0.05 | 1.05 | | 63 |
| Example 4-34 | | | MPC | 1 | 0.05 | 1.05 | | 63 |
| Example 4-35 | | | TDMC | 1 | 0.05 | 1.05 | | 61 |
| Example 4-36 | | | EAc | 5 | 0.05 | 1.05 | | 66 |
| Example 4-37 | | | MPy | 5 | 0.05 | 1.05 | | 65 |
| Example 4-38 | 4.3 | Silica | VC | 1 | 0.05 | 1.05 | — | 58 |
| Example 4-39 | | | VEC | 2 | 0.05 | 1.05 | | 58 |
| Example 4-40 | | | VdEC | 1 | 0.05 | 1.05 | | 56 |
| Example 4-41 | | | FEC | 5 | 0.05 | 1.05 | | 60 |
| Example 4-42 | | | DFEC | 1 | 0.05 | 1.05 | | 60 |
| Example 4-43 | | | DFDMC | 1 | 0.05 | 1.05 | | 58 |
| Example 4-44 | | | PRS | 1 | 0.05 | 1.05 | | 61 |
| Example 4-45 | | | SCAH | 1 | 0.05 | 1.05 | | 63 |
| Example 4-46 | | | SBAH | 1 | 0.05 | 1.05 | | 61 |
| Example 4-47 | | | PSAH | 1 | 0.05 | 1.05 | | 63 |
| Example 4-48 | | | DDMC | 0.1 | 0.05 | 1.05 | | 62 |
| Example 4-49 | | | DPC | 1 | 0.05 | 1.05 | | 60 |
| Example 4-50 | | | SN | 2 | 0.05 | 1.05 | | 62 |
| Example 4-51 | | | TCNQ | 1 | 0.05 | 1.05 | | 61 |
| Example 4-52 | | | Li$_2$PO$_3$F | 0.1 | 0.05 | 1.05 | | 62 |
| Example 4-53 | | | LiPO$_2$F$_2$ | 0.1 | 0.05 | 1.05 | | 63 |
| Example 4-54 | | | DEC | 1 | 0.05 | 1.05 | | 62 |
| Example 4-55 | | | MPC | 1 | 0.05 | 1.05 | | 62 |
| Example 4-56 | | | TDMC | 1 | 0.05 | 1.05 | | 60 |
| Example 4-57 | | | EAc | 5 | 0.05 | 1.05 | | 64 |
| Example 4-58 | | | MPy | 5 | 0.05 | 1.05 | | 64 |
| Example 4-59 | 4.45 | Alumina | VC | 1 | 0.05 | 1.05 | — | 49 |
| Example 4-60 | | | VEC | 2 | 0.05 | 1.05 | | 46 |
| Example 4-61 | | | VdEC | 1 | 0.05 | 1.05 | | 45 |
| Example 4-62 | | | FEC | 5 | 0.05 | 1.05 | | 52 |
| Example 4-63 | | | DFEC | 1 | 0.05 | 1.05 | | 51 |
| Example 4-64 | | | DFDMC | 1 | 0.05 | 1.05 | | 50 |
| Example 4-65 | | | PRS | 1 | 0.05 | 1.05 | | 52 |
| Example 4-66 | | | SCAH | 1 | 0.05 | 1.05 | | 52 |
| Example 4-67 | | | SBAH | 1 | 0.05 | 1.05 | | 54 |
| Example 4-68 | | | PSAH | 1 | 0.05 | 1.05 | | 56 |
| Example 4-69 | | | DDMC | 0.1 | 0.05 | 1.05 | | 54 |
| Example 4-70 | | | DPC | 1 | 0.05 | 1.05 | | 50 |
| Example 4-71 | | | SN | 2 | 0.05 | 1.05 | | 53 |
| Example 4-72 | | | TCNQ | 1 | 0.05 | 1.05 | | 52 |
| Example 4-73 | | | Li$_2$PO$_3$F | 0.1 | 0.05 | 1.05 | | 50 |
| Example 4-74 | | | LiPO$_2$F$_2$ | 0.1 | 0.05 | 1.05 | | 54 |
| Example 4-75 | | | DEC | 1 | 0.05 | 1.05 | | 52 |
| Example 4-76 | | | MPC | 1 | 0.05 | 1.05 | | 52 |

TABLE 4-continued

| | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 4-77 | | | TDMC | 1 | 0.05 | 1.05 | | 51 |
| Example 4-78 | | | EAc | 5 | 0.05 | 1.05 | | 54 |
| Example 4-79 | | | MPy | 5 | 0.05 | 1.05 | | 55 |
| Comparative Example 4-1 | 4.3 | — | — | — | — | 1.1 | — | 48 |
| Comparative Example 4-2 | | Alumina | — | — | — | 1.1 | | 41 |
| Comparative Example 4-3 | | Alumina | VC | 1 | — | 1.1 | | 34 |
| Comparative Example 4-4 | | Alumina | VEC | 2 | — | 1.1 | | 33 |
| Comparative Example 4-5 | | Alumina | VdEC | 1 | — | 1.1 | | 34 |
| Comparative Example 4-6 | | Alumina | FEC | 5 | — | 1.1 | | 33 |
| Comparative Example 4-7 | | Alumina | DFEC | 1 | — | 1.1 | | 39 |
| Comparative Example 4-8 | | Alumina | DFDMC | 1 | — | 1.1 | | 33 |
| Comparative Example 4-9 | | Alumina | PRS | 1 | — | 1.1 | | 34 |
| Comparative Example 4-10 | | Alumina | SCAH | 1 | — | 1.1 | | 30 |
| Comparative Example 4-11 | | Alumina | SBAH | 1 | — | 1.1 | | 29 |
| Comparative Example 4-12 | | Alumina | PSAH | 1 | — | 1.1 | | 27 |
| Comparative Example 4-13 | | Alumina | DDMC | 0.1 | — | 1.1 | | 31 |
| Comparative Example 4-14 | | Alumina | DPC | 1 | — | 1.1 | | 32 |
| Comparative Example 4-15 | | Alumina | SN | 2 | — | 1.1 | | 32 |
| Comparative Example 4-16 | | Alumina | TCNQ | 1 | — | 1.1 | | 33 |
| Comparative Example 4-17 | | Alumina | Li$_2$PO$_3$F | 0.1 | — | 1.1 | | 32 |
| Comparative Example 4-18 | | Alumina | LiPO$_2$F$_2$ | 0.1 | — | 1.1 | | 33 |
| Comparative Example 4-19 | | Alumina | DEC | 1 | — | 1.1 | | 38 |
| Comparative Example 4-20 | | Alumina | MPC | 1 | — | 1.1 | | 37 |
| Comparative Example 4-21 | | Alumina | TDMC | 1 | — | 1.1 | | 32 |
| Comparative Example 4-22 | | Alumina | EAc | 5 | — | 1.1 | | 39 |
| Comparative Example 4-23 | | Alumina | MPy | 5 | — | 1.1 | | 37 |
| Comparative Example 4-24 | | Alumina | VC | 1 | — | 1.05 | 0.05 | 33 |
| Comparative Example 4-25 | 4.45 | — | — | — | — | 1.1 | — | 28 |
| Comparative Example 4-26 | | Alumina | — | 0.1 | — | 1.1 | — | 20 |

As can be seen from Table 4, the inclusion of LiFSI in the electrolytic solution made it possible to suppress the deterioration of the low temperature cycle characteristics in Examples 4-1 to 4-63, despite the insulating layer. On the other hand, the low temperature cycle characteristics lowered in Comparative Examples 4-2 and 4-26, in which the insulating layer was formed, and in which the electrolytic solution did not contain LiFSI. The low temperature cycle characteristics lowered even further in Comparative Examples 4-3 to 4-24, in which the insulating layer was formed on the both surfaces of the separator, and in which the electrolytic solution contained additives.

Examples 5-1 to 5-79, Comparative Examples 5-1 to 5-26

Secondary batteries were fabricated in the same manner as in Examples 1-1 to 1-79 and Comparative Examples 1-1 to 1-26, except for the following. A negative electrode was fabricated that used SnCoC-containing material as the negative electrode active material, as follows. In Examples 5-1 to 5-58 and Comparative Examples 5-1 to 5-24, the amounts of the positive and negative electrode active materials were adjusted to make the open circuit voltage (i.e., battery voltage) in the fully charged state 4.2 V. In Examples 5-59 to 5-79 and Comparative Examples 5-25 and 5-26, the amounts of the positive and negative electrode active materials were adjusted to make the open circuit voltage (i.e., battery voltage) in the fully charged state 4.35 V.

(Fabrication of Negative Electrode)

A tin.cobalt.indium.titanium alloy powder and a carbon powder were mixed, and a SnCoC-containing material was synthesized using a mechanochemical reaction. Upon analysis, the composition of the SnCoC-containing material was found to be 48 mass tin, 23 mass cobalt, 20 mass carbon, and 32 mass Co/(Sn+Co).

Thereafter, the negative electrode active material SnCoC-containing material powder (80 parts by mass), the conductive agent graphite (12 parts by mass), and the binder polyvinylidene fluoride (8 parts by mass) were mixed, and dispersed in the solvent N-methyl-2-pyrrolidone. Finally, the solution was applied to the negative electrode collector 22A realized by a copper foil (15 μm thick), dried, and compression molded to form the negative electrode active material layer 22B.

(Low Temperature Cycle Characteristics)

The secondary batteries fabricated as above were measured for low temperature cycle characteristics, as above. The charge voltage shown in Table 5 was used. The measurement results are presented in Table 5.

TABLE 5

| | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 5-1 | 4.2 | Alumina | VC | 1 | 0.05 | 1.05 | — | 74 |
| Example 5-2 | | | VEC | 2 | 0.05 | 1.05 | | 75 |
| Example 5-3 | | | VdEC | 1 | 0.05 | 1.05 | | 73 |
| Example 5-4 | | | FEC | 0.1 | 0.05 | 1.05 | | 60 |
| Example 5-5 | | | FEC | 1 | 0.05 | 1.05 | | 68 |
| Example 5-6 | | | FEC | 5 | 0.01 | 1.09 | | 64 |
| Example 5-7 | | | FEC | 5 | 0.05 | 1.05 | | 72 |
| Example 5-8 | | | FEC | 5 | 0.1 | 1 | | 71 |
| Example 5-9 | | | FEC | 5 | 0.2 | 0.9 | | 70 |
| Example 5-10 | | | FEC | 5 | 0.5 | 0.6 | | 64 |
| Example 5-11 | | | FEC | 10 | 0.05 | 1.05 | | 72 |
| Example 5-12 | | | FEC | 20 | 0.05 | 1.05 | | 70 |
| Example 5-13 | | | FEC/VC | 5/1 | 0.05 | 1.05 | | 75 |
| Example 5-14 | | | FEC/SN | 5/2 | 0.05 | 1.05 | | 79 |
| Example 5-15 | | | FEC/PSAH | 5/1 | 0.05 | 1.05 | | 80 |
| Example 5-16 | | | DFEC | 1 | 0.05 | 1.05 | | 72 |
| Example 5-17 | | | DFDMC | 1 | 0.05 | 1.05 | | 73 |
| Example 5-18 | | | PRS | 1 | 0.05 | 1.05 | | 79 |
| Example 5-19 | | | SCAH | 1 | 0.05 | 1.05 | | 74 |
| Example 5-20 | | | SBAH | 1 | 0.05 | 1.05 | | 72 |
| Example 5-21 | | | PSAH | 1 | 0.05 | 1.05 | | 79 |
| Example 5-22 | | | DDMC | 0.1 | 0.05 | 1.05 | | 78 |
| Example 5-23 | | | DPC | 1 | 0.05 | 1.05 | | 75 |
| Example 5-24 | | | SN | 0.5 | 0.05 | 1.05 | | 75 |
| Example 5-25 | | | SN | 2 | 0.05 | 1.05 | | 78 |
| Example 5-26 | | | SN | 5 | 0.05 | 1.05 | | 72 |
| Example 5-27 | | | AN | 0.5 | 0.05 | 1.05 | | 73 |
| Example 5-28 | | | AN | 2 | 0.05 | 1.05 | | 77 |
| Example 5-29 | | | AN | 5 | 0.05 | 1.05 | | 71 |
| Example 5-30 | | | TCNQ | 1 | 0.05 | 1.05 | | 75 |
| Example 5-31 | | | Li$_2$PO$_3$F | 0.1 | 0.05 | 1.05 | | 77 |
| Example 5-32 | | | LiPO$_2$F$_2$ | 0.1 | 0.05 | 1.05 | | 79 |
| Example 5-33 | | | DEC | 1 | 0.05 | 1.05 | | 77 |
| Example 5-34 | | | MPC | 1 | 0.05 | 1.05 | | 76 |
| Example 5-35 | | | TDMC | 1 | 0.05 | 1.05 | | 74 |
| Example 5-36 | | | EAc | 5 | 0.05 | 1.05 | | 78 |
| Example 5-37 | | | MPy | 5 | 0.05 | 1.05 | | 77 |
| Example 5-38 | 4.2 | Silica | VC | 1 | 0.05 | 1.05 | — | 71 |
| Example 5-39 | | | VEC | 2 | 0.05 | 1.05 | | 73 |
| Example 5-40 | | | VdEC | 1 | 0.05 | 1.05 | | 71 |
| Example 5-41 | | | FEC | 5 | 0.05 | 1.05 | | 69 |
| Example 5-42 | | | DFEC | 1 | 0.05 | 1.05 | | 71 |
| Example 5-43 | | | DFDMC | 1 | 0.05 | 1.05 | | 72 |
| Example 5-44 | | | PRS | 1 | 0.05 | 1.05 | | 78 |
| Example 5-45 | | | SCAH | 1 | 0.05 | 1.05 | | 71 |
| Example 5-46 | | | SBAH | 1 | 0.05 | 1.05 | | 70 |
| Example 5-47 | | | PSAH | 1 | 0.05 | 1.05 | | 78 |
| Example 5-48 | | | DDMC | 0.1 | 0.05 | 1.05 | | 79 |
| Example 5-49 | | | DPC | 1 | 0.05 | 1.05 | | 75 |
| Example 5-50 | | | SN | 2 | 0.05 | 1.05 | | 80 |
| Example 5-51 | | | TCNQ | 1 | 0.05 | 1.05 | | 74 |
| Example 5-52 | | | Li$_2$PO$_3$F | 0.1 | 0.05 | 1.05 | | 75 |
| Example 5-53 | | | LiPO$_2$F$_2$ | 0.1 | 0.05 | 1.05 | | 79 |
| Example 5-54 | | | DEC | 1 | 0.05 | 1.05 | | 76 |
| Example 5-55 | | | MPC | 1 | 0.05 | 1.05 | | 76 |
| Example 5-56 | | | TDMC | 1 | 0.05 | 1.05 | | 74 |
| Example 5-57 | | | EAc | 5 | 0.05 | 1.05 | | 78 |

TABLE 5-continued

|  | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 5-58 |  |  | MPy | 5 | 0.05 | 1.05 |  | 77 |
| Example 5-59 | 4.35 | Alumina | VC | 1 | 0.05 | 1.05 | — | 57 |
| Example 5-60 |  |  | VEC | 2 | 0.05 | 1.05 |  | 58 |
| Example 5-61 |  |  | VdEC | 1 | 0.05 | 1.05 |  | 56 |
| Example 5-62 |  |  | FEC | 5 | 0.05 | 1.05 |  | 55 |
| Example 5-63 |  |  | DFEC | 1 | 0.05 | 1.05 |  | 58 |
| Example 5-64 |  |  | DFDMC | 1 | 0.05 | 1.05 |  | 57 |
| Example 5-65 |  |  | PRS | 1 | 0.05 | 1.05 |  | 62 |
| Example 5-66 |  |  | SCAH | 1 | 0.05 | 1.05 |  | 57 |
| Example 5-67 |  |  | SBAH | 1 | 0.05 | 1.05 |  | 55 |
| Example 5-68 |  |  | PSAH | 1 | 0.05 | 1.05 |  | 62 |
| Example 5-69 |  |  | DDMC | 0.1 | 0.05 | 1.05 |  | 62 |
| Example 5-70 |  |  | DPC | 1 | 0.05 | 1.05 |  | 61 |
| Example 5-71 |  |  | SN | 2 | 0.05 | 1.05 |  | 65 |
| Example 5-72 |  |  | TCNQ | 1 | 0.05 | 1.05 |  | 59 |
| Example 5-73 |  |  | Li$_2$PO$_3$F | 0.1 | 0.05 | 1.05 |  | 60 |
| Example 5-74 |  |  | LiPO$_2$F$_2$ | 0.1 | 0.05 | 1.05 |  | 62 |
| Example 5-75 |  |  | DEC | 1 | 0.05 | 1.05 |  | 60 |
| Example 5-76 |  |  | MPC | 1 | 0.05 | 1.05 |  | 60 |
| Example 5-77 |  |  | TDMC | 1 | 0.05 | 1.05 |  | 57 |
| Example 5-78 |  |  | EAc | 5 | 0.05 | 1.05 |  | 61 |
| Example 5-79 |  |  | MPy | 5 | 0.05 | 1.05 |  | 62 |
| Comparative Example 5-1 | 4.2 | — | — | — | — | 1.1 | — | 72 |
| Comparative Example 5-2 |  | Alumina | — | — | — | 1.1 |  | 53 |
| Comparative Example 5-3 |  | Alumina | VC | 1 | — | 1.1 |  | 40 |
| Comparative Example 5-4 |  | Alumina | VEC | 2 | — | 1.1 |  | 43 |
| Comparative Example 5-5 |  | Alumina | VdEC | 1 | — | 1.1 |  | 41 |
| Comparative Example 5-6 |  | Alumina | FEC | 5 | — | 1.1 |  | 41 |
| Comparative Example 5-7 |  | Alumina | DFEC | 1 | — | 1.1 |  | 39 |
| Comparative Example 5-8 |  | Alumina | DFDMC | 1 | — | 1.1 |  | 44 |
| Comparative Example 5-9 |  | Alumina | PRS | 1 | — | 1.1 |  | 42 |
| Comparative Example 5-10 |  | Alumina | SCAH | 1 | — | 1.1 |  | 42 |
| Comparative Example 5-11 |  | Alumina | SBAH | 1 | — | 1.1 |  | 41 |
| Comparative Example 5-12 |  | Alumina | PSAH | 1 | — | 1.1 |  | 40 |
| Comparative Example 5-13 |  | Alumina | DDMC | 0.1 | — | 1.1 |  | 42 |
| Comparative Example 5-14 |  | Alumina | DPC | 1 | — | 1.1 |  | 42 |
| Comparative Example 5-15 |  | Alumina | SN | 2 | — | 1.1 |  | 43 |
| Comparative Example 5-16 |  | Alumina | TCNQ | 1 | — | 1.1 |  | 43 |
| Comparative Example 5-17 |  | Alumina | Li$_2$PO$_3$F | 0.1 | — | 1.1 |  | 42 |
| Comparative Example 5-18 |  | Alumina | LiPO$_2$F$_2$ | 0.1 | — | 1.1 |  | 41 |
| Comparative Example 5-19 |  | Alumina | DEC | 1 | — | 1.1 |  | 43 |
| Comparative Example 5-20 |  | Alumina | MPC | 1 | — | 1.1 |  | 42 |
| Comparative Example 5-21 |  | Alumina | TDMC | 1 | — | 1.1 |  | 41 |
| Comparative Example 5-22 |  | Alumina | EAc | 5 | — | 1.1 |  | 45 |
| Comparative Example 5-23 |  | Alumina | MPy | 5 | — | 1.1 |  | 44 |
| Comparative Example 5-24 |  | Alumina | VC | 1 | — | 1.05 | 0.05 | 41 |

TABLE 5-continued

|  | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Comparative Example 5-25 | 4.35 | — | — | — | — | 1.1 | — | 54 |
| Comparative Example 5-26 |  | Alumina | — | 0.1 | — | 1.1 | — | 44 |

As can be seen from Table 5, the inclusion of LiFSI in the electrolytic solution made it possible to suppress the deterioration of the low temperature cycle characteristics in Examples 5-1 to 5-79, despite the insulating layer. On the other hand, the low temperature cycle characteristics lowered in Comparative Examples 5-2 and 5-26, in which the insulating layer was formed, and in which the electrolytic solution did not contain LiFSI. The low temperature cycle characteristics lowered even further in Comparative Examples 5-3 to 5-24, in which the insulating layer was formed, and in which the electrolytic solution contained additives.

Examples 6-1 to 6-79, Comparative Examples 6-1 to 6-26

Secondary batteries were fabricated in the same manner as in Examples 1-1 to 1-79 and Comparative Examples 1-1 to 1-26, except for the following. A negative electrode was fabricated that used Si-containing material as the negative electrode active material, as follows. In Examples 6-1 to 6-58 and Comparative Examples 6-1 to 6-24, the amounts of the positive and negative electrode active materials were adjusted to make the open circuit voltage (i.e., battery voltage) in the fully charged state 4.2 V. In Examples 6-59 to 6-79 and Comparative Examples 6-25 and 6-26, the amounts of the positive and negative electrode active materials were adjusted to make the open circuit voltage (i.e., battery voltage) in the fully charged state 4.3 V.

(Fabrication of Negative Electrode)

A silicon powder having an average particle diameter of 1 μm was used as the negative electrode active material. The silicon powder (95 parts by mass), and the binder polyimide (5 parts by mass) were mixed, and N-methyl-2-pyrrolidone was added to produce a slurry. The negative electrode mixture slurry was then evenly applied to the both surfaces of a negative electrode collector realized by a 15 μm-thick belt-like copper foil, dried, and compression molded. The product was then heated at 400° C. for 12 hours in a vacuum atmosphere to form a negative electrode active material layer.

(Low Temperature Cycle Characteristics)

The secondary batteries fabricated as above were measured for low temperature cycle characteristics, as above. The charge voltage shown in Table 6 was used. The measurement results are presented in Table 6.

TABLE 6

|  | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 6-1 | 4.2 | Alumina | VC | 1 | 0.05 | 1.05 | — | 62 |
| Example 6-2 |  |  | VEC | 2 | 0.05 | 1.05 |  | 60 |
| Example 6-3 |  |  | VdEC | 1 | 0.05 | 1.05 |  | 59 |
| Example 6-4 |  |  | FEC | 0.1 | 0.05 | 1.05 |  | 49 |
| Example 6-5 |  |  | FEC | 1 | 0.05 | 1.05 |  | 56 |
| Example 6-6 |  |  | FEC | 5 | 0.01 | 1.09 |  | 52 |
| Example 6-7 |  |  | FEC | 5 | 0.05 | 1.05 |  | 59 |
| Example 6-8 |  |  | FEC | 5 | 0.1 | 1 |  | 58 |
| Example 6-9 |  |  | FEC | 5 | 0.2 | 0.9 |  | 58 |
| Example 6-10 |  |  | FEC | 5 | 0.5 | 0.6 |  | 56 |
| Example 6-11 |  |  | FEC | 10 | 0.05 | 1.05 |  | 59 |
| Example 6-12 |  |  | FEC | 20 | 0.05 | 1.05 |  | 58 |
| Example 6-13 |  |  | FEC/VC | 5/1 | 0.05 | 1.05 |  | 63 |
| Example 6-14 |  |  | FEC/SN | 5/2 | 0.05 | 1.05 |  | 66 |
| Example 6-15 |  |  | FEC/PSAH | 5/1 | 0.05 | 1.05 |  | 68 |
| Example 6-16 |  |  | DFEC | 1 | 0.05 | 1.05 |  | 68 |
| Example 6-17 |  |  | DFDMC | 1 | 0.05 | 1.05 |  | 62 |
| Example 6-18 |  |  | PRS | 1 | 0.05 | 1.05 |  | 68 |
| Example 6-19 |  |  | SCAH | 1 | 0.05 | 1.05 |  | 61 |
| Example 6-20 |  |  | SBAH | 1 | 0.05 | 1.05 |  | 60 |
| Example 6-21 |  |  | PSAH | 1 | 0.05 | 1.05 |  | 68 |
| Example 6-22 |  |  | DDMC | 0.1 | 0.05 | 1.05 |  | 67 |
| Example 6-23 |  |  | DPC | 1 | 0.05 | 1.05 |  | 64 |
| Example 6-24 |  |  | SN | 0.5 | 0.05 | 1.05 |  | 62 |
| Example 6-25 |  |  | SN | 2 | 0.05 | 1.05 |  | 64 |
| Example 6-26 |  |  | SN | 5 | 0.05 | 1.05 |  | 60 |
| Example 6-27 |  |  | AN | 0.5 | 0.05 | 1.05 |  | 59 |
| Example 6-28 |  |  | AN | 2 | 0.05 | 1.05 |  | 62 |

TABLE 6-continued

|  | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 6-29 |  |  | AN | 5 | 0.05 | 1.05 |  | 57 |
| Example 6-30 |  |  | TCNQ | 1 | 0.05 | 1.05 |  | 62 |
| Example 6-31 |  |  | Li$_2$PO$_3$F | 0.1 | 0.05 | 1.05 |  | 65 |
| Example 6-32 |  |  | LiPO$_2$F$_2$ | 0.1 | 0.05 | 1.05 |  | 68 |
| Example 6-33 |  |  | DEC | 1 | 0.05 | 1.05 |  | 67 |
| Example 6-34 |  |  | MPC | 1 | 0.05 | 1.05 |  | 66 |
| Example 6-35 |  |  | TDMC | 1 | 0.05 | 1.05 |  | 63 |
| Example 6-36 |  |  | EAc | 5 | 0.05 | 1.05 |  | 67 |
| Example 6-37 |  |  | MPy | 5 | 0.05 | 1.05 |  | 67 |
| Example 6-38 | 4.2 | Silica | VC | 1 | 0.05 | 1.05 | — | 58 |
| Example 6-39 |  |  | VEC | 2 | 0.05 | 1.05 |  | 57 |
| Example 6-40 |  |  | VdEC | 1 | 0.05 | 1.05 |  | 56 |
| Example 6-41 |  |  | FEC | 5 | 0.05 | 1.05 |  | 58 |
| Example 6-42 |  |  | DFEC | 1 | 0.05 | 1.05 |  | 66 |
| Example 6-43 |  |  | DFDMC | 1 | 0.05 | 1.05 |  | 60 |
| Example 6-44 |  |  | PRS | 1 | 0.05 | 1.05 |  | 66 |
| Example 6-45 |  |  | SCAH | 1 | 0.05 | 1.05 |  | 60 |
| Example 6-46 |  |  | SBAH | 1 | 0.05 | 1.05 |  | 60 |
| Example 6-47 |  |  | PSAH | 1 | 0.05 | 1.05 |  | 67 |
| Example 6-48 |  |  | DDMC | 0.1 | 0.05 | 1.05 |  | 66 |
| Example 6-49 |  |  | DPC | 1 | 0.05 | 1.05 |  | 61 |
| Example 6-50 |  |  | SN | 2 | 0.05 | 1.05 |  | 62 |
| Example 6-51 |  |  | TCNQ | 1 | 0.05 | 1.05 |  | 59 |
| Example 6-52 |  |  | Li$_2$PO$_3$F | 0.1 | 0.05 | 1.05 |  | 65 |
| Example 6-53 |  |  | LiPO$_2$F$_2$ | 0.1 | 0.05 | 1.05 |  | 65 |
| Example 6-54 |  |  | DEC | 1 | 0.05 | 1.05 |  | 64 |
| Example 6-55 |  |  | MPC | 1 | 0.05 | 1.05 |  | 64 |
| Example 6-56 |  |  | TDMC | 1 | 0.05 | 1.05 |  | 61 |
| Example 6-57 |  |  | EAc | 5 | 0.05 | 1.05 |  | 65 |
| Example 6-58 |  |  | MPy | 5 | 0.05 | 1.05 |  | 64 |
| Example 6-59 | 4.3 | Alumina | VC | 1 | 0.05 | 1.05 | — | 49 |
| Example 6-60 |  |  | VEC | 2 | 0.05 | 1.05 |  | 50 |
| Example 6-61 |  |  | VdEC | 1 | 0.05 | 1.05 |  | 48 |
| Example 6-62 |  |  | FEC | 5 | 0.05 | 1.05 |  | 48 |
| Example 6-63 |  |  | DFEC | 1 | 0.05 | 1.05 |  | 56 |
| Example 6-64 |  |  | DFDMC | 1 | 0.05 | 1.05 |  | 52 |
| Example 6-65 |  |  | PRS | 1 | 0.05 | 1.05 |  | 56 |
| Example 6-66 |  |  | SCAH | 1 | 0.05 | 1.05 |  | 51 |
| Example 6-67 |  |  | SBAH | 1 | 0.05 | 1.05 |  | 49 |
| Example 6-68 |  |  | PSAH | 1 | 0.05 | 1.05 |  | 57 |
| Example 6-69 |  |  | DDMC | 0.1 | 0.05 | 1.05 |  | 56 |
| Example 6-70 |  |  | DPC | 1 | 0.05 | 1.05 |  | 51 |
| Example 6-71 |  |  | SN | 2 | 0.05 | 1.05 |  | 53 |
| Example 6-72 |  |  | TCNQ | 1 | 0.05 | 1.05 |  | 51 |
| Example 6-73 |  |  | Li$_2$PO$_3$F | 0.1 | 0.05 | 1.05 |  | 55 |
| Example 6-74 |  |  | LiPO$_2$F$_2$ | 0.1 | 0.05 | 1.05 |  | 55 |
| Example 6-75 |  |  | DEC | 1 | 0.05 | 1.05 |  | 54 |
| Example 6-76 |  |  | MPC | 1 | 0.05 | 1.05 |  | 54 |
| Example 6-77 |  |  | TDMC | 1 | 0.05 | 1.05 |  | 51 |
| Example 6-78 |  |  | EAc | 5 | 0.05 | 1.05 |  | 57 |
| Example 6-79 |  |  | MPy | 5 | 0.05 | 1.05 |  | 58 |
| Comparative Example 6-1 | 4.2 | — | — | — | — | 1.1 | — | 63 |
| Comparative Example 6-2 |  | Alumina | — | — | — | 1.1 |  | 47 |
| Comparative Example 6-3 |  | Alumina | VC | 1 | — | 1.1 |  | 33 |
| Comparative Example 6-4 |  | Alumina | VEC | 2 | — | 1.1 |  | 35 |
| Comparative Example 6-5 |  | Alumina | VdEC | 1 | — | 1.1 |  | 33 |
| Comparative Example 6-6 |  | Alumina | FEC | 5 | — | 1.1 |  | 33 |
| Comparative Example 6-7 |  | Alumina | DFEC | 1 | — | 1.1 |  | 35 |
| Comparative Example 6-8 |  | Alumina | DFDMC | 1 | — | 1.1 |  | 36 |
| Comparative Example 6-9 |  | Alumina | PRS | 1 | — | 1.1 |  | 35 |
| Comparative Example 6-10 |  | Alumina | SCAH | 1 | — | 1.1 |  | 34 |
| Comparative Example 6-11 |  | Alumina | SBAH | 1 | — | 1.1 |  | 33 |

TABLE 6-continued

| | Charge voltage [V] | Insulating material | Additive Material | Additive Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Comparative Example 6-12 | | Alumina | PSAH | 1 | — | 1.1 | | 32 |
| Comparative Example 6-13 | | Alumina | DDMC | 0.1 | — | 1.1 | | 34 |
| Comparative Example 6-14 | | Alumina | DPC | 1 | — | 1.1 | | 34 |
| Comparative Example 6-15 | | Alumina | SN | 2 | — | 1.1 | | 35 |
| Comparative Example 6-16 | | Alumina | TCNQ | 1 | — | 1.1 | | 35 |
| Comparative Example 6-17 | | Alumina | Li$_2$PO$_3$F | 0.1 | — | 1.1 | | 35 |
| Comparative Example 6-18 | | Alumina | LiPO$_2$F$_2$ | 0.1 | — | 1.1 | | 34 |
| Comparative Example 6-19 | | Alumina | DEC | 1 | — | 1.1 | | 35 |
| Comparative Example 6-20 | | Alumina | MPC | 1 | — | 1.1 | | 34 |
| Comparative Example 6-21 | | Alumina | TDMC | 1 | — | 1.1 | | 31 |
| Comparative Example 6-22 | | Alumina | EAc | 5 | — | 1.1 | | 38 |
| Comparative Example 6-23 | | Alumina | MPy | 5 | — | 1.1 | | 37 |
| Comparative Example 6-24 | | Alumina | VC | 1 | — | 1.05 | 0.05 | 32 |
| Comparative Example 6-25 | 4.3 | — | — | — | — | 1.1 | — | 45 |
| Comparative Example 6-26 | | Alumina | — | — | 0.1 | 1.1 | — | 32 |

As can be seen from Table 6, the inclusion of LiFSI in the electrolytic solution made it possible to suppress the deterioration of the low temperature cycle characteristics in Examples 6-1 to 6-79, despite the insulating layer. On the other hand, the low temperature cycle characteristics lowered in Comparative Examples 6-2 and 6-26, in which the insulating layer was formed, and in which the electrolytic solution did not contain LiFSI. The low temperature cycle characteristics lowered even further in Comparative Examples 6-3 to 6-24, in which the insulating layer was formed, and in which the electrolytic solution contained additives.

Examples 7-1 to 7-11

Example 7-1

Fabrication of Positive Electrode

First, the positive electrode 21 was fabricated. Specifically, lithium carbonate (Li$_2$CO$_3$) and cobalt carbonate (CoCO$_3$) were mixed at a 0.5:1 molar ratio, and calcined in air at 900° C. for 5 hours to obtain a lithium-cobalt composite oxide (LiCoO$_2$). Then, the positive electrode active material lithium-cobalt composite oxide (91 parts by mass), the conductive agent graphite (6 parts by mass), and the binder polyvinylidene fluoride (3 parts by mass) were mixed to prepare a positive electrode mixture. The mixture was then dispersed in N-methyl-2-pyrrolidone to obtain a paste-like positive electrode mixture slurry. Finally, the positive electrode mixture slurry was applied to the both surfaces of a positive electrode collector realized by a belt-like aluminum foil (12 μm thick), dried, and compression molded with a roller press machine to form a positive electrode active material layer. Then, an aluminum positive electrode lead was welded to one end of the positive electrode collector.

(Fabrication of Negative Electrode and Insulating Layer)

A negative electrode slurry was prepared by stirring a granular graphite powder (negative electrode active material; average particle diameter 20 μm; 96 parts by mass), a styrene-butadiene copolymer modified with acrylic acid (1.5 parts by mass), carboxymethyl cellulose (1.5 parts by mass), and an appropriate amount of water. Then, the negative electrode mixture slurry was evenly applied to the both surfaces of a negative electrode collector realized by a 15 μm-thick belt-like copper foil, dried, and compression molded to form a negative electrode active material layer. Here, the amounts of the positive and negative electrode active materials were adjusted to make the open circuit voltage (i.e., battery voltage) in the fully charged state 4.2 V.

An alumina particle powder (ceramic; 80 parts by mass), and the binder polyvinylidene fluoride (PVdF; 20 parts by mass) were mixed, and diluted with the solvent N-methyl-2-pyrrolidone to prepare a mixture. The negative electrode plate was dipped in the mixture, and the thickness was adjusted with a gravure roller. The negative electrode plate was then passed through a drier in a 120° C. atmosphere to remove the solvent, and form a 5 μm-thick porous film on the negative electrode. As a result, the negative electrode 22 was fabricated. A nickel negative electrode lead was then attached to one end of the negative electrode collector.

(Fabrication of Wound Electrode Unit)

Then, the positive electrode, a separator realized by a microporous polyethylene film (16 μm thick), and the negative electrode were laminated in this order, and wound multiple times in spirals, and the terminating end was fixed with an adhesive tape to form a wound electrode unit.
(Housing in Battery Canister)

A nickel-plated iron battery canister was prepared. With the wound electrode unit sandwiched between a pair of insulating plates, the negative electrode lead and the positive electrode lead were welded to the battery canister and the safety valve mechanism, respectively, and the wound electrode unit was housed inside the battery canister. Then, an electrolytic solution was injected into the battery canister using a reduced pressure method.
(Preparation of Electrolytic Solution)

The electrolytic solution was prepared as follows. First, a mixed solvent of ethylene carbonate (EC):diethyl carbonate (DEC):ethyl methyl carbonate (EMC) (mass ratio of 25:X: 75-X) was prepared. The electrolyte salts LiFSI (Z mol/L) and $LiPF_6$ (1.1 mol/L-Z mol/L) were then dissolved in the mixed solvent. The DEC mixture ratio X was 0.1. Specifically, the DEC was mixed in 0.1 mass % in the mixed solvent. The mixed amount Z of LiFSI was 0.05 mol/L, and the mixed amount 1.1 mol/L–Z mol/L of $LiPF_6$ was 1.05 mol/L.

Thereafter, the battery canister was swaged via an asphalt-coated gasket to fix the safety valve mechanism, the heat-sensitive resistive element, and the battery lid. As a result, the battery canister was sealed air-tight, and the cylindrical secondary battery was completed.

Example 7-2

A secondary battery was fabricated in the same manner as in Example 7-1, except that the DEC was mixed at a mixture ratio X of 1, or in 1 mass %.

Example 7-3

A secondary battery was fabricated in the same manner as in Example 7-1, except that the DEC was mixed at a mixture ratio X of 10, or in 10 mass %, and that the LiFSI mixed amount Z was changed to 0.001 mol/L, and the $LiPF_6$ mixed amount to 1.099 mol/L.

Example 7-4

A secondary battery was fabricated in the same manner as in Example 7-1, except that the DEC was mixed at a mixture ratio X of 10, or in 10 mass %, and that the LiFSI mixed amount Z was changed to 0.01 mol/L, and the $LiPF_6$ mixed amount to 1.09 mol/L.

Example 7-5

A secondary battery was fabricated in the same manner as in Example 7-1, except that the DEC was mixed at a mixture ratio X of 10, or in 10 mass %.

Example 7-6

A secondary battery was fabricated in the same manner as in Example 7-1, except that the DEC was mixed at a mixture ratio X of 10, or in 10 mass %, and that the LiFSI mixed amount Z was changed to 0.1 mol/L, and the $LiPF_6$ mixed amount to 1.0 mol/L.

Example 7-7

A secondary battery was fabricated in the same manner as in Example 7-1, except that the DEC was mixed at a mixture ratio X of 10, or in 10 mass %, and that the LiFSI mixed amount Z was changed to 0.5 mol/L, and the $LiPF_6$ mixed amount to 0.6 mol/L.

Example 7-8

A secondary battery was fabricated in the same manner as in Example 7-1, except that the DEC was mixed at a mixture ratio X of 30, or in 30 mass %.

Example 7-9

A secondary battery was fabricated in the same manner as in Example 7-1, except that the DEC was mixed at a mixture ratio X of 70, or in 70 mass %.

Example 7-10

The amounts of the positive and negative electrode active materials were adjusted to make the open circuit voltage (i.e., battery voltage) in the fully charged state 4.35 V.

Example 7-11

The amounts of the positive and negative electrode active materials were adjusted to make the open circuit voltage (i.e., battery voltage) in the fully charged state 4.45 V.

Examples 7-12 to 7-22

Secondary batteries were fabricated in the same manner as in Examples 7-1 to 7-11, except that the battery shape was changed to rectangle. Specifically, the wound electrode unit was prepared as a flat unit, and housed in an aluminum rectangular battery canister.
(Housing in Battery Canister)

After preparing an aluminum rectangular battery canister, the flat wound electrode unit was sandwiched between a pair of insulating plates. The positive electrode lead was connected to the battery canister, and the negative electrode lead was welded to the negative electrode terminal. The wound electrode unit was then housed inside the battery canister. The electrolytic solution was then injected into the battery canister by using a reduced pressure method, and the battery canister was sealed by laser welding the battery lid provided with a safety valve.

Comparative Example 7-1

A secondary battery was fabricated in the same manner as in Example 7-1, except that DEC was not mixed, and that $LiPF_6$ was mixed in 1.1 mol/L without mixing LiFSI for the preparation of the electrolytic solution.

Comparative Example 7-2

A secondary battery was fabricated in the same manner as in Example 7-1, except that DEC was mixed at a mixture ratio X of 10, or in 10 mass %, and that $LiPF_6$ was mixed in 1.1 mol/L without mixing LiFSI for the preparation of the electrolytic solution.

Comparative Example 7-3

A secondary battery was fabricated in the same manner as in Example 7-1, except that DEC was not mixed for the preparation of the electrolytic solution.

Comparative Example 7-4

A secondary battery was fabricated in the same manner as in Example 7-1, except that DEC was mixed at a mixture ratio X of 10, or in 10 mass %, and that the LiFSI mixed amount Z was changed to 0.7 mol/L, and the LiPF$_6$ mixed amount to 0.4 mol/L for the preparation of the electrolytic solution.

Comparative Examples 7-5 to 7-8

Secondary batteries were fabricated in the same manner as in Comparative Examples 7-1 to 7-4, except that the battery shape was changed to rectangle. Specifically, the wound electrode unit was prepared as a flat unit, and housed in an aluminum rectangular battery canister.

(Housing in Battery Canister)

After preparing an aluminum rectangular battery canister, the flat wound electrode unit was sandwiched between a pair of insulating plates. The positive electrode lead was connected to the battery canister, and the negative electrode lead was welded to the negative electrode terminal. The wound electrode unit was then housed inside the battery canister. The electrolytic solution was then injected into the battery canister by using a reduced pressure method, and the battery canister was sealed by laser welding the battery lid provided with a safety valve.

(Low Temperature Cycle Characteristics)

The secondary batteries fabricated as above were measured for low temperature cycle characteristics, as above. The charge voltage shown in Table 7 was used. The measurement results are presented in Table 7.

TABLE 7

| | Battery shape | Exterior material | Electrolyte | Structure | DEC amount [mass %] | LiFSI amount [mol/L] | Charge voltage [V] | Percentage remaining discharge capacity [%] |
|---|---|---|---|---|---|---|---|---|
| Example 7-1 | Cylindrical | Iron canister | Liquid | Wound | 0.1 | 0.05 | 4.2 | 87 |
| Example 7-2 | | | | | 1 | 0.05 | 4.2 | 87 |
| Example 7-3 | | | | | 10 | 0.001 | 4.2 | 77 |
| Example 7-4 | | | | | 10 | 0.01 | 4.2 | 86 |
| Example 7-5 | | | | | 10 | 0.05 | 4.2 | 87 |
| Example 7-6 | | | | | 10 | 0.1 | 4.2 | 87 |
| Example 7-7 | | | | | 10 | 0.5 | 4.2 | 84 |
| Example 7-8 | | | | | 30 | 0.05 | 4.2 | 83 |
| Example 7-9 | | | | | 70 | 0.05 | 4.2 | 80 |
| Example 7-10 | | | | | 10 | 0.05 | 4.35 | 78 |
| Example 7-11 | | | | | 10 | 0.05 | 4.45 | 72 |
| Example 7-12 | Rectangular | Aluminum canister | Liquid | Wound | 0.1 | 0.05 | 4.2 | 85 |
| Example 7-13 | | | | | 1 | 0.05 | 4.2 | 85 |
| Example 7-14 | | | | | 10 | 0.001 | 4.2 | 73 |
| Example 7-15 | | | | | 10 | 0.01 | 4.2 | 84 |
| Example 7-16 | | | | | 10 | 0.05 | 4.2 | 85 |
| Example 7-17 | | | | | 10 | 0.1 | 4.2 | 85 |
| Example 7-18 | | | | | 10 | 0.5 | 4.2 | 83 |
| Example 7-19 | | | | | 30 | 0.05 | 4.2 | 82 |
| Example 7-20 | | | | | 70 | 0.1 | 4.2 | 78 |
| Example 7-21 | | | | | 10 | 0.05 | 4.35 | 77 |
| Example 7-22 | | | | | 10 | 0.05 | 4.45 | 75 |
| Comparative Example 7-1 | Cylindrical | Iron canister | Liquid | Wound | None | None | 4.2 | 77 |
| Comparative Example 7-2 | | | | | 10 | None | 4.2 | 70 |
| Comparative Example 7-3 | | | | | None | 0.05 | 4.2 | 76 |
| Comparative Example 7-4 | | | | | 10 | 0.7 | 4.2 | 69 |
| Comparative Example 7-5 | Rectangular | Aluminum canister | Liquid | Wound | None | None | 4.2 | 71 |
| Comparative Example 7-6 | | | | | 10 | None | 4.2 | 60 |
| Comparative Example 7-7 | | | | | None | 0.05 | 4.2 | 71 |
| Comparative Example 7-8 | | | | | 10 | 0.7 | 4.2 | 60 |

As can be seen from Table 7, the inclusion of LiFSI in the electrolytic solution made it possible to suppress the deterioration of the low temperature cycle characteristics in Examples 7-1 to 7-22, despite the insulating layer. On the other hand, the low temperature cycle characteristics lowered in Comparative Examples 7-1 and 7-5, in which the insulating layer was formed, and in which the electrolytic solution did not contain LiFSI. The low temperature cycle characteristics lowered even further in Comparative Examples 7-2 and 7-6, in which the insulating layer was formed, and in which the electrolytic solution contained additives. The low temperature cycle characteristics lowered in Comparative Examples 7-4 and 7-8, in which the electrolytic solution contained LiFSI but in excess amounts. In the rectangular batteries, element deformation was more likely to occur than in the cylindrical batteries in response to lithium deposition, because the pressure sustaining the flat surface portion is not as strong as in the case of the cylindrical batteries. However, because such deformation can be suppressed by the addition of LiFSI, adding LiFSI was found to be more effective in the rectangular batteries.

Example 8-1

A cylindrical wound electrode unit was fabricated in the same manner as in Example 7-1. The wound electrode unit was placed in a bag of an exterior member realized by an aluminum laminate film, and the opening was heat fused after injecting the electrolytic solution through the opening.

The electrolytic solution was prepared as follows. First, a mixed solvent of ethylene carbonate (EC):diethyl carbonate (DEC):ethyl methyl carbonate (EMC) (mass ratio of 25:X: 75-X) was prepared. Then, the electrolyte salts LiFSI (Z mol/L) and LiPF6 (1.1 mol/L−Z mol/L) were dissolved in the mixed solvent. The DEC mixture ratio X was 0.1. Specifically, DEC was mixed in 0.1 mass % in the mixed solvent. The mixed amount Z of LiFSI was 0.1 mol/L, and the mixed amount 1.1 mol/L-Z mol/L of $LiPF_6$ was 1.0 mol/L. The cylindrical laminate film battery was fabricated in this manner.

Example 8-2

A cylindrical laminate film battery was fabricated in the same manner as in Example 8-1, except that DEC was mixed at a mixture ratio X of 1, or in 1 mass % for the preparation of the electrolytic solution.

Example 8-3

A cylindrical laminate film battery was fabricated in the same manner as in Example 8-1, except that DEC was mixed at a mixture ratio X of 10, or in 10 mass %, and that the LiFSI mixed amount Z was changed to 0.001 mol/L, and the $LiPF_6$ mixed amount to 1.099 mol/L for the preparation of the electrolytic solution.

Example 8-4

A cylindrical laminate film battery was fabricated in the same manner as in Example 8-1, except that DEC was mixed at a mixture ratio X of 10, or in 10 mass %, and that the LiFSI mixed amount Z was changed to 0.01 mol/L, and the $LiPF_6$ mixed amount to 1.09 mol/L for the preparation of the electrolytic solution.

Example 8-5

A cylindrical laminate film battery was fabricated in the same manner as in Example 8-1, except that DEC was mixed at a mixture ratio X of 10, or in 10 mass %, and that the LiFSI mixed amount Z was changed to 0.05 mol/L, and the $LiPF_6$ mixed amount to 1.05 mol/L for the preparation of the electrolytic solution.

Example 8-6

A cylindrical laminate film battery was fabricated in the same manner as in Example 8-1, except that DEC was mixed at a mixture ratio X of 10, or in 10 mass %, and that the LiFSI mixed amount Z was changed to 0.1 mol/L, and the $LiPF_6$ mixed amount to 1.0 mol/L for the preparation of the electrolytic solution.

Example 8-7

A cylindrical laminate film battery was fabricated in the same manner as in Example 8-1, except that DEC was mixed at a mixture ratio X of 10, or in 10 mass %, and that the LiFSI mixed amount Z was changed to 0.5 mol/L, and the $LiPF_6$ mixed amount to 0.6 mol/L for the preparation of the electrolytic solution.

Example 8-8

A cylindrical laminate film battery was fabricated in the same manner as in Example 8-1, except that DEC was mixed at a mixture ratio X of 30, or in 30 mass % for the preparation of the electrolytic solution.

Example 8-9

A cylindrical laminate film battery was fabricated in the same manner as in Example 8-1, except that DEC was mixed at a mixture ratio X of 70, or in 70 mass % for the preparation of the electrolytic solution.

Examples 8-10 to 8-18

Rectangular laminate film batteries were fabricated in the same manner as in Examples 8-1 to 8-9, except that the wound electrode unit was prepared as a flat unit, and that this flat wound electrode unit was used.

Examples 8-19 to 8-27

The positive electrode and the negative electrode were laminated without being wound as follows.
(Fabrication of Negative Electrode and Insulating Layer)

A granular graphite powder (negative electrode active material; average particle diameter 20 μl; 96 parts by mass), a styrene-butadiene copolymer modified with acrylic acid (1.5 parts by mass), carboxymethyl cellulose (1.5 parts by mass), and an appropriate amount of water were stirred to prepare a negative electrode slurry. The negative electrode mixture slurry was then evenly applied to the both surfaces of a negative electrode collector 532A realized by a 15 μm-thick belt-like copper foil, dried, and compression molded to form a negative electrode active material layer 532B. The amounts of the positive and negative electrode active materials were adjusted to make the open circuit voltage (i.e., battery voltage) in the fully charged state 4.2 V. Here, an about 30-mm portion of the copper foil exposed on the both surfaces was provided as a negative electrode collector exposed portion 532a.

Figure 13:
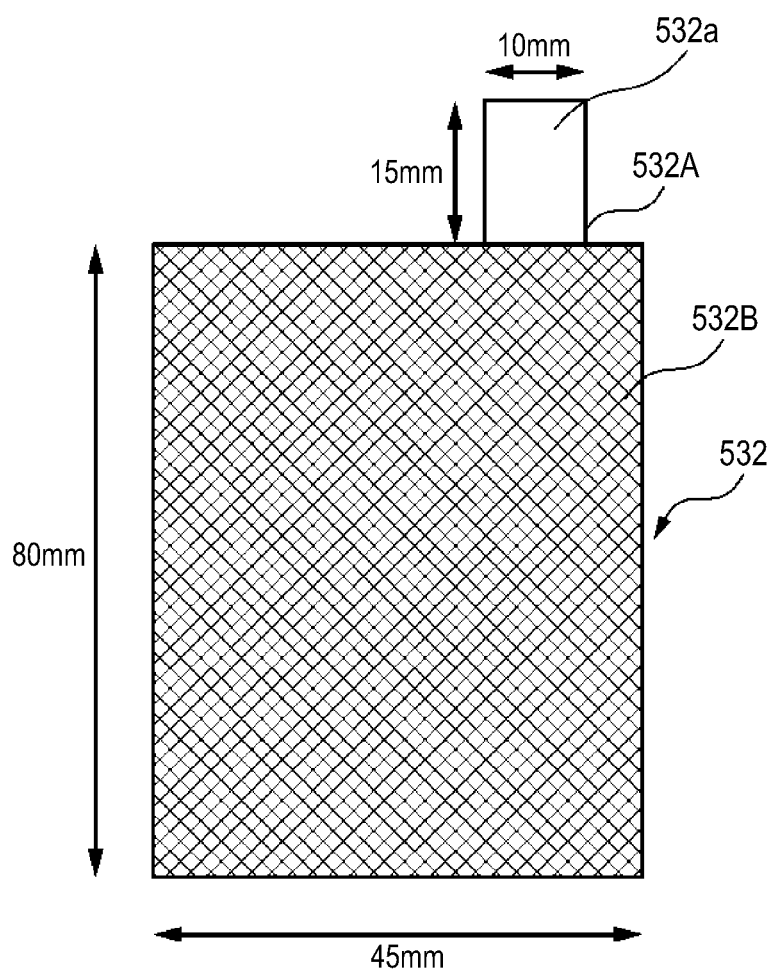
FIG. 13 is a plan view illustrating a negative electrode used in a stacked electrode unit.

An alumina particle powder (ceramic; 80 parts by mass), and the binder polyvinylidene fluoride (PVdF; 20 parts by mass) were mixed, and diluted with the solvent N-methyl-2-pyrrolidone to prepare a mixture. The negative electrode plate was dipped in the mixture, and the thickness was adjusted with a gravure roller. The negative electrode plate was then passed through a drier in a 120° C. atmosphere to remove the solvent, and form a 5 μm-thick porous film on the negative electrode plate. As a result, a negative electrode 532 was fabricated. The applied ends on the both surfaces were aligned. The product was cut into the shape shown in FIG. 13 to obtain the negative electrode 532.
(Fabrication of Positive Electrode)

Figure 14:
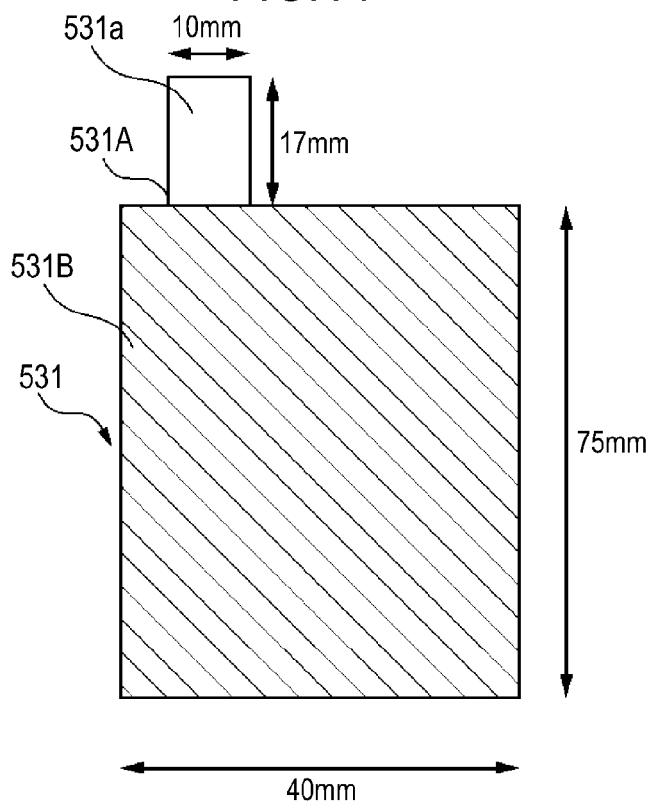
FIG. 14 is a plan view illustrating a positive electrode used in a stacked electrode unit.
Figure 15:
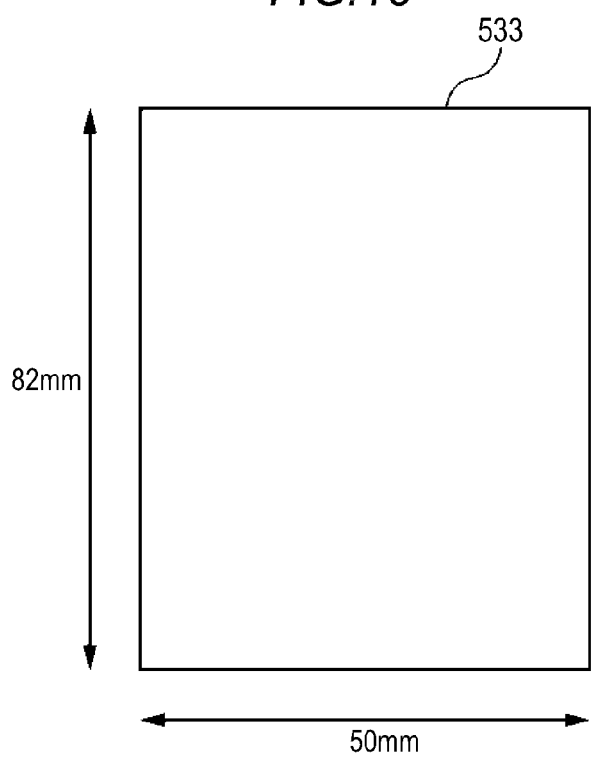
FIG. 15 is a plan view illustrating a separator used in a stacked electrode unit.
Figure 16:
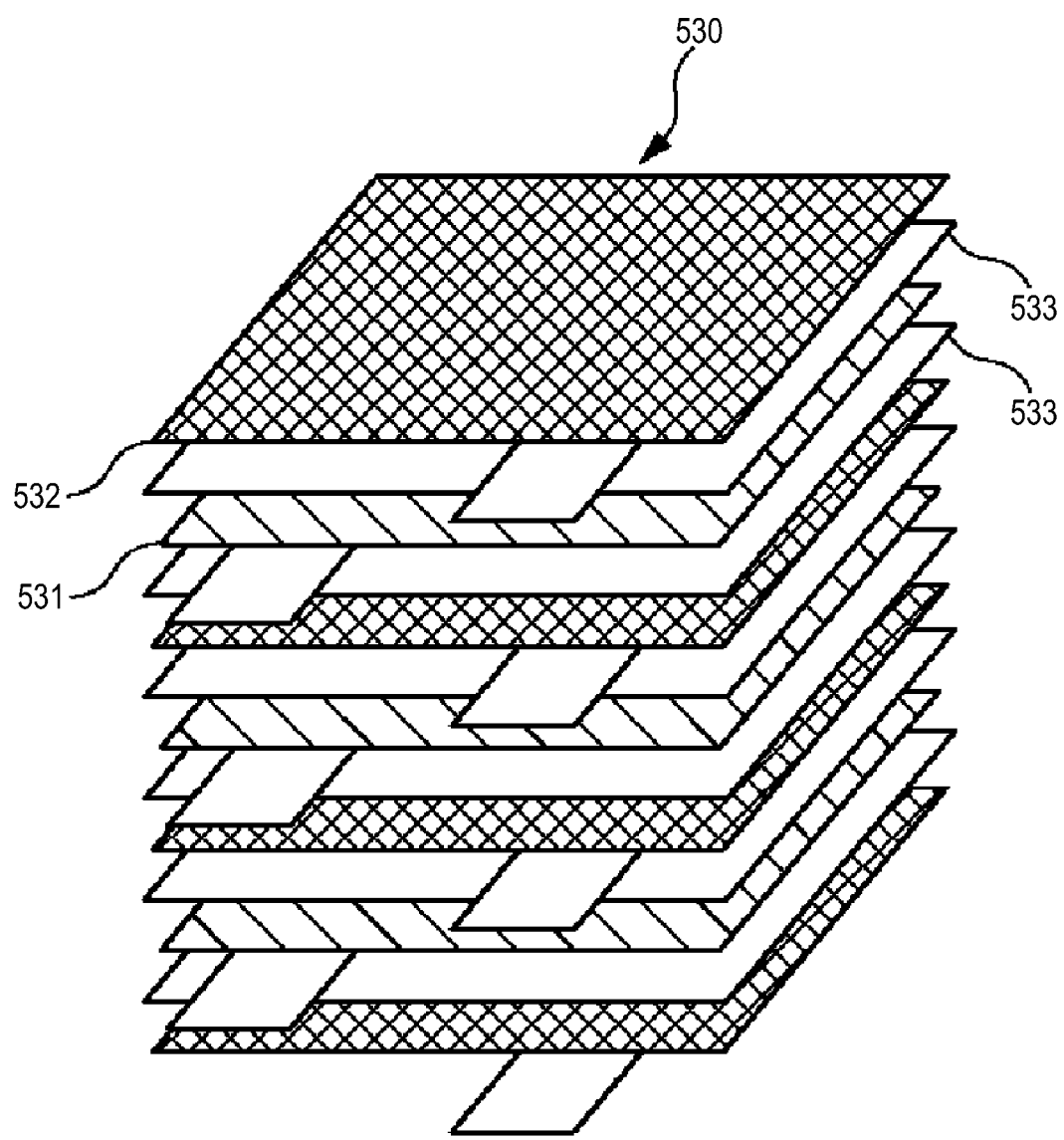
FIG. 16 is an exploded perspective view schematically representing a stacked electrode unit.

A positive electrode 531 was fabricated. Specifically, lithium carbonate ($Li_2CO_3$) and cobalt carbonate ($CoCO_3$) were mixed at a 0.5:1 molar ratio, and calcined in air at 900° C. for 5 hours to obtain a lithium-cobalt composite oxide ($LiCoO_2$). Then, the positive electrode active material lithium-cobalt composite oxide (91 parts by mass), the conductive agent graphite (6 parts by mass), and the binder polyvinylidene fluoride (3 parts by mass) were mixed to prepare a positive electrode mixture. The mixture was then dispersed in N-methyl-2-pyrrolidone to obtain a paste-like positive electrode mixture slurry. Finally, the positive electrode mixture slurry was applied to the both surfaces of a positive electrode collector 531A realized by a belt-like aluminum foil (12 μm thick), dried, and compression molded with a roller press machine to form a positive electrode active material layer 531B. Here, an about 30-mm portion of the aluminum foil exposed on the both surfaces was provided as a positive electrode collector exposed portion 531a. The product was cut into the shape shown in FIG. 14 to obtain the positive electrode 21.
(Separator)
A 25 μm-thick polypropylene microporous film was cut into the shape shown in FIG. 15 to obtain a separator 533.
(Laminate)
Ten of the double-coated negative electrodes 532, nine of the double-coated positive electrodes 531, and eighteen of the separators 533 obtained as above were laminated in order from the negative electrode 32, the separator 33, the positive electrode 31, the separator 33, the negative electrode 32, the separator 33, the positive electrode 531, the separator 533, the negative electrode 531, ..., the separator 533, and to the negative electrode 532, as schematically illustrated in FIG. 16. As a result, a battery element (stacked electrode unit) 530 was obtained that included 18 layers of a basic laminate unit of the positive electrode active material layer 531B, the separator 533, and the negative electrode active material layer 532B. Note that the negative electrode active material layer 532B disposed on the outermost layer of the battery element 530 does not contribute to the battery reaction, because it does not face the positive electrode 531.
A rectangular laminate film battery was fabricated in the same manner as in Examples 8-1 to 8-9, using the stacked electrode unit.

Examples 8-28 to 8-45

Laminate film batteries using a non-fluidic electrolyte were fabricated in the same manner as in Examples 8-10 to 8-27, except that a polymer material that holds the electrolytic solution was attached to provide the separator.
The polymer material polyvinylidene fluoride that holds the electrolytic solution was applied to the both surfaces of a 7 μm-thick microporous polyethylene film (2 μm on each surface) to obtain the separator. The positive electrode and the negative electrode were wound into a roll via a separator, and placed in a bag of an exterior member realized by an aluminum laminate film. After injecting the electrolytic solution, the bag was heat fused to obtain a laminate film battery.

Comparative Example 8-1

A laminate film battery was fabricated in the same manner as in Example 8-1, except that DEC was not mixed, and that $LiPF_6$ was mixed in 1.1 mol/L without mixing LiFSI for the preparation of the electrolytic solution.

Comparative Example 8-2

A laminate film battery was fabricated in the same manner as in Example 8-1, except that DEC was mixed at a mixture ratio X of 10, or in 10 mass %, and that $LiPF_6$ was mixed in 1.1 mol/L without mixing LiFSI for the preparation of the electrolytic solution.

Comparative Example 8-3

A laminate film battery was fabricated in the same manner as in Example 8-1, except that DEC was not mixed for the preparation of the electrolytic solution.

Comparative Example 8-4

A laminate film battery was fabricated in the same manner as in Example 8-1, except that DEC was mixed at a mixture ratio X of 10, or in 10 mass %, and that the LiFSI mixed amount Z was changed to 0.7 mol/L, and the $LiPF_6$ mixed amount to 0.4 mol/L for the preparation of the electrolytic solution.

Comparative Examples 8-5 to 8-8

Laminate film batteries were fabricated in the same manner as in Example 8-10, except that the electrolytic solution compositions of Comparative Examples 8-1 to 8-4 were used for the preparation of the electrolytic solution.

Comparative Examples 8-9 to 8-12

Laminate film batteries were fabricated in the same manner as in Example 8-19, except that the electrolytic solution compositions of Comparative Examples 8-1 to 8-4 were used for the preparation of the electrolytic solution.

Comparative Examples 8-13 to 8-16

Laminate film batteries were fabricated in the same manner as in Example 8-28, except that the electrolytic solution compositions of Comparative Examples 8-1 to 8-4 were used for the preparation of the electrolytic solution.

Comparative Examples 8-17 to 8-20

Laminate film batteries were fabricated in the same manner as in Example 8-37, except that the electrolytic solution compositions of Comparative Examples 8-1 to 8-4 were used for the preparation of the electrolytic solution.
(Low Temperature Cycle Characteristics)
The secondary batteries fabricated as above were measured for low temperature cycle characteristics, as above. The charge voltage shown in Table 8 was used. The measurement results are presented in Table 8.

TABLE 8

| | Battery shape | Exterior material | Electrolyte | Structure | DEC amount [mass %] | LiFSI amount [mol/L] | Charge voltage [V] | Percentage remaining discharge capacity [%] |
|---|---|---|---|---|---|---|---|---|
| Example 8-1 | Cylindrical | Aluminum laminate | Liquid | Wound | 0.1 | 0.1 | 4.2 | 82 |
| Example 8-2 | | | | | 1 | 0.1 | 4.2 | 80 |
| Example 8-3 | | | | | 10 | 0.001 | 4.2 | 75 |
| Example 8-4 | | | | | 10 | 0.01 | 4.2 | 80 |

TABLE 8-continued

|  | Battery shape | Exterior material | Electrolyte | Structure | DEC amount [mass %] | LiFSI amount [mol/L] | Charge voltage [V] | Percentage remaining discharge capacity [%] |
|---|---|---|---|---|---|---|---|---|
| Example 8-5 |  |  |  |  | 10 | 0.05 | 4.2 | 81 |
| Example 8-6 |  |  |  |  | 10 | 0.1 | 4.2 | 80 |
| Example 8-7 |  |  |  |  | 10 | 0.5 | 4.2 | 79 |
| Example 8-8 |  |  |  |  | 30 | 0.1 | 4.2 | 77 |
| Example 8-9 |  |  |  |  | 70 | 0.1 | 4.2 | 74 |
| Example 8-10 | Rectangular | Aluminum laminate | Liquid | Wound | 0.1 | 0.1 | 4.2 | 83 |
| Example 8-11 |  |  |  |  | 1 | 0.1 | 4.2 | 82 |
| Example 8-12 |  |  |  |  | 10 | 0.001 | 4.2 | 73 |
| Example 8-13 |  |  |  |  | 10 | 0.01 | 4.2 | 79 |
| Example 8-14 |  |  |  |  | 10 | 0.05 | 4.2 | 82 |
| Example 8-15 |  |  |  |  | 10 | 0.1 | 4.2 | 81 |
| Example 8-16 |  |  |  |  | 10 | 0.5 | 4.2 | 80 |
| Example 8-17 |  |  |  |  | 30 | 0.1 | 4.2 | 76 |
| Example 8-18 |  |  |  |  | 70 | 0.1 | 4.2 | 73 |
| Example 8-19 | Rectangular | Aluminum laminate | Liquid | Laminate | 0.1 | 0.1 | 4.2 | 84 |
| Example 8-20 |  |  |  |  | 1 | 0.1 | 4.2 | 83 |
| Example 8-21 |  |  |  |  | 10 | 0.001 | 4.2 | 75 |
| Example 8-22 |  |  |  |  | 10 | 0.01 | 4.2 | 80 |
| Example 8-23 |  |  |  |  | 10 | 0.05 | 4.2 | 82 |
| Example 8-24 |  |  |  |  | 10 | 0.1 | 4.2 | 81 |
| Example 8-25 |  |  |  |  | 10 | 0.5 | 4.2 | 80 |
| Example 8-26 |  |  |  |  | 30 | 0.1 | 4.2 | 76 |
| Example 8-27 |  |  |  |  | 70 | 0.1 | 4.2 | 74 |
| Example 8-28 | Rectangular | Aluminum laminate | Non-fluidic | Wound | 0.1 | 0.1 | 4.2 | 80 |
| Example 8-29 |  |  |  |  | 1 | 0.1 | 4.2 | 72 |
| Example 8-30 |  |  |  |  | 10 | 0.001 | 4.2 | 77 |
| Example 8-31 |  |  |  |  | 10 | 0.01 | 4.2 | 79 |
| Example 8-32 |  |  |  |  | 10 | 0.05 | 4.2 | 80 |
| Example 8-33 |  |  |  |  | 10 | 0.1 | 4.2 | 79 |
| Example 8-34 |  |  |  |  | 10 | 0.5 | 4.2 | 77 |
| Example 8-35 |  |  |  |  | 30 | 0.1 | 4.2 | 74 |
| Example 8-36 |  |  |  |  | 70 | 0.1 | 4.2 | 72 |
| Example 8-37 | Rectangular | Aluminum laminate | Non-fluidic | Laminate | 0.1 | 0.1 | 4.2 | 80 |
| Example 8-38 |  |  |  |  | 1 | 0.1 | 4.2 | 73 |
| Example 8-39 |  |  |  |  | 10 | 0.001 | 4.2 | 78 |
| Example 8-40 |  |  |  |  | 10 | 0.01 | 4.2 | 79 |
| Example 8-41 |  |  |  |  | 10 | 0.05 | 4.2 | 81 |
| Example 8-42 |  |  |  |  | 10 | 0.1 | 4.2 | 80 |
| Example 8-43 |  |  |  |  | 10 | 0.5 | 4.2 | 77 |
| Example 8-44 |  |  |  |  | 30 | 0.1 | 4.2 | 74 |
| Example 8-45 |  |  |  |  | 70 | 0.1 | 4.2 | 72 |
| Comparative Example 8-1 | Cylindrical | Aluminum laminate | Liquid | Wound | None | None | 4.2 | 73 |
| Comparative Example 8-2 |  |  |  |  | 10 | None | 4.2 | 64 |
| Comparative Example 8-3 |  |  |  |  | None | 0.05 | 4.2 | 72 |
| Comparative Example 8-4 |  |  |  |  | 10 | 0.7 | 4.2 | 63 |
| Comparative Example 8-5 | Rectangular | Aluminum laminate | Liquid | Wound | None | None | 4.2 | 72 |
| Comparative Example 8-6 |  |  |  |  | 10 | None | 4.2 | 60 |
| Comparative Example 8-7 |  |  |  |  | None | 0.05 | 4.2 | 71 |
| Comparative Example 8-8 |  |  |  |  | 10 | 0.7 | 4.2 | 60 |
| Comparative Example 8-9 | Rectangular | Aluminum laminate | Liquid | Laminate | None | None | 4.2 | 71 |
| Comparative Example 8-10 |  |  |  |  | 10 | None | 4.2 | 57 |
| Comparative Example 8-11 |  |  |  |  | None | 0.05 | 4.2 | 71 |
| Comparative Example 8-12 |  |  |  |  | 10 | 0.7 | 4.2 | 56 |
| Comparative Example 8-13 | Rectangular | Aluminum laminate | Non-fluidic | Wound | None | None | 4.2 | 71 |
| Comparative Example 8-14 |  |  |  |  | 10 | None | 4.2 | 46 |
| Comparative Example 8-15 |  |  |  |  | None | 0.05 | 4.2 | 69 |
| Comparative Example 8-16 |  |  |  |  | 10 | 0.7 | 4.2 | 46 |

TABLE 8-continued

|  | Battery shape | Exterior material | Electrolyte | Structure | DEC amount [mass %] | LiFSI amount [mol/L] | Charge voltage [V] | Percentage remaining discharge capacity [%] |
|---|---|---|---|---|---|---|---|---|
| Comparative Example 8-17 | Rectangular | Aluminum laminate | Non-fluidic | Laminate | None | None | 4.2 | 71 |
| Comparative Example 8-18 |  |  |  |  | 10 | None | 4.2 | 43 |
| Comparative Example 8-19 |  |  |  |  | None | 0.05 | 4.2 | 70 |
| Comparative Example 8-20 |  |  |  |  | 10 | 0.7 | 4.2 | 44 |

As can be seen from Table 8, the inclusion of LiFSI in the electrolytic solution made it possible to suppress the deterioration of the low temperature cycle characteristics in Examples 8-1 to 8-45, despite the insulating layer. On the other hand, the low temperature cycle characteristics lowered in Comparative Example 8-1, Comparative Example 8-5, Comparative Example 8-9, Comparative Example 8-13, and Comparative Example 8-17, in which the insulating layer was formed, and in which the electrolytic solution did not contain LiFSI. The low temperature cycle characteristics lowered even further in Comparative Example 8-2, Comparative Example 8-6, Comparative Example 8-10, Comparative Example 8-14, and Comparative Example 8-18, in which the insulating layer was formed, and in which the electrolytic solution contained additives. The low temperature cycle characteristics lowered in Comparative Example 8-4, Comparative Example 8-8, Comparative Example 8-12, Comparative Example 8-16, and Comparative Example 8-20, in which the electrolytic solution contained LiFSI but in excess amounts. Further, because deformable exterior material such as the aluminum laminate film was used, adding LiFSI was found to be effective. The effect of adding LiFSI was higher in the laminated structure than in the wound structure. In the case of a non-fluidic electrolyte such as the gel electrolyte, the effect of adding LiFSI was even higher, because the ion conductivity was likely to lower, and the deposition of lithium was likely to occur and cause deformation.

Examples 9-1 to 9-50, Comparative Examples 9-1 to 9-20

The same procedures performed in Examples 8-1 to 8-45 and Comparative Examples 8-1 to 8-20 were performed, except that the amounts of the positive and negative electrode active materials were adjusted to make the open circuit voltage (i.e., battery voltage) in the fully charged state the voltage presented in Table 9.
(Low Temperature Cycle Characteristics)
The secondary batteries fabricated as above were measured for low temperature cycle characteristics, as above. The charge voltage shown in Table 9 was used. The measurement results are presented in Table 9.

TABLE 9

|  | Battery shape | Exterior material | Electrolyte | Structure | DEC amount [mass %] | LiFSI amount [mol/L] | Charge voltage [V] | Percentage remaining discharge capacity [%] |
|---|---|---|---|---|---|---|---|---|
| Example 9-1 | Cylindrical | Aluminum laminate | Liquid | Wound | 0.1 | 0.05 | 4.35 | 72 |
| Example 9-2 |  |  |  |  | 1 | 0.05 | 4.35 | 70 |
| Example 9-3 |  |  |  |  | 10 | 0.001 | 4.35 | 65 |
| Example 9-4 |  |  |  |  | 10 | 0.01 | 4.35 | 68 |
| Example 9-5 |  |  |  |  | 10 | 0.05 | 4.35 | 71 |
| Example 9-6 |  |  |  |  | 10 | 0.1 | 4.35 | 69 |
| Example 9-7 |  |  |  |  | 10 | 0.5 | 4.35 | 65 |
| Example 9-8 |  |  |  |  | 30 | 0.05 | 4.35 | 68 |
| Example 9-9 |  |  |  |  | 70 | 0.05 | 4.35 | 66 |
| Example 9-10 |  |  |  |  | 10 | 0.05 | 4.45 | 68 |
| Example 9-11 | Rectangular | Aluminum laminate | Liquid | Wound | 0.1 | 0.05 | 4.35 | 73 |
| Example 9-12 |  |  |  |  | 1 | 0.05 | 4.35 | 71 |
| Example 9-13 |  |  |  |  | 10 | 0.001 | 4.35 | 66 |
| Example 9-14 |  |  |  |  | 10 | 0.01 | 4.35 | 69 |
| Example 9-15 |  |  |  |  | 10 | 0.05 | 4.35 | 72 |
| Example 9-16 |  |  |  |  | 10 | 0.1 | 4.35 | 70 |
| Example 9-17 |  |  |  |  | 10 | 0.5 | 4.35 | 66 |
| Example 9-18 |  |  |  |  | 30 | 0.05 | 4.35 | 69 |
| Example 9-19 |  |  |  |  | 70 | 0.05 | 4.35 | 67 |
| Example 9-20 |  |  |  |  | 10 | 0.05 | 4.45 | 68 |
| Example 9-21 | Rectangular | Aluminum laminate | Liquid | Laminate | 0.1 | 0.05 | 4.35 | 72 |
| Example 9-22 |  |  |  |  | 1 | 0.05 | 4.35 | 70 |
| Example 9-23 |  |  |  |  | 10 | 0.001 | 4.35 | 65 |
| Example 9-24 |  |  |  |  | 10 | 0.01 | 4.35 | 68 |
| Example 9-25 |  |  |  |  | 10 | 0.05 | 4.35 | 71 |
| Example 9-26 |  |  |  |  | 10 | 0.1 | 4.35 | 69 |
| Example 9-27 |  |  |  |  | 10 | 0.5 | 4.35 | 65 |
| Example 9-28 |  |  |  |  | 30 | 0.05 | 4.35 | 68 |

TABLE 9-continued

| | Battery shape | Exterior material | Electrolyte | Structure | DEC amount [mass %] | LiFSI amount [mol/L] | Charge voltage [V] | Percentage remaining discharge capacity [%] |
|---|---|---|---|---|---|---|---|---|
| Example 9-29 | | | | | 70 | 0.05 | 4.35 | 67 |
| Example 9-30 | | | | | 10 | 0.05 | 4.45 | 66 |
| Example 9-31 | Rectangular | Aluminum laminate | Non-fluidic | Wound | 0.1 | 0.1 | 4.35 | 72 |
| Example 9-32 | | | | | 1 | 0.1 | 4.35 | 71 |
| Example 9-33 | | | | | 10 | 0.001 | 4.35 | 66 |
| Example 9-34 | | | | | 10 | 0.01 | 4.35 | 68 |
| Example 9-35 | | | | | 10 | 0.05 | 4.35 | 71 |
| Example 9-36 | | | | | 10 | 0.1 | 4.35 | 70 |
| Example 9-37 | | | | | 10 | 0.5 | 4.35 | 65 |
| Example 9-38 | | | | | 30 | 0.1 | 4.35 | 68 |
| Example 9-39 | | | | | 70 | 0.1 | 4.35 | 66 |
| Example 9-40 | | | | | 10 | 0.05 | 4.45 | 66 |
| Example 9-41 | Rectangular | Aluminum laminate | Non-fluidic | Laminate | 0.1 | 0.05 | 4.35 | 69 |
| Example 9-42 | | | | | 1 | 0.05 | 4.35 | 68 |
| Example 9-43 | | | | | 10 | 0.001 | 4.35 | 62 |
| Example 9-44 | | | | | 10 | 0.01 | 4.35 | 64 |
| Example 9-45 | | | | | 10 | 0.05 | 4.35 | 68 |
| Example 9-46 | | | | | 10 | 0.1 | 4.35 | 67 |
| Example 9-47 | | | | | 10 | 0.5 | 4.35 | 63 |
| Example 9-48 | | | | | 30 | 0.05 | 4.35 | 65 |
| Example 9-49 | | | | | 70 | 0.05 | 4.35 | 62 |
| Example 9-50 | | | | | 10 | 0.05 | 4.45 | 64 |
| Comparative Example 9-1 | Cylindrical | Aluminum laminate | Liquid | Wound | None | None | 4.35 | 64 |
| Comparative Example 9-2 | | | | | 10 | None | 4.35 | 52 |
| Comparative Example 9-3 | | | | | None | 0.05 | 4.35 | 63 |
| Comparative Example 9-4 | | | | | 10 | 0.7 | 4.35 | 53 |
| Comparative Example 9-5 | Rectangular | Aluminum laminate | Liquid | Wound | None | None | 4.35 | 63 |
| Comparative Example 9-6 | | | | | 10 | None | 4.35 | 50 |
| Comparative Example 9-7 | | | | | None | 0.05 | 4.35 | 62 |
| Comparative Example 9-8 | | | | | 10 | 0.7 | 4.35 | 51 |
| Comparative Example 9-9 | Rectangular | Aluminum laminate | Liquid | Laminate | None | None | 4.35 | 61 |
| Comparative Example 9-10 | | | | | 10 | None | 4.35 | 48 |
| Comparative Example 9-11 | | | | | None | 0.05 | 4.35 | 61 |
| Comparative Example 9-12 | | | | | 10 | 0.7 | 4.35 | 49 |
| Comparative Example 9-13 | Rectangular | Aluminum laminate | Non-fluidic | Wound | None | None | 4.35 | 58 |
| Comparative Example 9-14 | | | | | 10 | None | 4.35 | 40 |
| Comparative Example 9-15 | | | | | None | 0.05 | 4.35 | 57 |
| Comparative Example 9-16 | | | | | 10 | 0.7 | 4.35 | 41 |
| Comparative Example 9-17 | Rectangular | Aluminum laminate | Non-fluidic | Laminate | None | None | 4.35 | 56 |
| Comparative Example 9-18 | | | | | 10 | None | 4.35 | 38 |
| Comparative Example 9-19 | | | | | None | 0.05 | 4.35 | 55 |
| Comparative Example 9-20 | | | | | 10 | 0.7 | 4.35 | 40 |

As can be seen from Table 9, the inclusion of LiFSI in the electrolytic solution made it possible to suppress the deterioration of the low temperature cycle characteristics in Examples 9-1 to 9-50, despite the insulating layer. On the other hand, the low temperature cycle characteristics lowered in Comparative Example 9-1, Comparative Example 9-5, Comparative Example 9-9, Comparative Example 9-13, and Comparative Example 9-17, in which the insulating layer was formed, and in which the electrolytic solution did not contain LiFSI. The low temperature cycle characteristics lowered even further in Comparative Example 9-2, Comparative Example 9-6, Comparative Example 9-10, Comparative Example 9-14, and Comparative Example 9-18, in which the insulating layer was formed, and in which the electrolytic solution contained additives. The low temperature cycle characteristics lowered in Comparative Example 9-4, Comparative Example 9-8, Comparative Example 9-12, Comparative Example 9-16, and Comparative Example 9-20, in which the electrolytic solution contained LiFSI but in excess amounts.

Examples 10-1 to 10-10

The same procedures performed in the Examples 8-37 to 8-45 were performed, except that SnCoC-containing material was used as the negative electrode active material.

A tin.cobalt.indium.titanium alloy powder, and a carbon powder were mixed, and a SnCoC-containing material was synthesized by a mechanochemical reaction. Upon analysis, the composition of the SnCoC-containing material was found to be 48 mass % tin, 23 mass % cobalt, 20 mass % carbon, and 32 mass % Co/(Sn+Co).

Thereafter, the negative electrode active material SnCoC-containing material powder (80 parts by mass), the conductive agent graphite (12 parts by mass), and the binder polyvinylidene fluoride (8 parts by mass) were mixed, and dispersed in the solvent N-methyl-2-pyrrolidone. Finally, the solution was applied to a negative electrode collector realized by a copper foil (15 μm thick), dried, and compression molded to form a negative electrode active material layer.

Examples 10-11 to 10-20

The same procedures performed in Examples 10-1 to 10-10 were performed, except that Si-containing material was used as the negative electrode active material. A silicon powder having an average particle diameter of 1 μm was used as the negative electrode active material. The silicon powder (95 parts by mass), and the binder polyimide (5 parts by mass) were mixed, and N-methyl-2-pyrrolidone was added to produce a slurry. The negative electrode mixture slurry was evenly applied to the both surfaces of a negative electrode collector realized by a 15 μm-thick belt-like copper foil, dried, and compression molded. The product was then heated at 400° C. for 12 hours in a vacuum atmosphere to form a negative electrode active material layer.

Comparative Example 10-1

A laminate film battery was fabricated in the same manner as in Example 10-1, except that DEC was not mixed, and that LiPF$_6$ was mixed in 1.1 mol/L without mixing LiFSI for the preparation of the electrolytic solution.

Comparative Example 10-2

A laminate film battery was fabricated in the same manner as in Example 10-1, except that DEC was mixed at a mixture ratio X of 10, or in 10 mass %, and that LiPF$_6$ was mixed in 1.1 mol/L without mixing LiFSI for the preparation of the electrolytic solution.

Comparative Example 10-3

A laminate film battery was fabricated in the same manner as in Example 10-1, except that DEC was not mixed for the preparation of the electrolytic solution.

Comparative Example 10-4

A laminate film battery was fabricated in the same manner as in Example 10-1, except that DEC was mixed at a mixture ratio X of 10, or in 10 mass %, and that the LiFSI mixed amount was changed to 0.7 mol/L, and the LiPF$_6$ mixed amount to 0.4 mol/L for the preparation of the electrolytic solution.

(Low Temperature Cycle Characteristics)

The secondary batteries fabricated as above were measured for low temperature cycle characteristics, as above. The charge voltage shown in Table 10 was used. The measurement results are presented in Table 10.

TABLE 10

| | Negative electrode | Battery shape | Exterior material | Electrolyte | Structure | DEC amount [mass %] | LiFSI amount [mol/L] | Charge voltage [V] | Percentage remaining discharge capacity [%] |
|---|---|---|---|---|---|---|---|---|---|
| Example 10-1 | SnCoC | Rectangular | Aluminum laminate | Non-fluidic | Laminate | 0.1 | 0.05 | 4.2 | 69 |
| Example 10-2 | | | | | | 1 | 0.05 | 4.2 | 67 |
| Example 10-3 | | | | | | 10 | 0.001 | 4.2 | 62 |
| Example 10-4 | | | | | | 10 | 0.01 | 4.2 | 67 |
| Example 10-5 | | | | | | 10 | 0.05 | 4.2 | 69 |
| Example 10-6 | | | | | | 10 | 0.1 | 4.2 | 68 |
| Example 10-7 | | | | | | 10 | 0.5 | 4.2 | 65 |
| Example 10-8 | | | | | | 30 | 0.05 | 4.2 | 64 |
| Example 10-9 | | | | | | 70 | 0.05 | 4.2 | 61 |
| Example 10-10 | | | | | | 10 | 0.05 | 4.3 | 64 |
| Example 10-11 | Si | Rectangular | Aluminum laminate | Non-fluidic | Laminate | 0.1 | 0.05 | 4.2 | 58 |
| Example 10-12 | | | | | | 1 | 0.05 | 4.2 | 70 |
| Example 10-13 | | | | | | 10 | 0.001 | 4.2 | 49 |
| Example 10-14 | | | | | | 10 | 0.01 | 4.2 | 58 |
| Example 10-15 | | | | | | 10 | 0.05 | 4.2 | 60 |
| Example 10-16 | | | | | | 10 | 0.1 | 4.2 | 59 |
| Example 10-17 | | | | | | 10 | 0.5 | 4.2 | 56 |
| Example 10-18 | | | | | | 30 | 0.05 | 4.2 | 58 |
| Example 10-19 | | | | | | 70 | 0.05 | 4.2 | 53 |
| Example 10-20 | | | | | | 10 | 0.05 | 4.3 | 53 |
| Comparative Example 10-1 | SnCoC | Rectangular | Aluminum laminate | Non-fluidic | Laminate | None | None | 4.2 | 51 |
| Comparative Example 10-2 | | | | | | 10 | None | 4.2 | 36 |
| Comparative Example 10-3 | | | | | | None | 0.05 | 4.2 | 52 |

TABLE 10-continued

| | Negative electrode | Battery shape | Exterior material | Electrolyte | Structure | DEC amount [mass %] | LiFSI amount [mol/L] | Charge voltage [V] | Percentage remaining discharge capacity [%] |
|---|---|---|---|---|---|---|---|---|---|
| Comparative Example 10-4 | | | | | | 10 | 0.7 | 4.2 | 37 |
| Comparative Example 10-5 | Si | Rectangular | Aluminum laminate | Non-fluidic | Laminate | None | None | 4.2 | 43 |
| Comparative Example 10-6 | | | | | | 10 | None | 4.2 | 28 |
| Comparative Example 10-7 | | | | | | None | 0.05 | 4.2 | 43 |
| Comparative Example 10-8 | | | | | | 10 | 0.7 | 4.2 | 29 |

As can be seen from Table 10, the inclusion of LiFSI in the electrolytic solution made it possible to suppress the deterioration of the low temperature cycle characteristics in Examples 10-1 to 10-20, despite the insulating layer. On the other hand, the low temperature cycle characteristics lowered in Comparative Examples 10-1 and 10-5, in which the insulating layer was formed, and in which the electrolytic solution did not contain LiFSI. The low temperature cycle characteristics lowered even further in Comparative Examples 10-2 and 10-6, in which the insulating layer was formed, and in which the electrolytic solution contained additives. The low temperature cycle characteristics lowered in Comparative Examples 10-4 and 10-8, in which the electrolytic solution contained LiFSI but in excess amounts.

Example 11-1

A secondary battery was fabricated in the same manner as in Example 1-1, except that the positive electrode was fabricated as follows, and that LiFSI was mixed in 0.001 mol/L without mixing LiPF$_6$.
(Fabrication of Positive Electrode)
The positive electrode active material lithium iron phosphate (LiFePO$_4$; 92 parts by mass, the conductive agent Ketjen black (3 parts by mass), and the binder polyvinylidene fluoride (5 parts by mass) were uniformly mixed, and N-methylpyrrolidone was added to obtain a positive electrode mixture slurry. The positive electrode mixture slurry was then evenly applied to the both surfaces of a 12 μm-thick aluminum foil, dried, and compression molded to form a positive electrode active material layer (active material layer volume density: 2.0 g/cc).

Example 11-2

A secondary battery was fabricated in the same manner as in Example 11-1, except that LiFSI was mixed in 0.01 mol/L for the preparation of the electrolytic solution.

Example 11-3

A secondary battery was fabricated in the same manner as in Example 11-1, except that LiFSI was mixed in 0.05 mol/L for the preparation of the electrolytic solution.

Example 11-4

A secondary battery was fabricated in the same manner as in Example 11-1, except that LiFSI was mixed in 0.1 mol/L for the preparation of the electrolytic solution.

Example 11-5

A secondary battery was fabricated in the same manner as in Example 11-1, except that LiFSI was mixed in 0.3 mol/L for the preparation of the electrolytic solution.

Example 11-6

A secondary battery was fabricated in the same manner as in Example 11-1, except that LiFSI was mixed in 0.5 mol/L for the preparation of the electrolytic solution.

Example 11-7

A secondary battery was fabricated in the same manner as in Example 11-1, except that LiFSI was mixed in 1 mol/L for the preparation of the electrolytic solution.

Example 11-8

A secondary battery was fabricated in the same manner as in Example 11-1, except that LiFSI was mixed in 1.5 mol/L for the preparation of the electrolytic solution.

Example 11-9

A secondary battery was fabricated in the same manner as in Example 11-1, except that LiFSI was mixed in 2 mol/L for the preparation of the electrolytic solution.

Example 11-10

A secondary battery was fabricated in the same manner as in Example 11-1, except that LiFSI was mixed in 2.2 mol/L for the preparation of the electrolytic solution.

Example 11-11

A secondary battery was fabricated in the same manner as in Example 11-1, except that LiFSI was mixed in 2.5 mol/L for the preparation of the electrolytic solution.

Examples 11-12 to 11-22

Secondary batteries were fabricated in the same manner as in Examples 11-1 to 11-12, except that LiPF$_6$ was mixed in 0.5 mol/L for the preparation of the electrolytic solution.

Examples 11-23 to 11-33

Secondary batteries were fabricated in the same manner as in Examples 11-1 to 11-12, except that LiPF$_6$ was mixed in 1 mol/L for the preparation of the electrolytic solution.

Examples 11-34 to 11-44

Secondary batteries were fabricated in the same manner as in Examples 11-1 to 11-12, except that LiPF$_6$ was mixed in 1.5 mol/L for the preparation of the electrolytic solution.

Examples 11-45 to 11-88

Secondary batteries were fabricated in the same manner as in Examples 11-1 to 11-44, except that the additive FEC was used instead of VC for the preparation of the electrolytic solution.

Comparative Example 11-1

A secondary battery was fabricated in the same manner as in Example 11-1, except that the insulating layer was not formed, and that the additive VC, and the electrolyte salts LiFSI and LiPF$_6$ were not mixed for the preparation of the electrolytic solution.

Comparative Example 11-2

A secondary battery was fabricated in the same manner as in Example 11-1, except that the insulating layer was not formed, and that the additive VC was not mixed, and that the electrolyte salt LiPF$_6$ was mixed in 1 mol/L without mixing LiFSI for the preparation of the electrolytic solution.

Comparative Example 11-3

A secondary battery was fabricated in the same manner as in Example 11-1, except that the electrolyte salt LiPF$_6$ was mixed in 1 mol/L without mixing LiFSI for the preparation of the electrolytic solution.

Comparative Example 11-4

A secondary battery was fabricated in the same manner as in Example 11-1, except that the electrolyte salt LiTFSI was mixed in 0.05 mol/L without mixing LiFSI and LiPF$_6$ for the preparation of the electrolytic solution.

Comparative Examples 11-5 to 11-6

Secondary batteries were fabricated in the same manner as in Comparative Examples 11-3 to 11-4, except that the additive FEC was used instead of VC for the preparation of the electrolytic solution.

(Low Temperature Cycle)

The secondary batteries fabricated as above were measured for low temperature cycle characteristics, as above. The charge voltage shown in Table 11 was used. The measurement results are presented in Table 11.

TABLE 11

| | Charge voltage [V] | Insulating material | Additive Material | Additive Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 11-1 | 3.6 | Alumina | VC | 1 | 0.001 | — | — | 59 |
| Example 11-2 | | | | | 0.01 | | | 67 |
| Example 11-3 | | | | | 0.05 | | | 69 |
| Example 11-4 | | | | | 0.1 | | | 73 |
| Example 11-5 | | | | | 0.3 | | | 76 |
| Example 11-6 | | | | | 0.5 | | | 79 |
| Example 11-7 | | | | | 1 | | | 82 |
| Example 11-8 | | | | | 1.5 | | | 85 |
| Example 11-9 | | | | | 2 | | | 84 |
| Example 11-10 | | | | | 2.2 | | | 79 |
| Example 11-11 | | | | | 2.5 | | | 76 |
| Example 11-12 | | | | | 0.001 | 0.5 | | 71 |
| Example 11-13 | | | | | 0.01 | | | 74 |
| Example 11-14 | | | | | 0.05 | | | 77 |
| Example 11-15 | | | | | 0.1 | | | 79 |
| Example 11-16 | | | | | 0.3 | | | 82 |
| Example 11-17 | | | | | 0.5 | | | 83 |
| Example 11-18 | | | | | 1 | | | 84 |
| Example 11-19 | | | | | 1.5 | | | 80 |
| Example 11-20 | | | | | 2 | | | 79 |
| Example 11-21 | | | | | 2.2 | | | 77 |
| Example 11-22 | | | | | 2.5 | | | 72 |
| Example 11-23 | | | | | 0.001 | 1 | | 72 |
| Example 11-24 | | | | | 0.01 | | | 76 |
| Example 11-25 | | | | | 0.05 | | | 78 |
| Example 11-26 | | | | | 0.1 | | | 80 |
| Example 11-27 | | | | | 0.3 | | | 81 |
| Example 11-28 | | | | | 0.5 | | | 82 |
| Example 11-29 | | | | | 1 | | | 81 |
| Example 11-30 | | | | | 1.5 | | | 77 |
| Example 11-31 | | | | | 2 | | | 73 |
| Example 11-32 | | | | | 2.2 | | | 68 |
| Example 11-33 | | | | | 2.5 | | | 64 |
| Example 11-34 | | | | | 0.001 | 1.5 | | 77 |
| Example 11-35 | | | | | 0.01 | | | 78 |

TABLE 11-continued

| | Charge voltage [V] | Insulating material | Additive Material | Additive Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 11-36 | | | | | 0.05 | | | 81 |
| Example 11-37 | | | | | 0.1 | | | 82 |
| Example 11-38 | | | | | 0.3 | | | 82 |
| Example 11-39 | | | | | 0.5 | | | 82 |
| Example 11-40 | | | | | 1 | | | 77 |
| Example 11-41 | | | | | 1.5 | | | 74 |
| Example 11-42 | | | | | 2 | | | 68 |
| Example 11-43 | | | | | 2.2 | | | 65 |
| Example 11-44 | | | | | 2.5 | | | 58 |
| Example 11-45 | 3.6 | Alumina | FEC | 1 | 0.001 | — | — | 60 |
| Example 11-46 | | | | | 0.01 | | | 68 |
| Example 11-47 | | | | | 0.05 | | | 70 |
| Example 11-48 | | | | | 0.1 | | | 75 |
| Example 11-49 | | | | | 0.3 | | | 78 |
| Example 11-50 | | | | | 0.5 | | | 81 |
| Example 11-51 | | | | | 1 | | | 84 |
| Example 11-52 | | | | | 1.5 | | | 85 |
| Example 11-53 | | | | | 2 | | | 84 |
| Example 11-54 | | | | | 2.2 | | | 80 |
| Example 11-55 | | | | | 2.5 | | | 78 |
| Example 11-56 | | | | | 0.001 | 0.5 | | 74 |
| Example 11-57 | | | | | 0.01 | | | 75 |
| Example 11-58 | | | | | 0.05 | | | 79 |
| Example 11-59 | | | | | 0.1 | | | 83 |
| Example 11-60 | | | | | 0.3 | | | 84 |
| Example 11-61 | | | | | 0.5 | | | 84 |
| Example 11-62 | | | | | 1 | | | 85 |
| Example 11-63 | | | | | 1.5 | | | 83 |
| Example 11-64 | | | | | 2 | | | 79 |
| Example 11-65 | | | | | 2.2 | | | 77 |
| Example 11-66 | | | | | 2.5 | | | 75 |
| Example 11-67 | | | | | 0.001 | 1 | | 74 |
| Example 11-68 | | | | | 0.01 | | | 78 |
| Example 11-69 | | | | | 0.05 | | | 79 |
| Example 11-70 | | | | | 0.1 | | | 82 |
| Example 11-71 | | | | | 0.3 | | | 83 |
| Example 11-72 | | | | | 0.5 | | | 85 |
| Example 11-73 | | | | | 1 | | | 84 |
| Example 11-74 | | | | | 1.5 | | | 79 |
| Example 11-75 | | | | | 2 | | | 75 |
| Example 11-76 | | | | | 2.2 | | | 70 |
| Example 11-77 | | | | | 2.5 | | | 65 |
| Example 11-78 | | | | | 0.001 | 1.5 | | 78 |
| Example 11-79 | | | | | 0.01 | | | 79 |
| Example 11-80 | | | | | 0.05 | | | 83 |
| Example 11-81 | | | | | 0.1 | | | 83 |
| Example 11-82 | | | | | 0.3 | | | 84 |
| Example 11-83 | | | | | 0.5 | | | 82 |
| Example 11-84 | | | | | 1 | | | 79 |
| Example 11-85 | | | | | 1.5 | | | 76 |
| Example 11-86 | | | | | 2 | | | 71 |
| Example 11-87 | | | | | 2.2 | | | 64 |
| Example 11-88 | | | | | 2.5 | | | 60 |
| Comparative Example 11-1 | 3.6 | — | — | — | — | — | — | 64 |
| Comparative Example 11-2 | | Alumina | — | — | — | 1 | — | 56 |
| Comparative Example 11-3 | | Alumina | VC | 1 | — | 1 | — | 43 |
| Comparative Example 11-4 | | Alumina | VC | 1 | — | 1.05 | 0.05 | 42 |
| Comparative Example 11-5 | | Alumina | FEC | 1 | — | 1 | — | 47 |
| Comparative Example 11-6 | | Alumina | FEC | 1 | — | 1 | 0.05 | 47 |

As can be seen from Table 11, the inclusion of LiFSI in the electrolytic solution made it possible to suppress the deterioration of the low temperature cycle characteristics in Examples 11-1 to 11-88, despite the insulating layer. On the other hand, the low temperature cycle characteristics lowered in Comparative Example 11-2, in which the insulating layer was formed, and in which the electrolytic solution did not contain LiFSI. The low temperature cycle characteristics lowered even further in Comparative Examples 11-3 and 11-6, in which the insulating layer was formed on the negative electrode, and in which the electrolytic solution contained additives.

Examples 12-1 to 12-88, Comparative Examples 12-1 to 12-8

Secondary batteries of Examples 12-1 to 12-88, Comparative Examples 12-1 to 12-3, Comparative Examples 12-5 and 12-6, and Comparative Example 12-8 were fabricated in the same manner as in Examples 11-1 to 11-88 and Comparative Examples 12-1 to 12-6, respectively. Secondary batteries of Comparative Examples 12-4 and 12-7 were fabricated in the same manner as in Comparative Examples 12-3 and 12-6, respectively, by additionally containing 2.6 mol/L of LiFSI.

The secondary batteries were measured for low temperature cycle characteristics, as follows.

(Low Temperature Cycle)

For the measurement of low temperature cycle characteristics, the first cycle of charge and discharge was performed at 23° C., and the second cycle at −5° C. to check discharge capacity. The 3rd to 50th charge and discharge cycles were performed at −5° C., and the percentage remaining discharge capacity (%) after 50 cycles was determined with respect to the discharge capacity after 2 cycles which is set to be 100. The charge and discharge conditions for the first cycle are as follows. The battery was charged under a constant current density of 30 mA/cm$^2$ until the battery voltage reached the charge voltage shown in Table 1. The battery was further charged under the constant charge voltage of Table 12 until the current density reached 0.02 mA/cm$^2$, and discharged at a constant current density of 30 mA/cm$^2$ until the battery voltage reached 3 V. The measurement results are presented in Table 12.

TABLE 12

| | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 12-1 | 3.6 | Alumina | VC | 1 | 0.001 | — | — | 40 |
| Example 12-2 | | | | | 0.01 | | | 41 |
| Example 12-3 | | | | | 0.05 | | | 51 |
| Example 12-4 | | | | | 0.1 | | | 55 |
| Example 12-5 | | | | | 0.3 | | | 61 |
| Example 12-6 | | | | | 0.5 | | | 65 |
| Example 12-7 | | | | | 1 | | | 70 |
| Example 12-8 | | | | | 1.5 | | | 73 |
| Example 12-9 | | | | | 2 | | | 72 |
| Example 12-10 | | | | | 2.2 | | | 70 |
| Example 12-11 | | | | | 2.5 | | | 68 |
| Example 12-12 | | | | | 0.001 | 0.5 | | 52 |
| Example 12-13 | | | | | 0.01 | | | 55 |
| Example 12-14 | | | | | 0.05 | | | 58 |
| Example 12-15 | | | | | 0.1 | | | 61 |
| Example 12-16 | | | | | 0.3 | | | 66 |
| Example 12-17 | | | | | 0.5 | | | 71 |
| Example 12-18 | | | | | 1 | | | 74 |
| Example 12-19 | | | | | 1.5 | | | 72 |
| Example 12-20 | | | | | 2 | | | 71 |
| Example 12-21 | | | | | 2.2 | | | 70 |
| Example 12-22 | | | | | 2.5 | | | 66 |
| Example 12-23 | | | | | 0.001 | 1 | | 55 |
| Example 12-24 | | | | | 0.01 | | | 56 |
| Example 12-25 | | | | | 0.05 | | | 61 |
| Example 12-26 | | | | | 0.1 | | | 67 |
| Example 12-27 | | | | | 0.3 | | | 71 |
| Example 12-28 | | | | | 0.5 | | | 73 |
| Example 12-29 | | | | | 1 | | | 75 |
| Example 12-30 | | | | | 1.5 | | | 72 |
| Example 12-31 | | | | | 2 | | | 70 |
| Example 12-32 | | | | | 2.2 | | | 65 |
| Example 12-33 | | | | | 2.5 | | | 60 |
| Example 12-34 | | | | | 0.001 | 1.5 | | 56 |
| Example 12-35 | | | | | 0.01 | | | 62 |
| Example 12-36 | | | | | 0.05 | | | 67 |
| Example 12-37 | | | | | 0.1 | | | 74 |
| Example 12-38 | | | | | 0.3 | | | 74 |
| Example 12-39 | | | | | 0.5 | | | 75 |
| Example 12-40 | | | | | 1 | | | 72 |
| Example 12-41 | | | | | 1.5 | | | 70 |
| Example 12-42 | | | | | 2 | | | 66 |
| Example 12-43 | | | | | 2.2 | | | 60 |
| Example 12-44 | | | | | 2.5 | | | 55 |
| Example 12-45 | 3.6 | Alumina | FEC | 1 | 0.001 | — | — | 42 |

TABLE 12-continued

| | Charge voltage [V] | Insulating material | Additive Material | Amount [mass %] | LiFSI amount [mol/L] | LiPF$_6$ amount [mol/L] | LiTFSI amount [mol/L] | Percentage remaining discharge capacity [%] |
|---|---|---|---|---|---|---|---|---|
| Example 12-46 | | | | | 0.01 | | | 43 |
| Example 12-47 | | | | | 0.05 | | | 53 |
| Example 12-48 | | | | | 0.1 | | | 56 |
| Example 12-49 | | | | | 0.3 | | | 61 |
| Example 12-50 | | | | | 0.5 | | | 66 |
| Example 12-51 | | | | | 1 | | | 71 |
| Example 12-52 | | | | | 1.5 | | | 74 |
| Example 12-53 | | | | | 2 | | | 73 |
| Example 12-54 | | | | | 2.2 | | | 72 |
| Example 12-55 | | | | | 2.5 | | | 70 |
| Example 12-56 | | | | | 0.001 | 0.5 | | 54 |
| Example 12-57 | | | | | 0.01 | | | 56 |
| Example 12-58 | | | | | 0.05 | | | 58 |
| Example 12-59 | | | | | 0.1 | | | 62 |
| Example 12-60 | | | | | 0.3 | | | 67 |
| Example 12-61 | | | | | 0.5 | | | 73 |
| Example 12-62 | | | | | 1 | | | 75 |
| Example 12-63 | | | | | 1.5 | | | 74 |
| Example 12-64 | | | | | 2 | | | 73 |
| Example 12-65 | | | | | 2.2 | | | 71 |
| Example 12-66 | | | | | 2.5 | | | 66 |
| Example 12-67 | | | | | 0.001 | 1 | | 55 |
| Example 12-68 | | | | | 0.01 | | | 58 |
| Example 12-69 | | | | | 0.05 | | | 62 |
| Example 12-70 | | | | | 0.1 | | | 68 |
| Example 12-71 | | | | | 0.3 | | | 73 |
| Example 12-72 | | | | | 0.5 | | | 74 |
| Example 12-73 | | | | | 1 | | | 75 |
| Example 12-74 | | | | | 1.5 | | | 73 |
| Example 12-75 | | | | | 2 | | | 70 |
| Example 12-76 | | | | | 2.2 | | | 66 |
| Example 12-77 | | | | | 2.5 | | | 62 |
| Example 12-78 | | | | | 0.001 | 1.5 | | 57 |
| Example 12-79 | | | | | 0.01 | | | 63 |
| Example 12-80 | | | | | 0.05 | | | 69 |
| Example 12-81 | | | | | 0.1 | | | 74 |
| Example 12-82 | | | | | 0.3 | | | 75 |
| Example 12-83 | | | | | 0.5 | | | 75 |
| Example 12-84 | | | | | 1 | | | 73 |
| Example 12-85 | | | | | 1.5 | | | 71 |
| Example 12-86 | | | | | 2 | | | 67 |
| Example 12-87 | | | | | 2.2 | | | 61 |
| Example 12-88 | | | | | 2.5 | | | 56 |
| Comparative Example 12-1 | 3.6 | — | — | — | — | — | — | 52 |
| Comparative Example 12-2 | | Alumina | — | — | — | 1 | — | 42 |
| Comparative Example 12-3 | | Alumina | VC | 1 | — | 1 | — | 37 |
| Comparative Example 12-4 | | Alumina | VC | 1 | 2.6 | 1 | — | 34 |
| Comparative Example 12-5 | | Alumina | VC | 1 | — | 1.05 | 0.05 | 28 |
| Comparative Example 12-6 | | Alumina | FEC | 1 | — | 1 | — | 37 |
| Comparative Example 12-7 | | Alumina | FEC | 1 | 2.6 | 1 | — | 39 |
| Comparative Example 12-8 | | Alumina | FEC | 1 | — | 1 | 0.05 | 38 |

As can be seen from Table 12, the inclusion of LiFSI in the electrolytic solution made it possible to suppress the deterioration of the low temperature cycle characteristics in Examples 12-1 to 12-88 even in the high-rate charge and discharge, despite the insulating layer. On the other hand, the low temperature cycle characteristics lowered in the high-rate charge and discharge in Comparative Example 12-2, in which the insulating layer was formed, and in which the electrolytic solution did not contain LiFSI. The low temperature cycle characteristics lowered even further in the high-rate charge and discharge in Comparative Examples 12-3 to 12-6, in which the insulating layer was formed on the negative electrode, and in which the electrolytic solution contained additives.

4. Other Embodiments

The present technology is not limited to the foregoing embodiments, and various modifications and applications are possible, provided that such departures are within the gist of the present technology. For example, the numerical values, structures, shapes, materials, raw materials, and the methods of production described in the foregoing embodiments and examples are merely examples, and different numerical values, structures, shapes, materials, raw materials, and methods of production may be used, as required.

The present technology may be configured as follows.

[1] A nonaqueous electrolyte battery, including:
an electrode group including a positive electrode and a negative electrode; and
a nonaqueous electrolyte including an electrolytic solution,
the electrode group including an insulating layer,
the insulating layer containing a ceramic,
the electrolytic solution including an electrolyte salt and an additive, the electrolyte salt including the compound of formula (1), and the additive being at least one of the compounds of formulae (2) to (14), and
the compound of formula (1) being contained in 0.001 mol/L to 2.5 mol/L with respect to the electrolytic solution,

  (1)

wherein M is a monovalent cation, Y is $SO_2$ or CO, and the substituents Z are each independently a fluorine atom, or an organic group that may include at least one polymerizable functional group, and that may be perfluorinated, where at least one of the substituents Z is a fluorine atom,

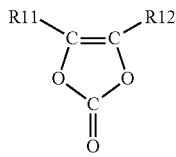  (2)

wherein R11 and R12 are each independently a hydrogen group, a halogen group, an alkyl group, or an halogenated alkyl group,

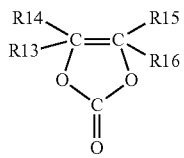  (3)

wherein R13 to R16 are each independently a hydrogen group, a halogen group, an alkyl group, a halogenated alkyl group, a vinyl group, or an allyl group, where at least one of R13 to R16 is a vinyl group or an allyl group,

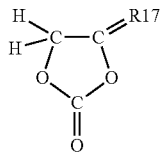  (4)

wherein R17 is an alkylene group,

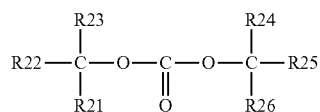  (5)

wherein R21 to R26 are each independently a hydrogen group, a halogen group, an alkyl group, or a halogenated alkyl group, where at least one of R21 to R26 is a halogen group or a halogenated alkyl group,

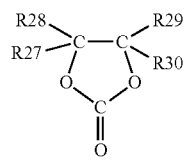  (6)

wherein R27 to R30 are each independently a hydrogen group, a halogen group, an alkyl group, or a halogenated alkyl group, where at least one of R27 to R30 is a halogen group, or a halogenated alkyl group,

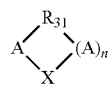  (7)

wherein R31 is an optionally substituted alkylene group of 1 to 6 carbon atoms, an optionally substituted alkenylene group of 2 to 6 carbon atoms, or an optionally substituted bridge ring, A represents C=O, SO, or $SO_2$, n is 0 or 1, and X represents oxygen (O) or sulfur (S),

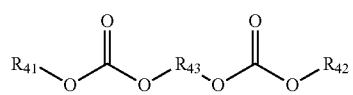  (8)

wherein R41 and R42 are each independently an optionally substituted alkyl group of 1 to 6 carbon atoms, an optionally substituted alkenyl group of 2 to 6 carbon atoms, or an optionally substituted alkynyl group of 2 to 6 carbon atoms, and R43 represents an optionally substituted alkylene group of 1 to 6 carbon atoms, an optionally substituted alkenylene group of 2 to 6 carbon atoms, an optionally substituted alkynylene group of 2 to 6 carbon atoms, or an optionally substituted bridge ring, where the substituent represents a halogen atom or an alkyl group,

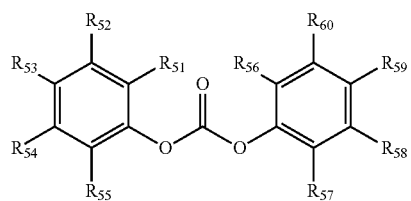  (9)

wherein R51 to R60 represent an optionally substituted alkyl group of 1 to 18 carbon atoms, an alkenyl group, an alkynyl group, an alkoxy group, or an alkylamino group, which may be connected to each other to form a ring, where the substituent represents a halogen atom or an alkyl group,

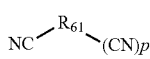  (10)

wherein R61 represents an optionally substituted alkylene group of 1 to 36 carbon atoms, an optionally substituted alkenylene group of 2 to 36 carbon atoms, an optionally substituted alkynylene group of 2 to 36 carbon atoms, or an optionally substituted bridge ring, p is an integer of 0 or more with an upper limit determined by R61, $Li_2PO_3F$ (lithium monofluorophosphate)  (11)

$LiPO_2F_2$ (lithium difluorophosphate)  (12)

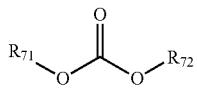  (13)

wherein R71 and R72 are each independently an alkyl group or a halogenated alkyl group,

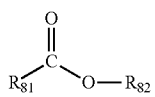  (14)

wherein R81 and R82 each independently represent a chain alkyl group.

[2] The nonaqueous electrolyte battery according to [1], wherein the electrolyte salt further includes an electrolyte salt other than the compound of formula (1), and
wherein the compound of formula (1) is contained in 0.001 mol/L to 0.5 mol/L with respect to the electrolytic solution.

[3] The nonaqueous electrolyte battery according to [2], wherein the electrolyte salt other than the compound of formula (1) includes $LiPF_6$.

[4] The nonaqueous electrolyte battery according to any one of [1] to [3], wherein the ceramic is at least one selected from the group consisting of alumina, silica, magnesia, titania, and zirconia.

[5] The nonaqueous electrolyte battery according to any one of [1] to [4], wherein the insulating layer is disposed between the positive electrode and the negative electrode.

[6] The nonaqueous electrolyte battery according to any one of [1] to [5],
wherein the electrode group further includes a separator disposed between the positive electrode and the negative electrode, and
wherein the insulating layer is disposed between the separator and the positive electrode, and/or between the separator and the negative electrode.

[7] The nonaqueous electrolyte battery according to any one of [1] to [4], wherein the insulating layer is included in the positive electrode.

[8] The nonaqueous electrolyte battery according to [1], wherein a negative electrode active material layer includes at least one of silicon and tin as negative electrode active material, the silicon being contained either alone or as an alloy or a compound, and the tin being contained either alone or as an alloy or a compound.

[9] The nonaqueous electrolyte battery according to any one of [1] to [8], wherein the battery is rectangular in shape.

[10] The nonaqueous electrolyte battery according to any one of [1] to [9], further including a film-like exterior member that sheathes the electrode group.

[11] The nonaqueous electrolyte battery according to [10], wherein the nonaqueous electrolyte further includes a polymer compound that holds the electrolytic solution.

[12] The nonaqueous electrolyte battery according to any one of [1] to [11], wherein the electrode group is a wound electrode unit of the positive electrode and the negative electrode wound together.

[13] The nonaqueous electrolyte battery according to any one of [1] to [11], wherein the electrode group is a laminate electrode unit of the positive electrode and the negative electrode laminated together.

[14] The nonaqueous electrolyte battery according to any one of [1] to [13], wherein the battery has an open circuit voltage of from 4.25 V to 6.00 V in the fully charged state of a pair of the positive electrode and the negative electrode.

[15] A battery pack, including:
the nonaqueous electrolyte battery of [1];
a controller that performs control for the nonaqueous electrolyte battery; and
an exterior encasing the nonaqueous electrolyte battery.

[16] An electronic device including the nonaqueous electrolyte battery of [1], wherein the electronic device receives power from the nonaqueous electrolyte battery.

[17] An electric vehicle, including:
the nonaqueous electrolyte battery of [1];
a converter that receives power from the nonaqueous electrolyte battery, and converts the received power into the driving power of the vehicle; and
a control unit that processes information concerning vehicle control based on information concerning the nonaqueous electrolyte battery.

[18] A power storage device including the nonaqueous electrolyte battery of [1], wherein the power storage device supplies power to an electronic device connected to the nonaqueous electrolyte battery.

[19] The power storage device according to [18], further including a power information control unit that transmits and receives a signal to and from another device via a network,
wherein the power storage device control the charge and discharge of the nonaqueous electrolyte battery based on the information received by the power information control unit.

[20] A power system that receives power from the nonaqueous electrolyte battery of [1], or that supplies power to the nonaqueous electrolyte battery from a power generating unit or a power grid.

The present disclosure contains subject matter related to that disclosed in Japanese Priority Patent Applications JP 2011-127047 and JP 2012-016355 filed in the Japan Patent Office on Jun. 7, 2011 and Jan. 30, 2012, respectively, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A nonaqueous electrolyte battery comprising:
an electrode group including a positive electrode and a negative electrode; and
a nonaqueous electrolyte including an electrolytic solution,
the electrode group including an insulating layer, the insulating layer containing a ceramic,
the electrolytic solution including an electrolyte salt and an additive, the electrolyte salt including the compound of formula (1), and the additive being at least one of the compounds of formulae (2) to (14), and
the compound of formula (1) being contained in 0.001 mol/L to 2.5 mol/L with respect to the electrolytic solution,

$$M^+[(ZY)_2N]^- \qquad (1)$$

wherein M is a monovalent cation, Y is $SO_2$ or CO, and the substituents Z are each independently a fluorine atom, or an organic group that may include at least one polymerizable functional group, and that may be perfluorinated, where at least one of the substituents Z is a fluorine atom,

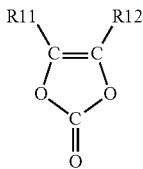
(2)

wherein R11 and R12 are each independently a hydrogen group, a halogen group, an alkyl group, or an halogenated alkyl group,

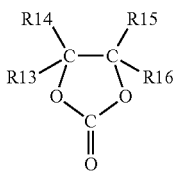
(3)

wherein R13 to R16 are each independently a hydrogen group, a halogen group, an alkyl group, a halogenated alkyl group, a vinyl group, or an allyl group, where at least one of R13 to R16 is a vinyl group or an allyl group,

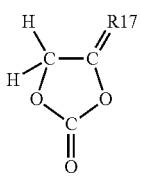
(4)

wherein R17 is an alkylene group,

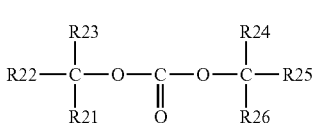
(5)

wherein R21 to R26 are each independently a hydrogen group, a halogen group, an alkyl group, or a halogenated alkyl group, where at least one of R21 to R26 is a halogen group or a halogenated alkyl group,

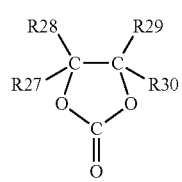
(6)

wherein R27 to R30 are each independently a hydrogen group, a halogen group, an alkyl group, or a halogenated alkyl group, where at least one of R27 to R30 is a halogen group, or a halogenated alkyl group,

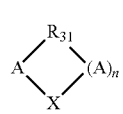
(7)

wherein R31 is an optionally substituted alkylene group of 1 to 6 carbon atoms, an optionally substituted alkenylene group of 2 to 6 carbon atoms, or an optionally substituted bridge ring, A represents C=O, SO, or $SO_2$, n is 0 or 1, and X represents oxygen (O) or sulfur (S),

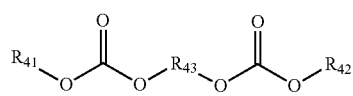
(8)

wherein R41 and R42 are each independently an optionally substituted alkyl group of 1 to 6 carbon atoms, an optionally substituted alkenyl group of 2 to 6 carbon atoms, or an optionally substituted alkynyl group of 2 to 6 carbon atoms, and R43 represents an optionally substituted alkylene group of 1 to 6 carbon atoms, an optionally substituted alkenylene group of 2 to 6 carbon atoms, an optionally substituted alkynylene group of 2 to 6 carbon atoms, or an optionally substituted bridge ring, where the substituent represents a halogen atom or an alkyl group,

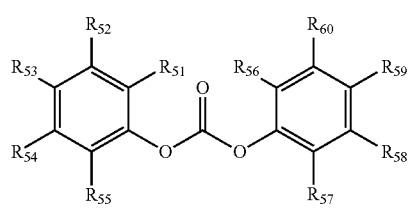
(9)

wherein R51 to R60 represent an optionally substituted alkyl group of 1 to 18 carbon atoms, an alkenyl group, an alkynyl group, an alkoxy group, or an alkylamino group, which may be connected to each other to form a ring, where the substituent represents a halogen atom or an alkyl group,

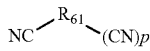

(10)

wherein R61 represents an optionally substituted alkylene group of 1 to 36 carbon atoms, an optionally substituted alkenylene group of 2 to 36 carbon atoms, an optionally substituted alkynylene group of 2 to 36 carbon atoms, or an optionally substituted bridge ring, p is an integer of 0 or more with an upper limit determined by R61, $Li_2PO_3F$ (lithium monofluorophosphate) (11)

$LiPO_2F_2$ (lithium difluorophosphate) (12)

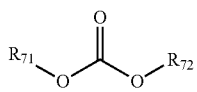

(13)

wherein R71 and R72 are each independently an alkyl group or a halogenated alkyl group,

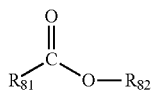

(14)

wherein R81 and R82 each independently represent a chain alkyl group.

2. The nonaqueous electrolyte battery according to claim 1, wherein the electrolyte salt further includes an electrolyte salt other than the compound of formula (1), and wherein the compound of formula (1) is contained in 0.001 mol/L to 0.5 mol/L with respect to the electrolytic solution.

3. The nonaqueous electrolyte battery according to claim 2, wherein the electrolyte salt other than the compound of formula (1) includes $LiPF_6$.

4. The nonaqueous electrolyte battery according to claim 1, wherein the ceramic is at least one selected from the group consisting of alumina, silica, magnesia, titania, and zirconia.

5. The nonaqueous electrolyte battery according to claim 1, wherein the insulating layer is disposed between the positive electrode and the negative electrode.

6. The nonaqueous electrolyte battery according to claim 1, wherein the electrode group further includes a separator disposed between the positive electrode and the negative electrode, and
wherein the insulating layer is disposed between the separator and the positive electrode, and/or between the separator and the negative electrode.

7. The nonaqueous electrolyte battery according to claim 1, wherein the insulating layer is included in the positive electrode.

8. The nonaqueous electrolyte battery according to claim 1, wherein a negative electrode active material layer includes at least one of silicon and tin as negative electrode active material, the silicon being contained either alone or as an alloy or a compound, and the tin being contained either alone or as an alloy or a compound.

9. The nonaqueous electrolyte battery according to claim 1, wherein the battery is rectangular in shape.

10. The nonaqueous electrolyte battery according to claim 1, further comprising a film-like exterior member that sheathes the electrode group.

11. The nonaqueous electrolyte battery according to claim 1, wherein the nonaqueous electrolyte further includes a polymer compound that holds the electrolytic solution.

12. The nonaqueous electrolyte battery according to claim 1, wherein the electrode group is a wound electrode unit of the positive electrode and the negative electrode wound together.

13. The nonaqueous electrolyte battery according to claim 1, wherein the electrode group is a laminate electrode unit of the positive electrode and the negative electrode laminated together.

14. The nonaqueous electrolyte battery according to claim 1, wherein the battery has an open circuit voltage of from 4.25 V to 6.00 V in the fully charged state of a pair of the positive electrode and the negative electrode.

15. A battery pack comprising:
the nonaqueous electrolyte battery of claim 1;
a controller that performs control for the nonaqueous electrolyte battery; and
an exterior encasing the nonaqueous electrolyte battery.

16. An electronic device comprising the nonaqueous electrolyte battery of claim 1, wherein the electronic device receives power from the nonaqueous electrolyte battery.

17. An electric vehicle comprising:
the nonaqueous electrolyte battery of claim 1;
a converter that receives power from the nonaqueous electrolyte battery, and converts the received power into the driving power of the vehicle; and
a control unit that processes information concerning vehicle control based on information concerning the nonaqueous electrolyte battery.

18. A power storage device comprising the nonaqueous electrolyte battery of claim 1, wherein the power storage device supplies power to an electronic device connected to the nonaqueous electrolyte battery.

19. The power storage device according to claim 18, further comprising a power information control unit that transmits and receives a signal to and from another device via a network,
wherein the power storage device control the charge and discharge of the nonaqueous electrolyte battery based on the information received by the power information control unit.

20. A power system that receives power from the nonaqueous electrolyte battery of claim 1, or that supplies power to the nonaqueous electrolyte battery from a power generating unit or a power grid.

21. The nonaqueous electrolyte battery according to claim 6, wherein the insulating layer is positioned on a surface of the separator.

22. The nonaqueous electrolyte battery according to claim 11, wherein the insulating layer is the nonaqueous electrolyte between the positive electrode and the negative electrode.

23. The nonaqueous electrolyte battery according to claim 7, wherein the insulating layer is positioned on a surface of a positive electrode active material.

* * * * *